US010157136B2

(12) United States Patent
Peled et al.

(10) Patent No.: US 10,157,136 B2
(45) Date of Patent: Dec. 18, 2018

(54) PIPELINED PREFETCHER FOR PARALLEL ADVANCEMENT OF MULTIPLE DATA STREAMS

(71) Applicant: Intel Corporation, Santa Clara, CA (US)

(72) Inventors: Leeor Peled, Haifa (IL); Joseph Nuzman, Haifa (IL); Larisa Novakovsky, Haifa (IL)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 15/087,917

(22) Filed: Mar. 31, 2016

(65) Prior Publication Data

US 2017/0286304 A1 Oct. 5, 2017

(51) Int. Cl.
*G06F 12/00* (2006.01)
*G06F 13/00* (2006.01)
*G06F 13/28* (2006.01)
*G06F 12/0862* (2016.01)
*G06F 12/0897* (2016.01)

(52) U.S. Cl.
CPC ...... *G06F 12/0862* (2013.01); *G06F 12/0897* (2013.01); *G06F 2212/1024* (2013.01)

(58) Field of Classification Search
CPC ...... G06F 3/0622; G06F 3/0637; G06F 3/064; G06F 3/0673
USPC ......................................................... 711/122
See application file for complete search history.

(56) References Cited

U.S. PATENT DOCUMENTS

| 6,049,850 | A | 4/2000 | Vishlitzky et al. |
| 6,098,154 | A * | 8/2000 | Lopez-Aguado ............ G06F 12/0897 711/118 |
| 6,535,962 | B1 | 3/2003 | Mayfield et al. |
| 8,452,931 | B1 * | 5/2013 | Rokade ............... G06F 11/2094 711/112 |

(Continued)

FOREIGN PATENT DOCUMENTS

WO 2017172121 A1 10/2017

OTHER PUBLICATIONS

International Search Report and Written Opinion issued in International Application No. PCT/US2017/018903 dated May 24, 2017; 16 pages.

(Continued)

*Primary Examiner* — Mohamed Gebril
(74) *Attorney, Agent, or Firm* — Alliance IP, LLC

(57) ABSTRACT

A processor includes a front end to decode instructions, an execution unit to execute instructions, multiple caches at different cache hierarchy levels, a pipelined prefetcher, and a retirement unit to retire instructions. The prefetcher includes circuitry to receive a demand request for data at a first address within a first line in a memory and, in response, to provide the data at the first address to the execution unit for consumption, to prefetch a second line at a first offset distance from the first line into a mid-level cache, and to prefetch a third line at a second offset distance from the second line into a last-level cache. The prefetcher includes circuitry to prefetch, in response to another demand request, the third line into the mid-level cache, and a fourth line into the last-level cache. The prefetcher enforces minimum or maximum offset distances between prefetched data streams.

20 Claims, 28 Drawing Sheets

(56) References Cited

U.S. PATENT DOCUMENTS

| | | | |
|---|---|---|---|
| 8,782,625 B2* | 7/2014 | Godefroid | G06F 11/3604 717/126 |
| 9,280,474 B2* | 3/2016 | Pavlou | G06F 12/02 |
| 9,405,515 B1* | 8/2016 | Bertram | G06F 8/41 |
| 9,430,392 B2* | 8/2016 | Jain | G06F 12/0862 |
| 2005/0138295 A1 | 6/2005 | Hammarlund et al. | |
| 2009/0172778 A1* | 7/2009 | Stephens | G06F 21/22 726/2 |
| 2010/0269102 A1* | 10/2010 | Latorre | G06F 12/08 717/30 |
| 2011/0314251 A1* | 12/2011 | Godefroid | G06F 11/3604 711/217 |
| 2012/0084511 A1 | 4/2012 | Dooley et al. | |
| 2013/0159679 A1* | 6/2013 | McCormick, Jr. | G06F 9/30043 712/220 |
| 2013/0226887 A1* | 8/2013 | Braam | H04L 67/1097 707/697 |
| 2014/0052917 A1* | 2/2014 | Koka | G06F 12/1027 711/120 |
| 2014/0052927 A1* | 2/2014 | McCauley | G06F 12/0862 711/137 |
| 2014/0082286 A1* | 3/2014 | Chou | G06F 12/0862 711/122 |
| 2014/0095779 A1* | 4/2014 | Forsyth | G06F 12/00 711/105 |
| 2014/0149632 A1 | 5/2014 | Kannan et al. | |
| 2014/0149678 A1* | 5/2014 | Chaudhary | G06F 12/0862 711/137 |
| 2014/0214998 A1* | 7/2014 | Lentini | H04L 47/70 709/212 |
| 2014/0229951 A1* | 8/2014 | Zhang | G06F 9/445 718/100 |
| 2014/0289191 A1* | 9/2014 | Chan | G06F 9/54 707/610 |
| 2015/0026414 A1* | 1/2015 | Kalamatianos | G06F 12/0862 711/137 |
| 2015/0058291 A1* | 2/2015 | Earl | G06F 17/30144 707/625 |
| 2015/0089180 A1* | 3/2015 | Yamamura | G06F 12/023 717/170 |
| 2016/0028544 A1* | 1/2016 | Hyde | G06F 3/0637 |
| 2016/0034400 A1* | 2/2016 | Dale | G06F 12/0862 711/122 |
| 2016/0359955 A1* | 12/2016 | Gill | G06F 9/45558 |
| 2017/0149843 A1* | 5/2017 | Amulothu | G06F 9/45558 |
| 2018/0060050 A1* | 3/2018 | Christopher | G06F 8/52 |

OTHER PUBLICATIONS

Intel Corporation, IA-32 Intel® Architecture Software Developer's Manual—vol. 2: Instruction Set Reference, 978 pages, 2003.

* cited by examiner

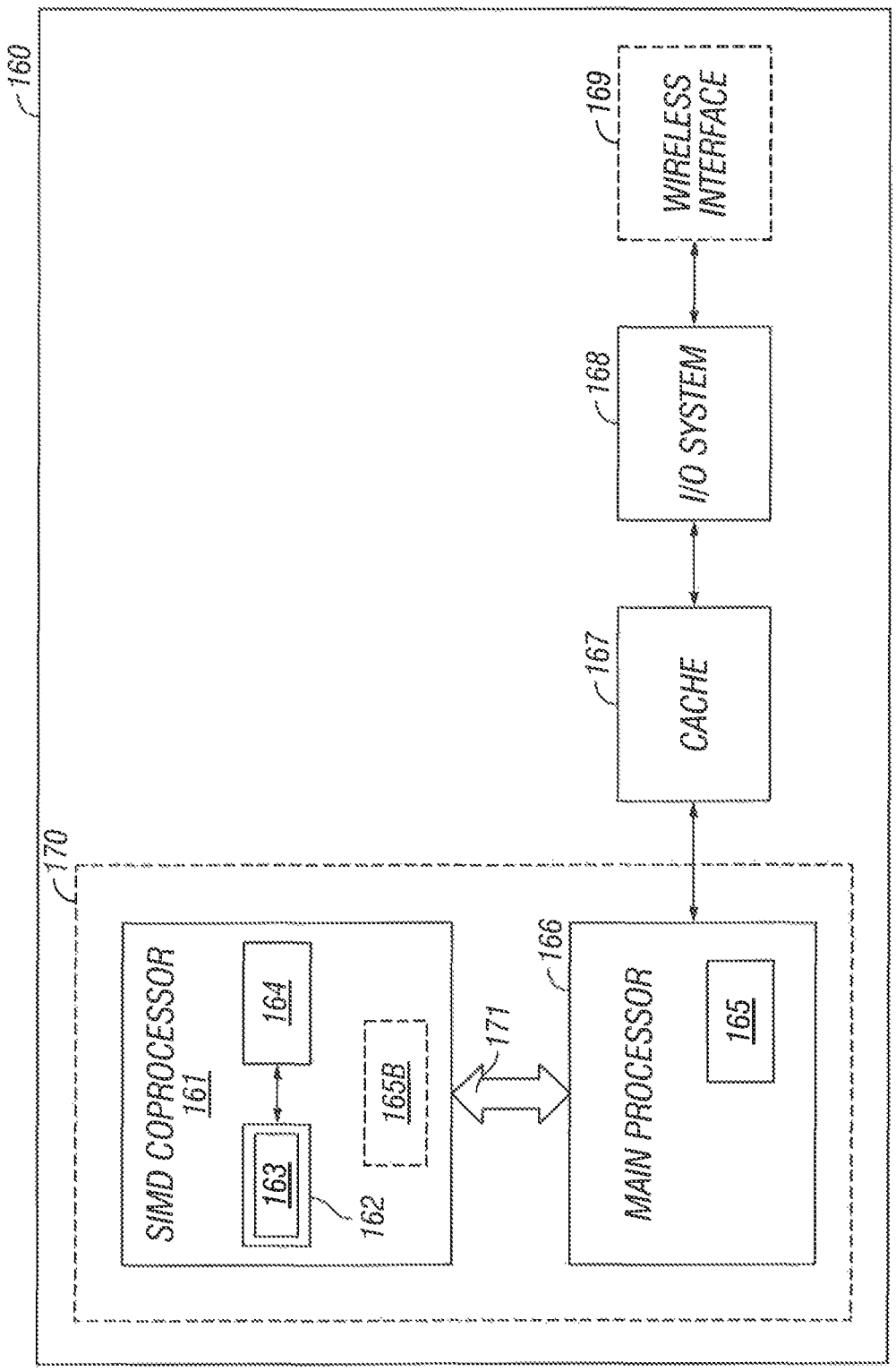

```
 127    120 119   112 111   104 103              24 23    16 15     8 7      0
| bbbb bbbb | bbbb bbbb | bbbb bbbb |  *   *   *  | bbbb bbbb | bbbb bbbb | bbbb bbbb |
```
*UNSIGNED PACKED BYTE REPRESENTATION 344*

```
 127    120 119   112 111   104 103              24 23    16 15     8 7      0
| sbbb bbbb | sbbb bbbb | sbbb bbbb |  *   *   *  | sbbb bbbb | sbbb bbbb | sbbb bbbb |
```
*SIGNED PACKED BYTE REPRESENTATION 345*

```
 127              112 111                                        16 15         0
| wwww wwww wwww wwww |          *     *     *          | wwww wwww wwww wwww |
```
*UNSIGNED PACKED WORD REPRESENTATION 346*

```
 127              112 111                                        16 15         0
| swww wwww wwww wwww |          *     *     *          | swww wwww wwww wwww |
```
*SIGNED PACKED WORD REPRESENTATION 347*

```
 127                              92 91      32 31                              0
| dddd dddd dddd dddd dddd dddd dddd dddd | * * * | dddd dddd dddd dddd dddd dddd dddd dddd |
```
*UNSIGNED PACKED DOUBLEWORD REPRESENTATION 348*

```
 127                              92 91      32 31                              0
| sddd dddd dddd dddd dddd dddd dddd dddd | * * * | sddd dddd dddd dddd dddd dddd dddd dddd |
```
*SIGNED PACKED DOUBLEWORD REPRESENTATION 349*

PIPELINED PREFETCHER FOR PARALLEL ADVANCEMENT OF MULTIPLE DATA STREAMS

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Multiprocessor systems are becoming more and more common. Applications of multiprocessor systems include dynamic domain partitioning all the way down to desktop computing. In order to take advantage of multiprocessor systems, code to be executed may be separated into multiple threads for execution by various processing entities. Each thread may be executed in parallel with one another. Pipelining of applications may be implemented in systems in order to more efficiently execute applications. Instructions as they are received on a processor may be decoded into terms or instruction words that are native, or more native, for execution on the processor. Processors may be implemented in a system on chip.

DESCRIPTION OF THE FIGURES

Embodiments are illustrated by way of example and not limitation in the Figures of the accompanying drawings:

FIG. 1C illustrates other embodiments of a data processing system for performing text string comparison operations;

FIG. 3A illustrates various packed data type representations in multimedia registers, in accordance with embodiments of the present disclosure;

FIG. 3B illustrates possible in-register data storage formats, in accordance with embodiments of the present disclosure;

FIG. 3C illustrates various signed and unsigned packed data type representations in multimedia registers, in accordance with embodiments of the present disclosure;

FIG. 3D illustrates an embodiment of an operation encoding format;

FIG. 3E illustrates another possible operation encoding format having forty or more bits, in accordance with embodiments of the present disclosure;

FIG. 3F illustrates yet another possible operation encoding format, in accordance with embodiments of the present disclosure;

DETAILED DESCRIPTION

Figure 1A:
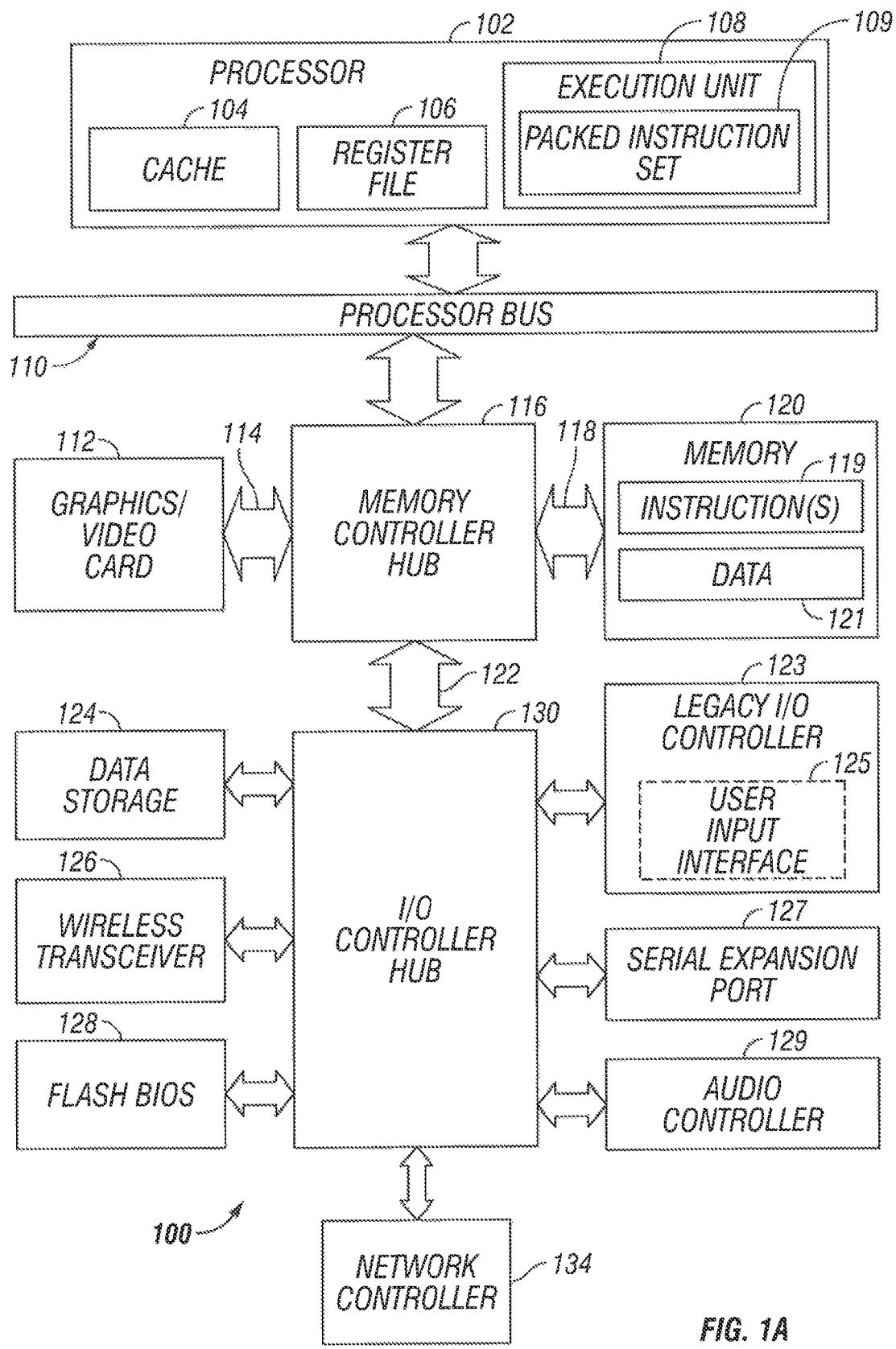
FIG. 1A is a block diagram of an exemplary computer system formed with a processor that may include execution units to execute an instruction, in accordance with embodiments of the present disclosure.

The following description describes circuitry and processing logic for performing pipelined prefetching to advance multiple data streams in parallel on a processing apparatus. Such a processing apparatus may include an out-of-order processor. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that the embodiments may be practiced without such specific details. Additionally, some well-known structures, circuits, and the like have not been shown in detail to avoid unnecessarily obscuring embodiments of the present disclosure.

Although the following embodiments are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that may be programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, steps of embodiments of the present disclosure might be performed by specific hardware components that contain fixed-function logic for performing the steps, or by any combination of programmed computer components and fixed-function hardware components.

Instructions used to program logic to perform embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs.

Similarly, processors designed by other processor development companies, such as ARM Holdings, Ltd., MIPS, or their licensees or adopters, may share at least a portion of a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with embodiments of the present disclosure. System 100 may include a component, such as a processor 102 to employ execution units including logic to perform algorithms for process data, in accordance with the present disclosure, such as in the embodiment described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instructions 119 and/or data 121 represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for storage of instructions 119 and data 121 and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller 129, firmware hub (flash BIOS) 128, wireless transceiver 126, data storage 124, legacy I/O controller 123 containing user input interface 125 (which may include a keyboard interface), a serial expansion port 127 such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
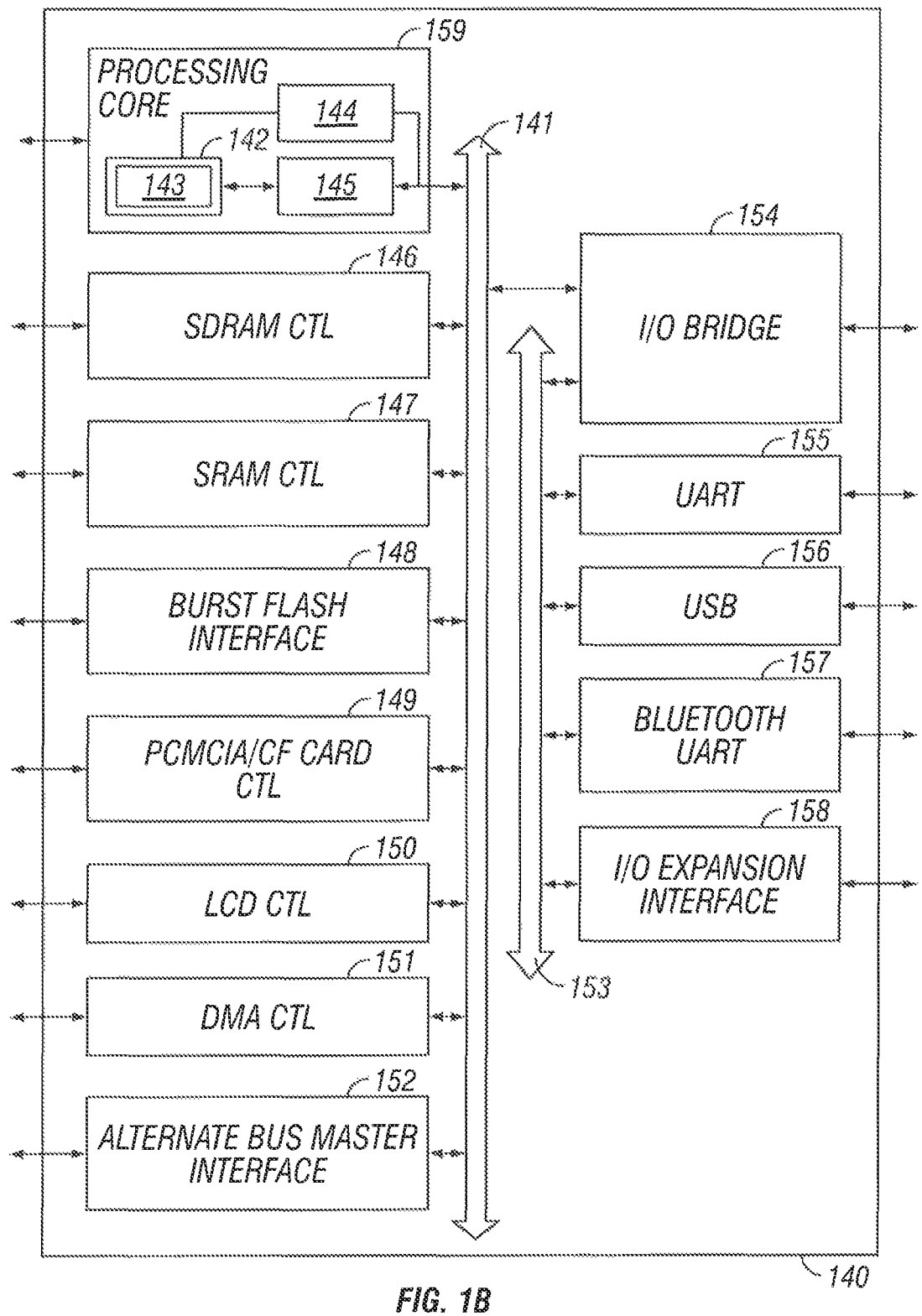
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 166 comprises a decoder 165 to recognize instructions of instruction set 163 including instructions in accordance with one embodiment for execution by execution unit 162. In other embodiments, SIMD coprocessor 161 also comprises at least part of decoder 165 (shown as 165B) to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 166. From coprocessor bus 171, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
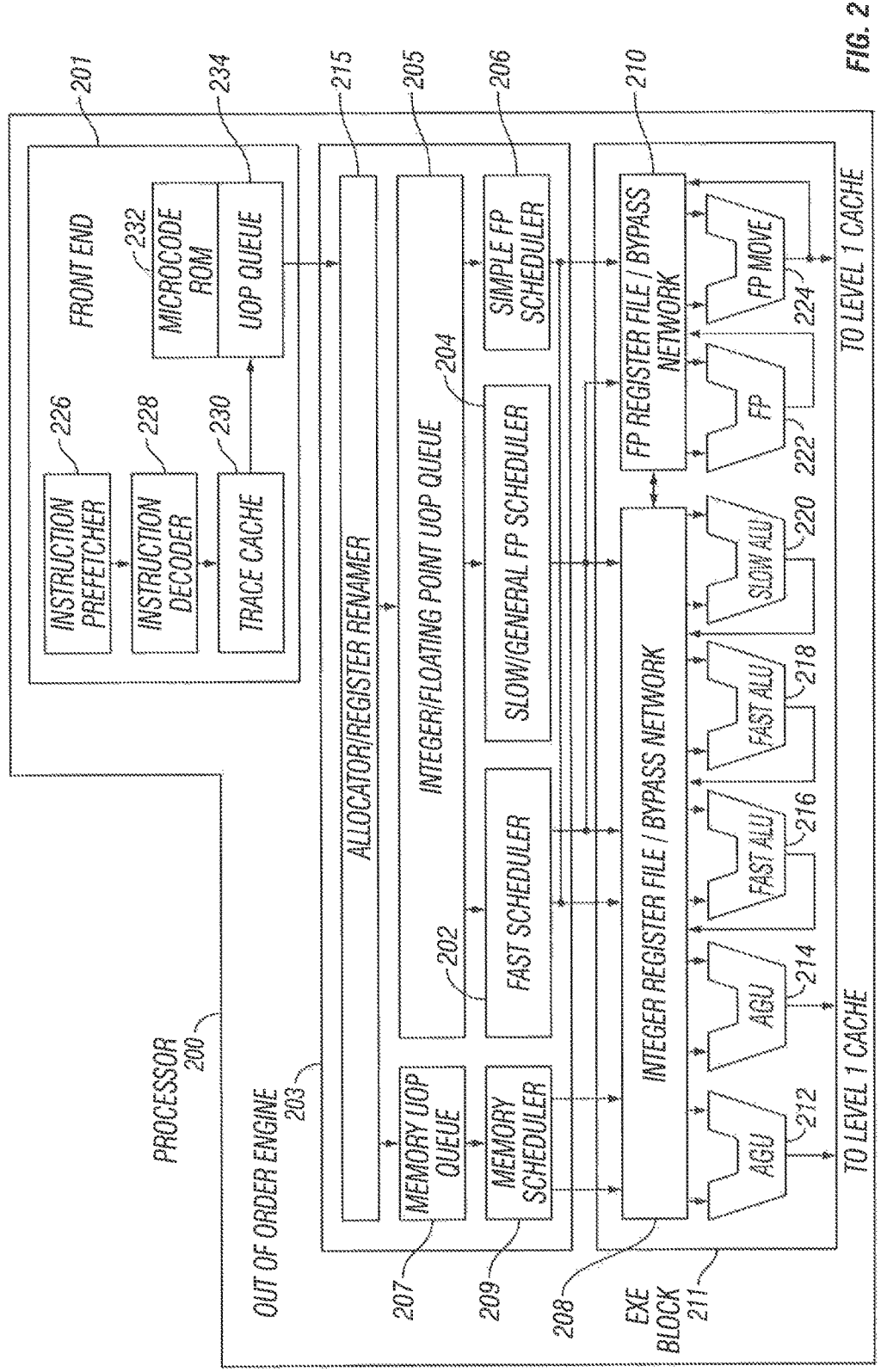
FIG. 2 is a block diagram of the micro-architecture for a processor that may include logic circuits to perform instructions, in accordance with embodiments of the present disclosure.

FIG. 2 is a block diagram of the micro-architecture for a processor 200 that may include logic circuits to perform instructions, in accordance with embodiments of the present disclosure. In some embodiments, an instruction in accordance with one embodiment may be implemented to operate on data elements having sizes of byte, word, doubleword, quadword, etc., as well as datatypes, such as single and double precision integer and floating point datatypes. In one embodiment, in-order front end 201 may implement a part of processor 200 that may fetch instructions to be executed and prepares the instructions to be used later in the processor pipeline. Front end 201 may include several units. In one embodiment, instruction prefetcher 226 fetches instructions from memory and feeds the instructions to an instruction decoder 228 which in turn decodes or interprets the instructions. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that may be used by the micro-architecture to perform operations in accordance with one embodiment. In one embodiment, trace cache 230 may assemble decoded uops into program ordered sequences or traces in uop queue 234 for execution. When trace cache 230 encounters a complex instruction, microcode ROM 232 provides the uops needed to complete the operation.

Some instructions may be converted into a single micro-op, whereas others need several micro-ops to complete the full operation. In one embodiment, if more than four micro-ops are needed to complete an instruction, decoder 228 may access microcode ROM 232 to perform the instruction. In one embodiment, an instruction may be decoded into a small number of micro ops for processing at instruction decoder 228. In another embodiment, an instruction may be stored within microcode ROM 232 should a number of micro-ops be needed to accomplish the operation. Trace cache 230 refers to an entry point programmable logic array (PLA) to determine a correct micro-instruction pointer for reading the micro-code sequences to complete one or more instructions in accordance with one embodiment from micro-code ROM 232. After microcode ROM 232 finishes sequencing micro-ops for an instruction, front end 201 of the machine may resume fetching micro-ops from trace cache 230.

Out-of-order execution engine 203 may prepare instructions for execution. The out-of-order execution logic has a number of buffers to smooth out and re-order the flow of instructions to optimize performance as they go down the pipeline and get scheduled for execution. The allocator logic in allocator/register renamer 215 allocates the machine buffers and resources that each uop needs in order to execute. The register renaming logic in allocator/register renamer 215 renames logic registers onto entries in a register file. The allocator 215 also allocates an entry for each uop in one of the two uop queues, one for memory operations (memory uop queue 207) and one for non-memory operations (integer/floating point uop queue 205), in front of the instruction schedulers: memory scheduler 209, fast scheduler 202, slow/general floating point scheduler 204, and simple floating point scheduler 206. Uop schedulers 202, 204, 206, determine when a uop is ready to execute based on the readiness of their dependent input register operand sources and the availability of the execution resources the uops need to complete their operation. Fast scheduler 202 of one embodiment may schedule on each half of the main clock cycle while the other schedulers may only schedule once per main processor clock cycle. The schedulers arbitrate for the dispatch ports to schedule uops for execution.

Register files 208, 210 may be arranged between schedulers 202, 204, 206, and execution units 212, 214, 216, 218, 220, 222, 224 in execution block 211. Each of register files 208, 210 perform integer and floating point operations, respectively. Each register file 208, 210, may include a bypass network that may bypass or forward just completed results that have not yet been written into the register file to new dependent uops. Integer register file 208 and floating point register file 210 may communicate data with the other. In one embodiment, integer register file 208 may be split into two separate register files, one register file for low-order thirty-two bits of data and a second register file for high order thirty-two bits of data. Floating point register file 210 may include 128-bit wide entries because floating point instructions typically have operands from 64 to 128 bits in width.

Execution block 211 may contain execution units 212, 214, 216, 218, 220, 222, 224. Execution units 212, 214, 216, 218, 220, 222, 224 may execute the instructions. Execution block 211 may include register files 208, 210 that store the integer and floating point data operand values that the micro-instructions need to execute. In one embodiment, processor 200 may comprise a number of execution units: address generation unit (AGU) 212, AGU 214, fast ALU 216, fast ALU 218, slow ALU 220, floating point ALU 222, floating point move unit 224. In another embodiment, floating point execution blocks 222, 224, may execute floating point, MMX, SIMD, and SSE, or other operations. In yet another embodiment, floating point ALU 222 may include a 64-bit by 64-bit floating point divider to execute divide, square root, and remainder micro-ops. In various embodiments, instructions involving a floating point value may be handled with the floating point hardware. In one embodiment, ALU operations may be passed to high-speed ALU execution units 216, 218. High-speed ALUs 216, 218 may execute fast operations with an effective latency of half a clock cycle. In one embodiment, most complex integer operations go to slow ALU 220 as slow ALU 220 may include integer execution hardware for long-latency type of operations, such as a multiplier, shifts, flag logic, and branch processing. Memory load/store operations may be executed by AGUs 212, 214. In one embodiment, integer ALUs 216, 218, 220 may perform integer operations on 64-bit data operands. In other embodiments, ALUs 216, 218, 220 may be implemented to support a variety of data bit sizes including sixteen, thirty-two, 128, 256, etc. Similarly, floating point units 222, 224 may be implemented to support a range of operands having bits of various widths. In one embodiment, floating point units 222, 224, may operate on 128-bit wide packed data operands in conjunction with SIMD and multimedia instructions.

In one embodiment, uops schedulers 202, 204, 206, dispatch dependent operations before the parent load has finished executing. As uops may be speculatively scheduled and executed in processor 200, processor 200 may also include logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations might need to be replayed and the independent ones may be allowed to complete. The schedulers and replay mechanism of one embodiment of a processor may also be designed to catch instruction sequences for text string comparison operations.

The term "registers" may refer to the on-board processor storage locations that may be used as part of instructions to identify operands. In other words, registers may be those that may be usable from the outside of the processor (from a programmer's perspective). However, in some embodiments registers might not be limited to a particular type of circuit. Rather, a register may store data, provide data, and perform the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data. For the discussions below, the registers may be understood to be data registers designed to hold packed data, such as 64-bit wide MMX' registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128-bit wide XMM registers relating to SSE2, SSE3, SSE4, or beyond (referred to generically as "SSEx") technology may hold such packed data operands. In one embodiment, in storing packed data and integer data, the registers do not need to differentiate between the two data types. In one embodiment, integer and floating point data may be contained in the same register file or different register files. Furthermore, in one embodiment, floating point and integer data may be stored in different registers or the same registers.

Figure 3A:
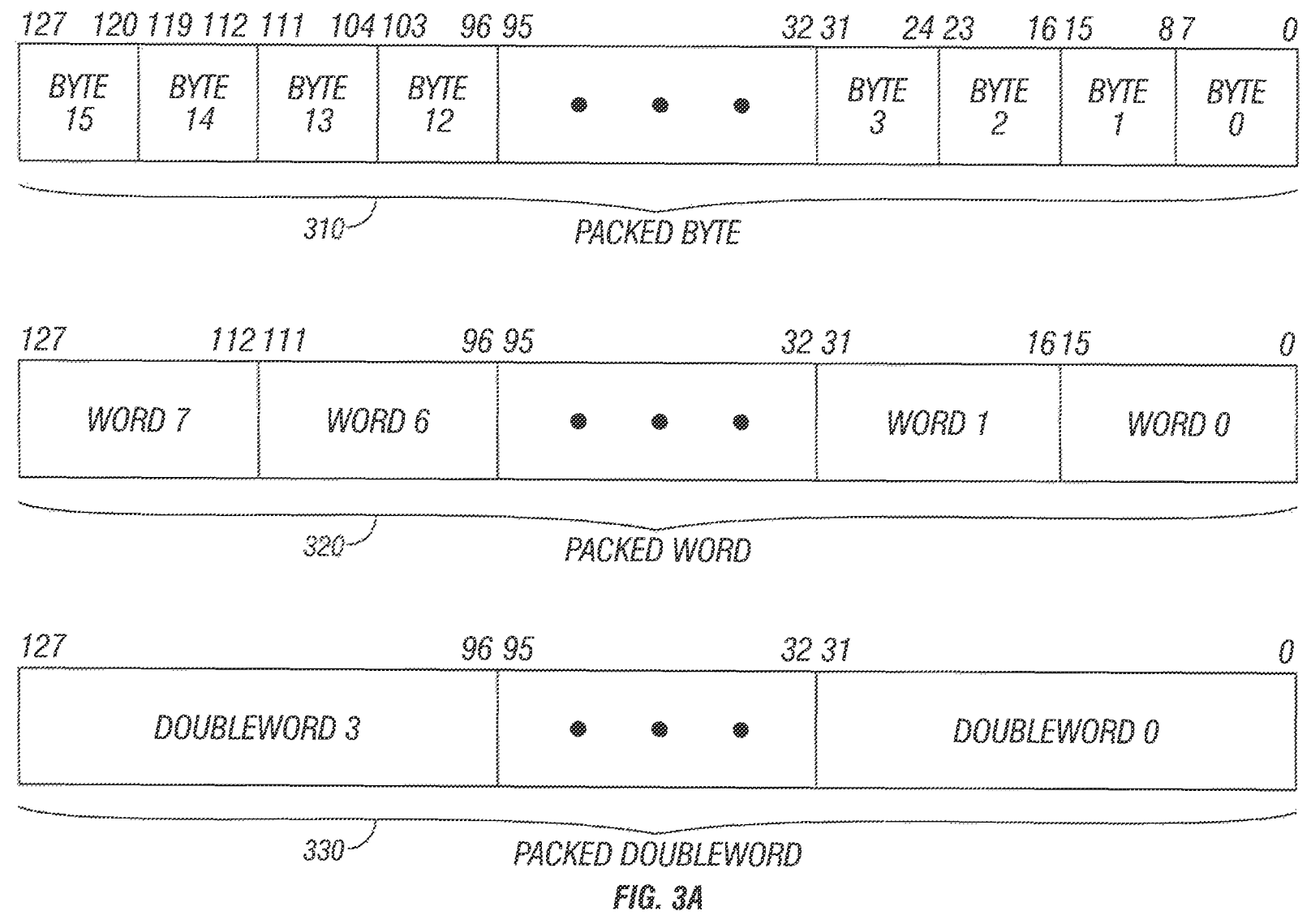

In the examples of the following figures, a number of data operands may be described. FIG. 3A illustrates various packed data type representations in multimedia registers, in accordance with embodiments of the present disclosure. FIG. 3A illustrates data types for a packed byte 310, a packed word 320, and a packed doubleword (dword) 330 for 128-bit wide operands. Packed byte format 310 of this example may be 128 bits long and contains sixteen packed byte data elements. A byte may be defined, for example, as eight bits of data. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement increases the storage efficiency of the processor. As well, with sixteen data elements accessed, one operation may now be performed on sixteen data elements in parallel.

Generally, a data element may include an individual piece of data that is stored in a single register or memory location with other data elements of the same length. In packed data sequences relating to SSEx technology, the number of data elements stored in a XMM register may be 128 bits divided by the length in bits of an individual data element. Similarly, in packed data sequences relating to MMX and SSE technology, the number of data elements stored in an MMX register may be 64 bits divided by the length in bits of an individual data element. Although the data types illustrated in FIG. 3A may be 128 bits long, embodiments of the present disclosure may also operate with 64-bit wide or other sized operands. Packed word format 320 of this example may be 128 bits long and contains eight packed word data elements. Each packed word contains sixteen bits of information. Packed doubleword format 330 of FIG. 3A may be 128 bits long and contains four packed doubleword data elements. Each packed doubleword data element contains thirty-two bits of information. A packed quadword may be 128 bits long and contain two packed quad-word data elements.

Figure 3B:
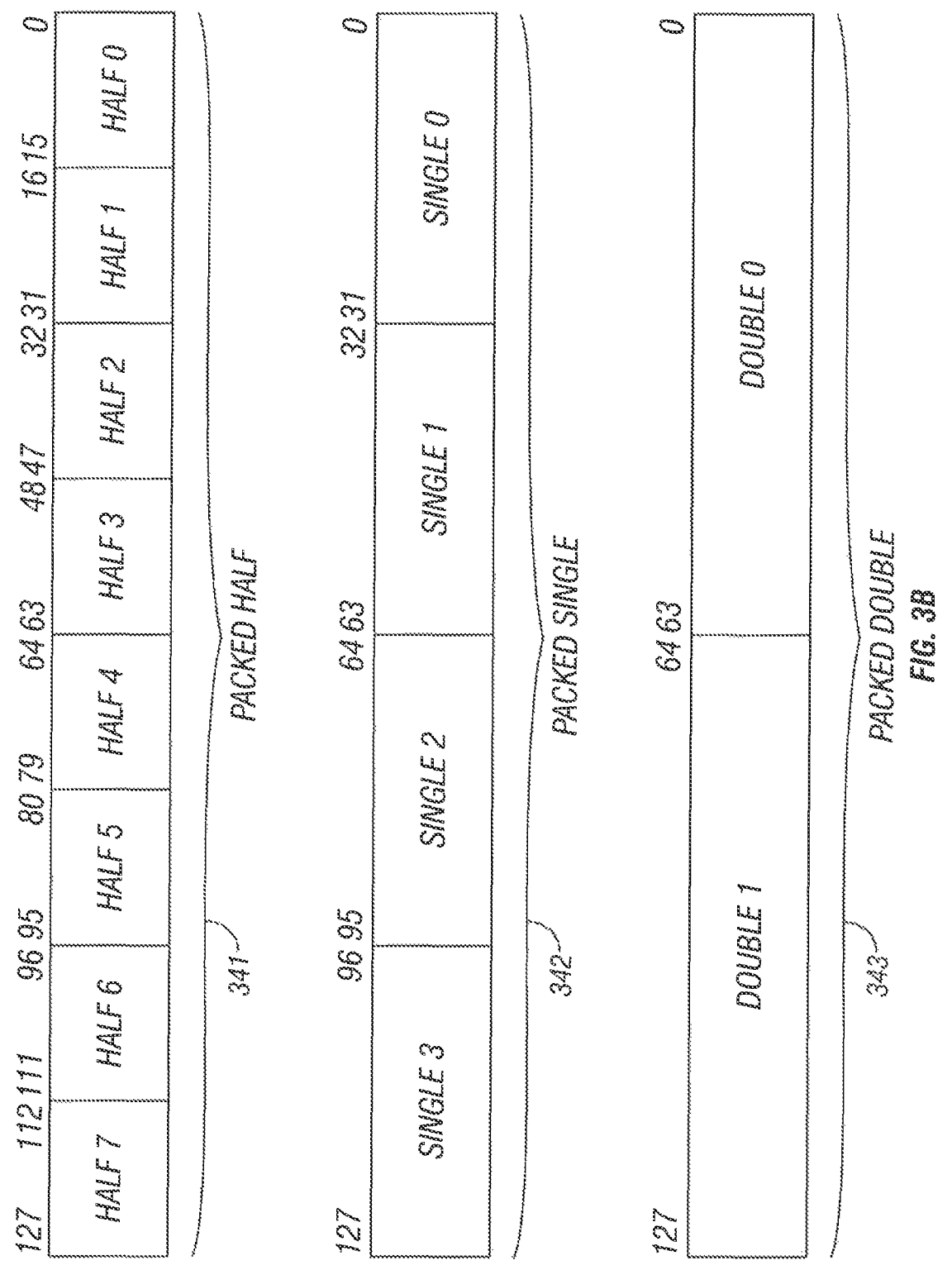

FIG. 3B illustrates possible in-register data storage formats, in accordance with embodiments of the present disclosure. Each packed data may include more than one independent data element. Three packed data formats are illustrated; packed half 341, packed single 342, and packed double 343. One embodiment of packed half 341, packed single 342, and packed double 343 contain fixed-point data elements. For another embodiment one or more of packed half 341, packed single 342, and packed double 343 may contain floating-point data elements. One embodiment of packed half 341 may be 128 bits long containing eight 16-bit data elements. One embodiment of packed single 342 may be 128 bits long and contains four 32-bit data elements. One embodiment of packed double 343 may be 128 bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers, in accordance with embodiments of the present disclosure. Unsigned packed byte representation 344 illustrates the storage of an unsigned packed byte in a SIMD register. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement may increase the storage efficiency of the processor. As well, with sixteen data elements accessed, one operation may now be performed on sixteen data elements in a parallel fashion. Signed packed byte representation 345 illustrates the storage of a signed packed byte. Note that the eighth bit of every byte data element may be the sign indicator. Unsigned packed word representation 346 illustrates how word seven through word zero may be stored in a SIMD register. Signed packed word representation 347 may be similar to the unsigned packed word in-register representation 346. Note that the sixteenth bit of each word data element may be the sign indicator. Unsigned packed doubleword representation 348 shows how doubleword data elements are stored. Signed packed doubleword representation 349 may be similar to unsigned packed doubleword in-register representation 348. Note that the necessary sign bit may be the thirty-second bit of each doubleword data element.

Figures 3D, 3E, 3F:
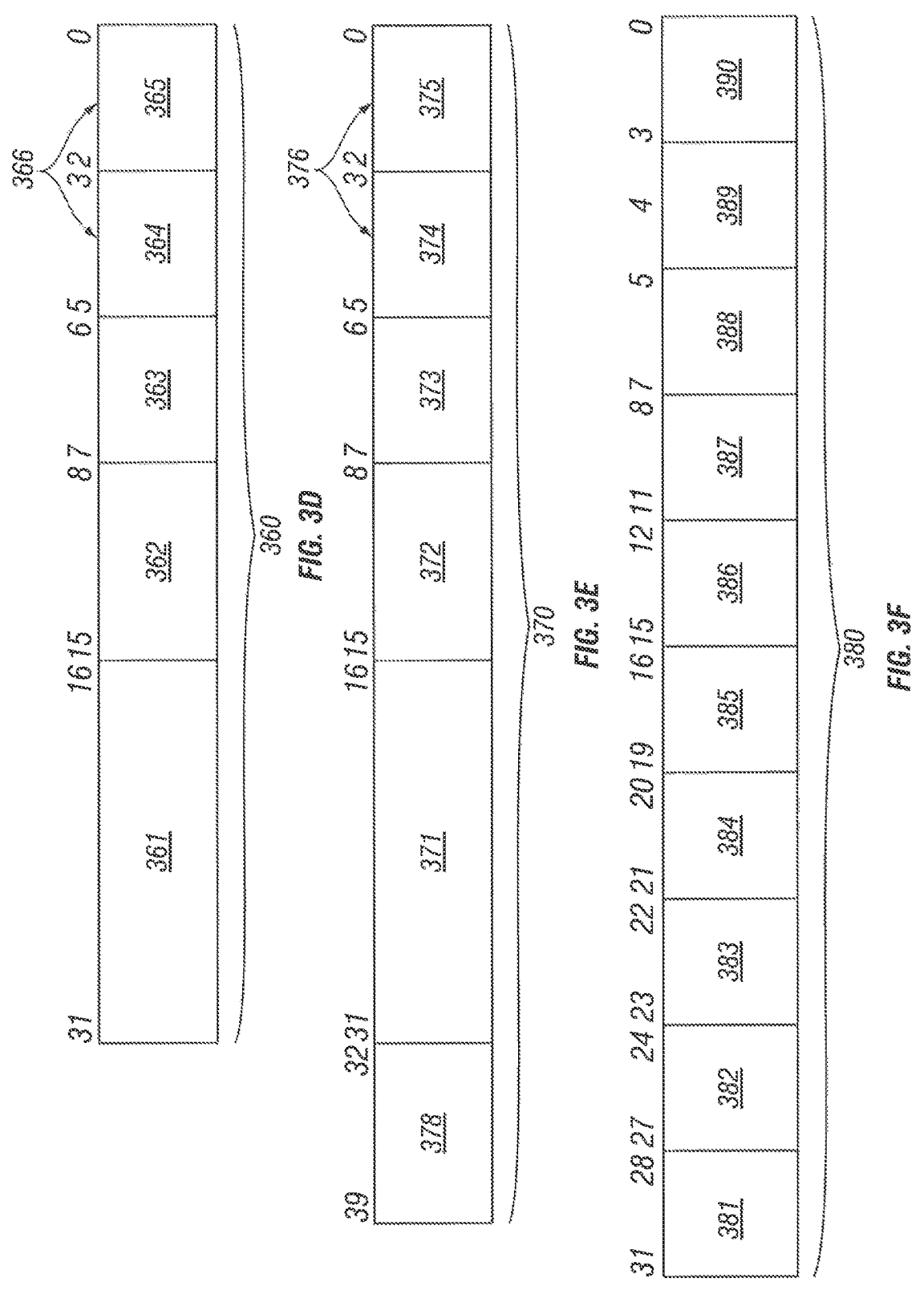

FIG. 3D illustrates an embodiment of an operation encoding (opcode). Furthermore, format 360 may include register/memory operand addressing modes corresponding with a type of opcode format described in the "IA-32 Intel Architecture Software Developer's Manual Volume 2: Instruction Set Reference," which is available from Intel Corporation, Santa Clara, Calif. on the world-wide-web (www) at intel-.com/design/litcentr. In one embodiment, an instruction may be encoded by one or more of fields 361 and 362. Up to two operand locations per instruction may be identified, including up to two source operand identifiers 364 and 365. In one embodiment, destination operand identifier 366 may be the same as source operand identifier 364, whereas in other embodiments they may be different. In another embodiment, destination operand identifier 366 may be the same as source operand identifier 365, whereas in other embodiments they may be different. In one embodiment, one of the source operands identified by source operand identifiers 364 and 365 may be overwritten by the results of the text string comparison operations, whereas in other embodiments identifier 364 corresponds to a source register element and identifier 365 corresponds to a destination register element. In one embodiment, operand identifiers 364 and 365 may identify 32-bit or 64-bit source and destination operands.

FIG. 3E illustrates another possible operation encoding (opcode) format 370, having forty or more bits, in accordance with embodiments of the present disclosure. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. In one embodiment, prefix byte 378 may be used to identify 32-bit or 64-bit source and destination operands. In one embodiment, destination operand identifier 376 may be the same as source operand identifier 374, whereas in other embodiments they may be different. For another embodiment, destination operand identifier 376 may be the same as source operand identifier 375, whereas in other embodiments they may be different. In one embodiment, an instruction operates on one or more of the operands identified by operand identifiers 374 and 375 and one or more operands identified by operand identifiers 374 and 375 may be overwritten by the results of the instruction, whereas in other embodiments, operands identified by identifiers 374 and 375 may be written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

FIG. 3F illustrates yet another possible operation encoding (opcode) format, in accordance with embodiments of the present disclosure. 64-bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for another embodiment, operations may be encoded by one or more of fields 383, 384, 387, and 388. Up to three operand locations per instruction may be identified, including up to two source operand identifiers 385 and 390 and one destination operand identifier 386. One embodiment of the coprocessor may operate on eight, sixteen, thirty-two, and 64-bit values. In one embodiment, an instruction may be performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection may be done on SIMD fields. For some instructions, the type of saturation may be encoded by field 384.

Figure 4A:
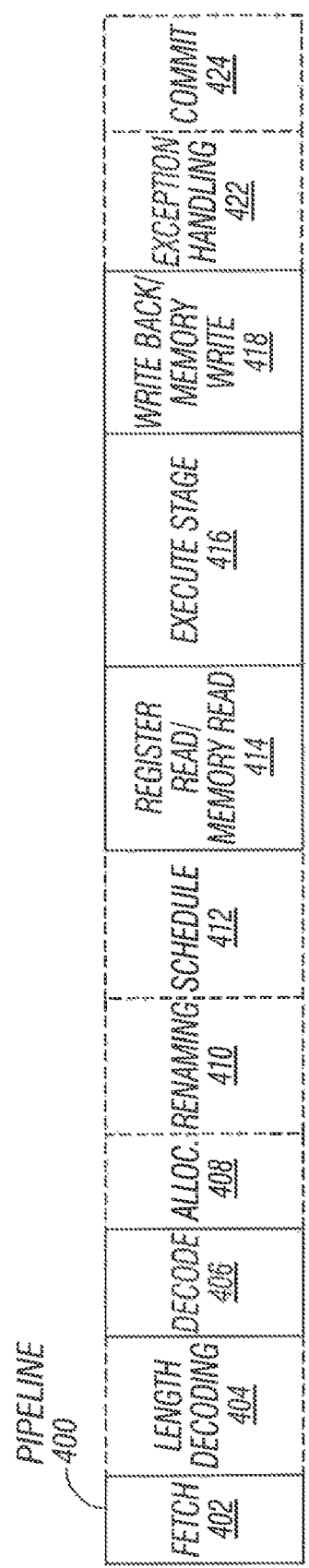
FIG. 4A is a block diagram illustrating an in-order pipeline and a register renaming stage, out-of-order issue/execution pipeline, in accordance with embodiments of the present disclosure.
Figure 4B:
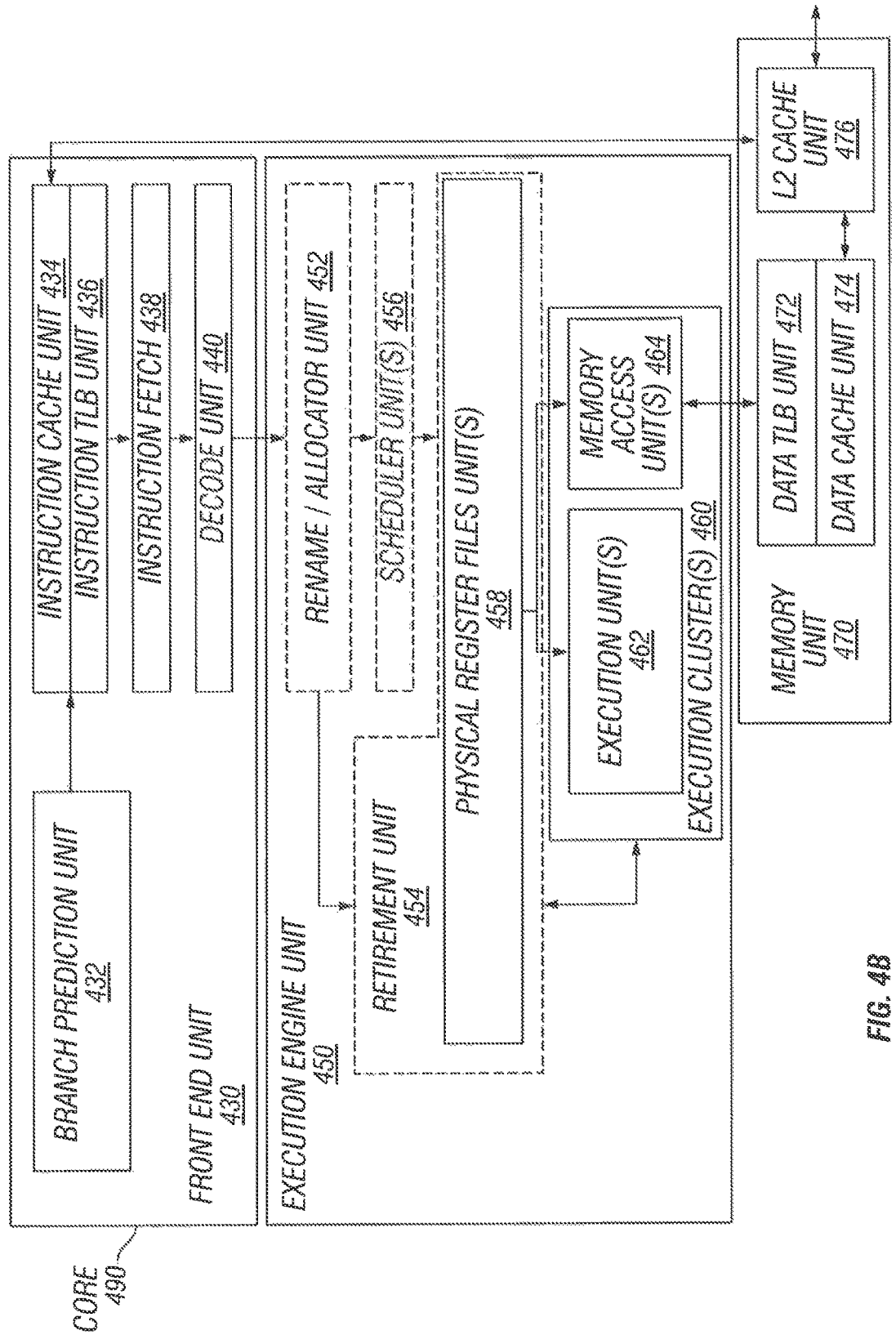
FIG. 4B is a block diagram illustrating an in-order architecture core and a register renaming logic, out-of-order issue/execution logic to be included in a processor, in accordance with embodiments of the present disclosure.

FIG. 4A is a block diagram illustrating an in-order pipeline and a register renaming stage, out-of-order issue/execution pipeline, in accordance with embodiments of the present disclosure. FIG. 4B is a block diagram illustrating an in-order architecture core and a register renaming logic, out-of-order issue/execution logic to be included in a processor, in accordance with embodiments of the present disclosure. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 may include a fetch stage 402, a length decode stage 404, a decode stage 406, an allocation stage 408, a renaming stage 410, a scheduling (also known as a dispatch or issue) stage 412, a register read/memory read stage 414, an execute stage 416, a write-back/memory-write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both may be coupled to a memory unit 470.

Core 490 may be a reduced instruction set computing (RISC) core, a complex instruction set computing (CISC) core, a very long instruction word (VLIW) core, or a hybrid or alternative core type. In one embodiment, core 490 may be a special-purpose core, such as, for example, a network or communication core, compression engine, graphics core, or the like.

Front end unit 430 may include a branch prediction unit 432 coupled to an instruction cache unit 434. Instruction cache unit 434 may be coupled to an instruction translation lookaside buffer (TLB) 436. TLB 436 may be coupled to an instruction fetch unit 438, which is coupled to a decode unit 440. Decode unit 440 may decode instructions, and generate as an output one or more micro-operations, micro-code entry points, microinstructions, other instructions, or other control signals, which may be decoded from, or which otherwise reflect, or may be derived from, the original instructions. The decoder may be implemented using various different mechanisms. Examples of suitable mechanisms include, but are not limited to, look-up tables, hardware implementations, programmable logic arrays (PLAs), microcode read-only memories (ROMs), etc. In one embodiment, instruction cache unit 434 may be further coupled to a level 2 (L2) cache unit 476 in memory unit 470. Decode unit 440 may be coupled to a rename/allocator unit 452 in execution engine unit 450.

Execution engine unit 450 may include rename/allocator unit 452 coupled to a retirement unit 454 and a set of one or more scheduler units 456. Scheduler units 456 represent any number of different schedulers, including reservations stations, central instruction window, etc. Scheduler units 456 may be coupled to physical register file units 458. Each of physical register file units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. Physical register file units 458 may be overlapped by retirement unit 454 to illustrate various ways in which register renaming and out-of-order execution may be implemented (e.g., using one or more reorder buffers and one or more retirement register files, using one or more future files, one or more history buffers, and one or more retirement register files; using register maps and a pool of registers; etc.). Generally, the architectural registers may be visible from the outside of the processor or from a programmer's perspective. The registers might not be limited to any known particular type of circuit. Various different types of registers may be suitable as long as they store and provide data as described herein. Examples of suitable registers include, but might not be limited to, dedicated physical registers, dynamically allocated physical registers using register renaming, combinations of dedicated and dynamically allocated physical registers, etc. Retirement unit 454 and physical register file units 458 may be coupled to execution clusters 460. Execution clusters 460 may include a set of one or more execution units 462 and a set of one or more memory access units 464. Execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Scheduler units 456, physical register file units 458, and execution clusters 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit, and/or execution cluster—and in the case of a separate memory access pipeline, certain embodiments may be implemented in which only the execution cluster of this pipeline has memory access units 464). It should also be understood that where separate pipelines are used, one or more of these pipelines may be out-of-order issue/execution and the rest in-order.

The set of memory access units 464 may be coupled to memory unit 470, which may include a data TLB unit 472 coupled to a data cache unit 474 coupled to a level 2 (L2) cache unit 476. In one exemplary embodiment, memory access units 464 may include a load unit, a store address unit, and a store data unit, each of which may be coupled to data TLB unit 472 in memory unit 470. L2 cache unit 476 may be coupled to one or more other levels of cache and eventually to a main memory.

By way of example, the exemplary register renaming, out-of-order issue/execution core architecture may implement pipeline 400 as follows: 1) instruction fetch 438 may perform fetch and length decoding stages 402 and 404; 2) decode unit 440 may perform decode stage 406; 3) rename/allocator unit 452 may perform allocation stage 408 and renaming stage 410; 4) scheduler units 456 may perform schedule stage 412; 5) physical register file units 458 and memory unit 470 may perform register read/memory read stage 414; execution cluster 460 may perform execute stage 416; 6) memory unit 470 and physical register file units 458 may perform write-back/memory-write stage 418; 7) various units may be involved in the performance of exception handling stage 422; and 8) retirement unit 454 and physical register file units 458 may perform commit stage 424.

Core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads) in a variety of manners. Multithreading support may be performed by, for example, including time sliced multithreading, simultaneous multithreading (where a single physical core provides a logical core for each of the threads that physical core is simultaneously multithreading), or a combination thereof. Such a combination may include, for example, time sliced fetching and decoding and simultaneous multithreading thereafter such as in the Intel® Hyperthreading technology.

While register renaming may be described in the context of out-of-order execution, it should be understood that register renaming may be used in an in-order architecture. While the illustrated embodiment of the processor may also include a separate instruction and data cache units 434/474 and a shared L2 cache unit 476, other embodiments may have a single internal cache for both instructions and data, such as, for example, a Level 1 (L1) internal cache, or multiple levels of internal cache. In some embodiments, the system may include a combination of an internal cache and an external cache that may be external to the core and/or the processor. In other embodiments, all of the caches may be external to the core and/or the processor.

Figure 5A:
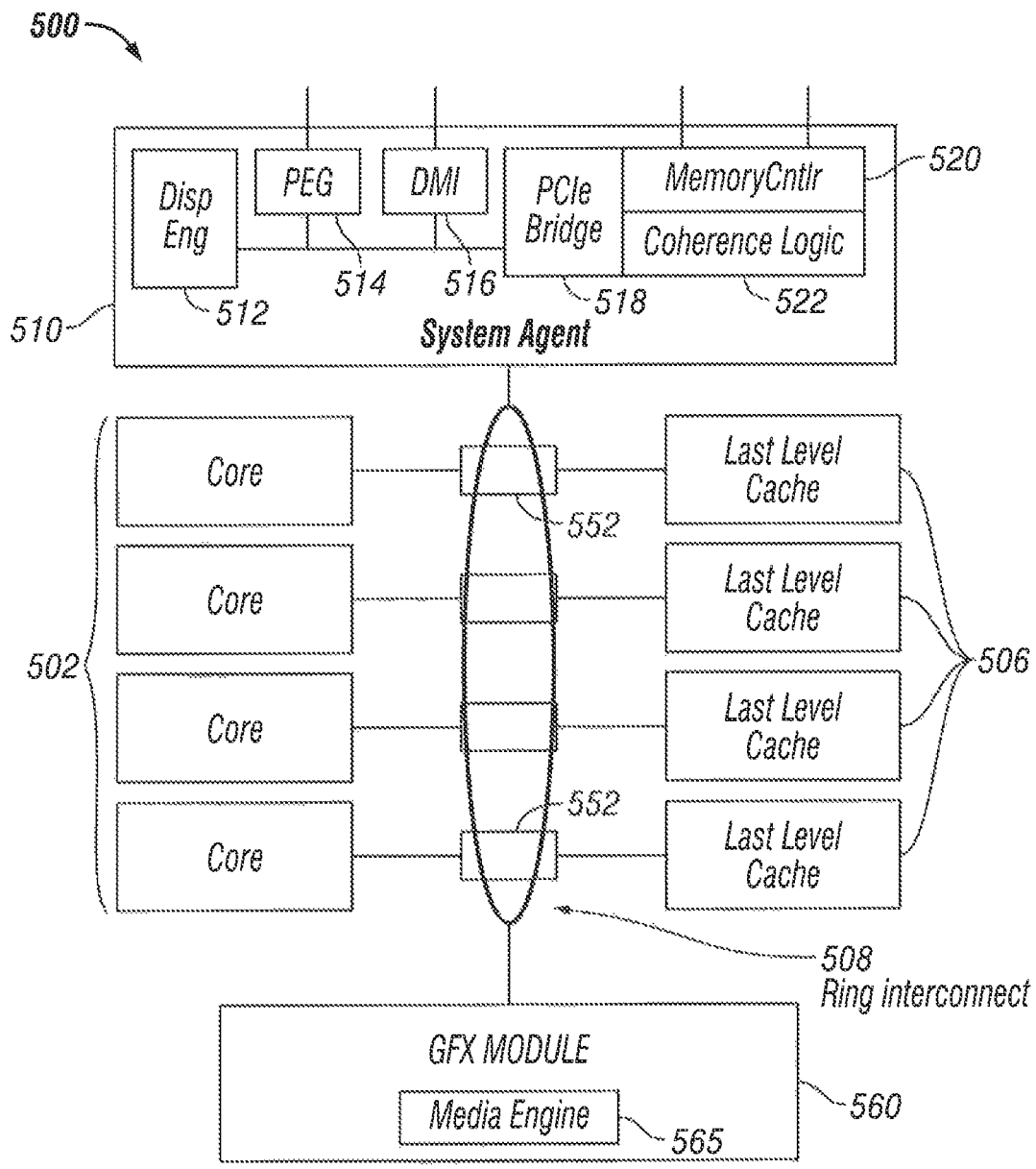
FIG. 5A is a block diagram of a processor, in accordance with embodiments of the present disclosure.

FIG. 5A is a block diagram of a processor 500, in accordance with embodiments of the present disclosure. In one embodiment, processor 500 may include a multicore processor. Processor 500 may include a system agent 510 communicatively coupled to one or more cores 502. Furthermore, cores 502 and system agent 510 may be communicatively coupled to one or more caches 506. Cores 502, system agent 510, and caches 506 may be communicatively coupled via one or more memory control units 552. Furthermore, cores 502, system agent 510, and caches 506 may be communicatively coupled to a graphics module 560 via memory control units 552.

Processor 500 may include any suitable mechanism for interconnecting cores 502, system agent 510, and caches 506, and graphics module 560. In one embodiment, processor 500 may include a ring-based interconnect unit 508 to interconnect cores 502, system agent 510, and caches 506, and graphics module 560. In other embodiments, processor 500 may include any number of well-known techniques for interconnecting such units. Ring-based interconnect unit 508 may utilize memory control units 552 to facilitate interconnections.

Processor 500 may include a memory hierarchy comprising one or more levels of caches within the cores, one or more shared cache units such as caches 506, or external memory (not shown) coupled to the set of integrated memory controller units 552. Caches 506 may include any suitable cache. In one embodiment, caches 506 may include one or more mid-level caches, such as level 2 (L2), level 3 (L3), level 4 (L4), or other levels of cache, a last level cache (LLC), and/or combinations thereof.

In various embodiments, one or more of cores 502 may perform multi-threading. System agent 510 may include components for coordinating and operating cores 502. System agent unit 510 may include for example a power control unit (PCU). The PCU may be or include logic and components needed for regulating the power state of cores 502. System agent 510 may include a display engine 512 for driving one or more externally connected displays or graphics module 560. System agent 510 may include an interface 514 for communications busses for graphics. In one embodiment, interface 514 may be implemented by PCI Express (PCIe). In a further embodiment, interface 514 may be implemented by PCI Express Graphics (PEG). System agent 510 may include a direct media interface (DMI) 516. DMI 516 may provide links between different bridges on a motherboard or other portion of a computer system. System agent 510 may include a PCIe bridge 518 for providing PCIe links to other elements of a computing system. PCIe bridge 518 may be implemented using a memory controller 520 and coherence logic 522.

Cores 502 may be implemented in any suitable manner. Cores 502 may be homogenous or heterogeneous in terms of architecture and/or instruction set. In one embodiment, some of cores 502 may be in-order while others may be out-of-order. In another embodiment, two or more of cores 502 may execute the same instruction set, while others may execute only a subset of that instruction set or a different instruction set.

Processor 500 may include a general-purpose processor, such as a Core™ i3, i5, i7, 2 Duo and Quad, Xeon™, Itanium™, XScale™ or StrongARM™ processor, which may be available from Intel Corporation, of Santa Clara, Calif. Processor 500 may be provided from another company, such as ARM Holdings, Ltd, MIPS, etc. Processor 500 may be a special-purpose processor, such as, for example, a network or communication processor, compression engine, graphics processor, co-processor, embedded processor, or the like. Processor 500 may be implemented on one or more chips. Processor 500 may be a part of and/or may be implemented on one or more substrates using any of a number of process technologies, such as, for example, BiCMOS, CMOS, or NMOS.

In one embodiment, a given one of caches 506 may be shared by multiple ones of cores 502. In another embodiment, a given one of caches 506 may be dedicated to one of cores 502. The assignment of caches 506 to cores 502 may be handled by a cache controller or other suitable mechanism. A given one of caches 506 may be shared by two or more cores 502 by implementing time-slices of a given cache 506.

Graphics module 560 may implement an integrated graphics processing subsystem. In one embodiment, graphics module 560 may include a graphics processor. Furthermore, graphics module 560 may include a media engine 565. Media engine 565 may provide media encoding and video decoding.

Figure 5B:
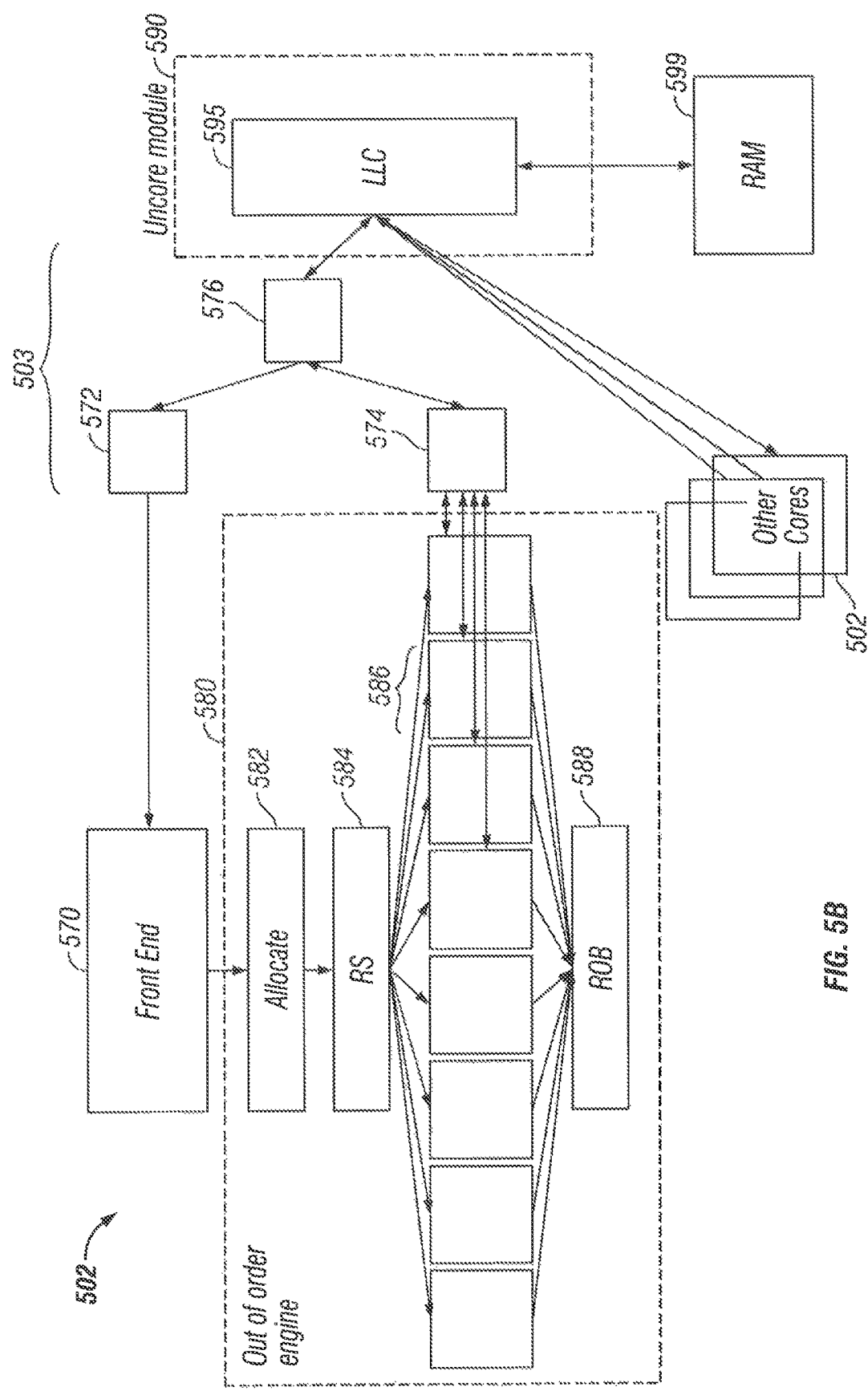
FIG. 5B is a block diagram of an example implementation of a core, in accordance with embodiments of the present disclosure.

FIG. 5B is a block diagram of an example implementation of a core 502, in accordance with embodiments of the present disclosure. Core 502 may include a front end 570 communicatively coupled to an out-of-order engine 580. Core 502 may be communicatively coupled to other portions of processor 500 through cache hierarchy 503.

Front end 570 may be implemented in any suitable manner, such as fully or in part by front end 201 as described above. In one embodiment, front end 570 may communicate with other portions of processor 500 through cache hierarchy 503. In a further embodiment, front end 570 may fetch instructions from portions of processor 500 and prepare the instructions to be used later in the processor pipeline as they are passed to out-of-order execution engine 580.

Out-of-order execution engine 580 may be implemented in any suitable manner, such as fully or in part by out-of-order execution engine 203 as described above. Out-of-order execution engine 580 may prepare instructions received from front end 570 for execution. Out-of-order execution engine 580 may include an allocate module 582. In one embodiment, allocate module 582 may allocate resources of processor 500 or other resources, such as registers or buffers, to execute a given instruction. Allocate module 582 may make allocations in schedulers, such as a memory scheduler, fast scheduler, or floating point scheduler. Such schedulers may be represented in FIG. 5B by resource schedulers 584. Allocate module 582 may be implemented fully or in part by the allocation logic described in conjunction with FIG. 2. Resource schedulers 584 may determine when an instruction is ready to execute based on the readiness of a given resource's sources and the availability of execution resources needed to execute an instruction. Resource schedulers 584 may be implemented by, for example, schedulers 202, 204, 206 as discussed above. Resource schedulers 584 may schedule the execution of instructions upon one or more resources. In one embodiment, such resources may be internal to core 502, and may be illustrated, for example, as resources 586. In another embodiment, such resources may be external to core 502 and may be accessible by, for example, cache hierarchy 503. Resources may include, for example, memory, caches, register files, or registers. Resources internal to core 502 may be represented by resources 586 in FIG. 5B. As necessary, values written to or read from resources 586 may be coordinated with other portions of processor 500 through, for example, cache hierarchy 503. As instructions are assigned resources, they may be placed into a reorder buffer 588. Reorder buffer 588 may track instructions as they are executed and may selectively reorder their execution based upon any suitable criteria of processor 500. In one embodiment, reorder buffer 588 may identify instructions or a series of instructions that may be executed independently. Such instructions or a series of instructions may be executed in parallel from other such instructions. Parallel execution in core 502 may be performed by any suitable number of separate execution blocks or virtual processors. In one embodiment, shared resources—such as memory, registers, and caches—may be accessible to multiple virtual processors within a given core 502. In other embodiments, shared resources may be accessible to multiple processing entities within processor 500.

Cache hierarchy 503 may be implemented in any suitable manner. For example, cache hierarchy 503 may include one or more lower or mid-level caches, such as caches 572, 574. In one embodiment, cache hierarchy 503 may include an LLC 595 communicatively coupled to caches 572, 574. In another embodiment, LLC 595 may be implemented in a module 590 accessible to all processing entities of processor 500. In a further embodiment, module 590 may be implemented in an uncore module of processors from Intel, Inc. Module 590 may include portions or subsystems of processor 500 necessary for the execution of core 502 but might not be implemented within core 502. Besides LLC 595, Module 590 may include, for example, hardware interfaces, memory coherency coordinators, interprocessor interconnects, instruction pipelines, or memory controllers. Access to RAM 599 available to processor 500 may be made through module 590 and, more specifically, LLC 595. Furthermore, other instances of core 502 may similarly access module 590. Coordination of the instances of core 502 may be facilitated in part through module 590.

Figure 6:
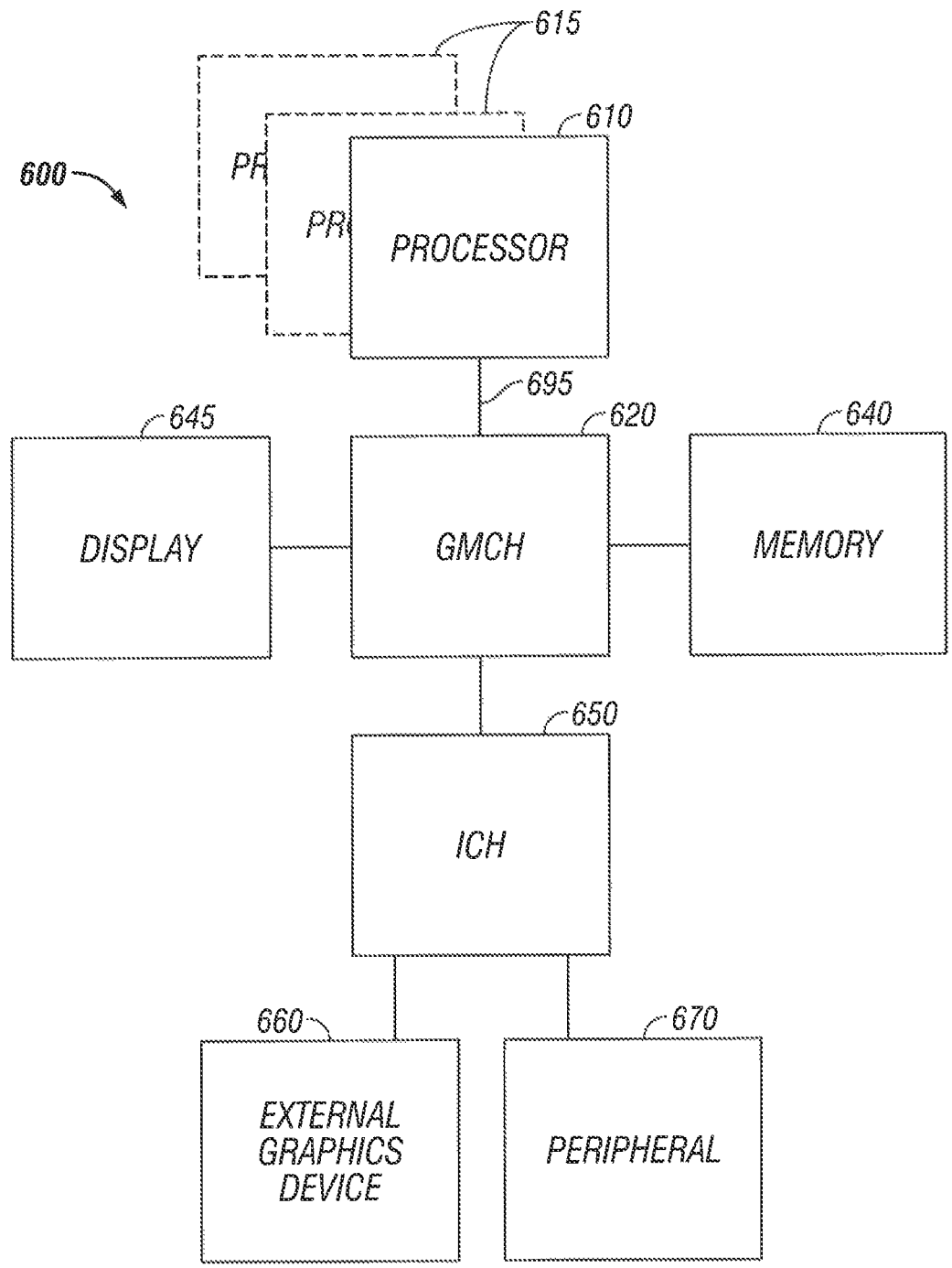
FIG. 6 is a block diagram of a system, in accordance with embodiments of the present disclosure.
Figure 7:
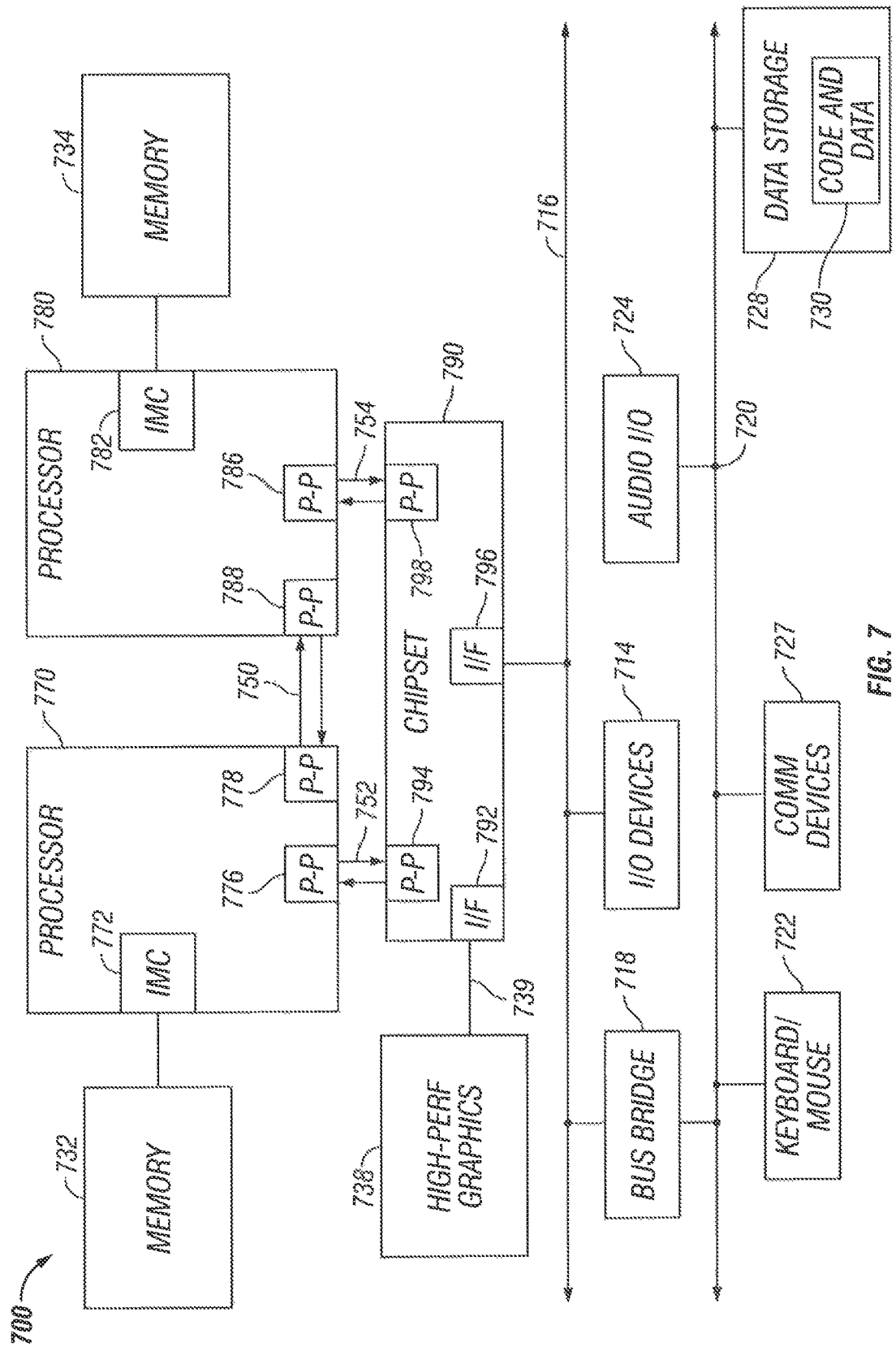
FIG. 7 is a block diagram of a second system, in accordance with embodiments of the present disclosure.
Figure 8:
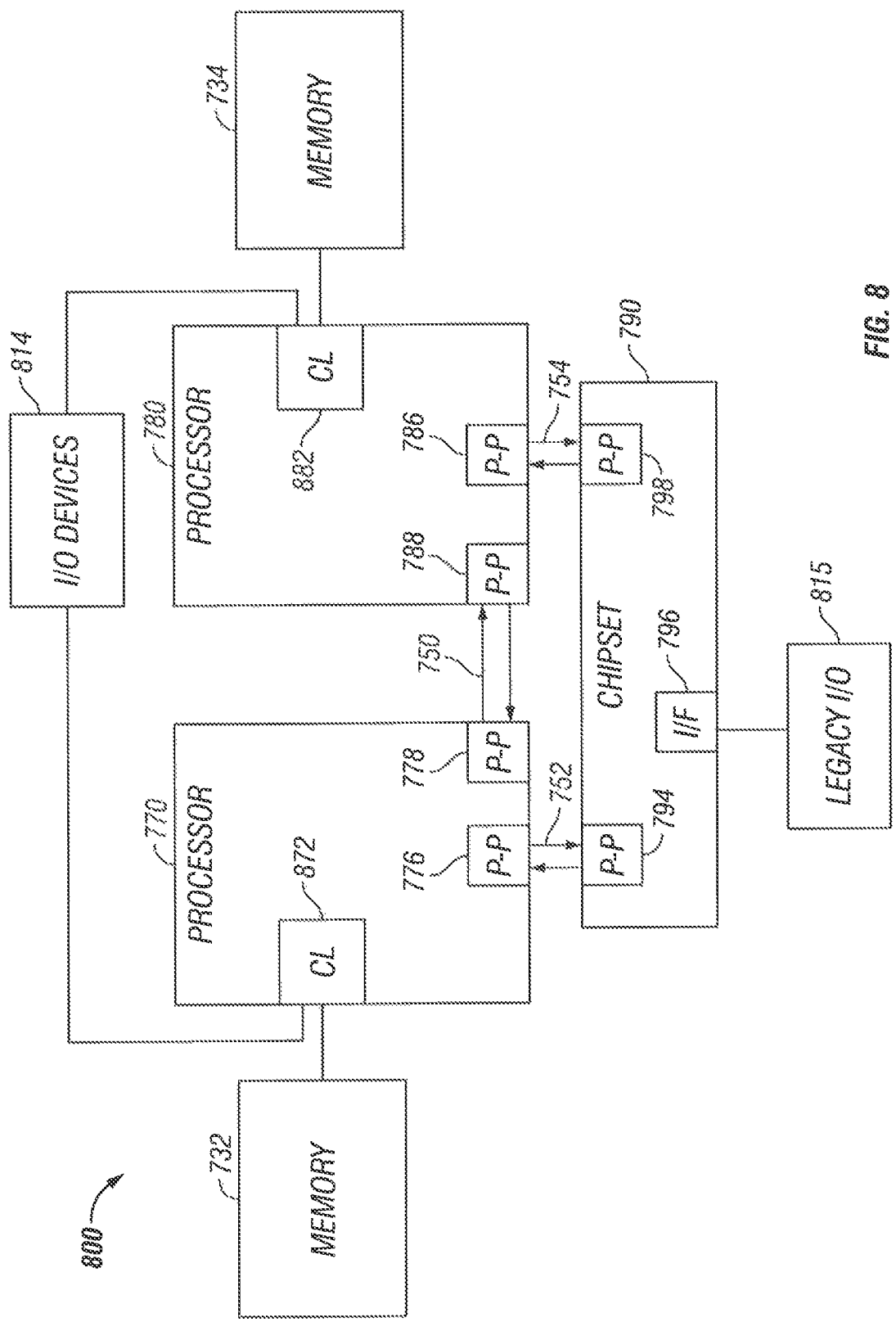
FIG. 8 is a block diagram of a third system in accordance with embodiments of the present disclosure.
Figure 9:
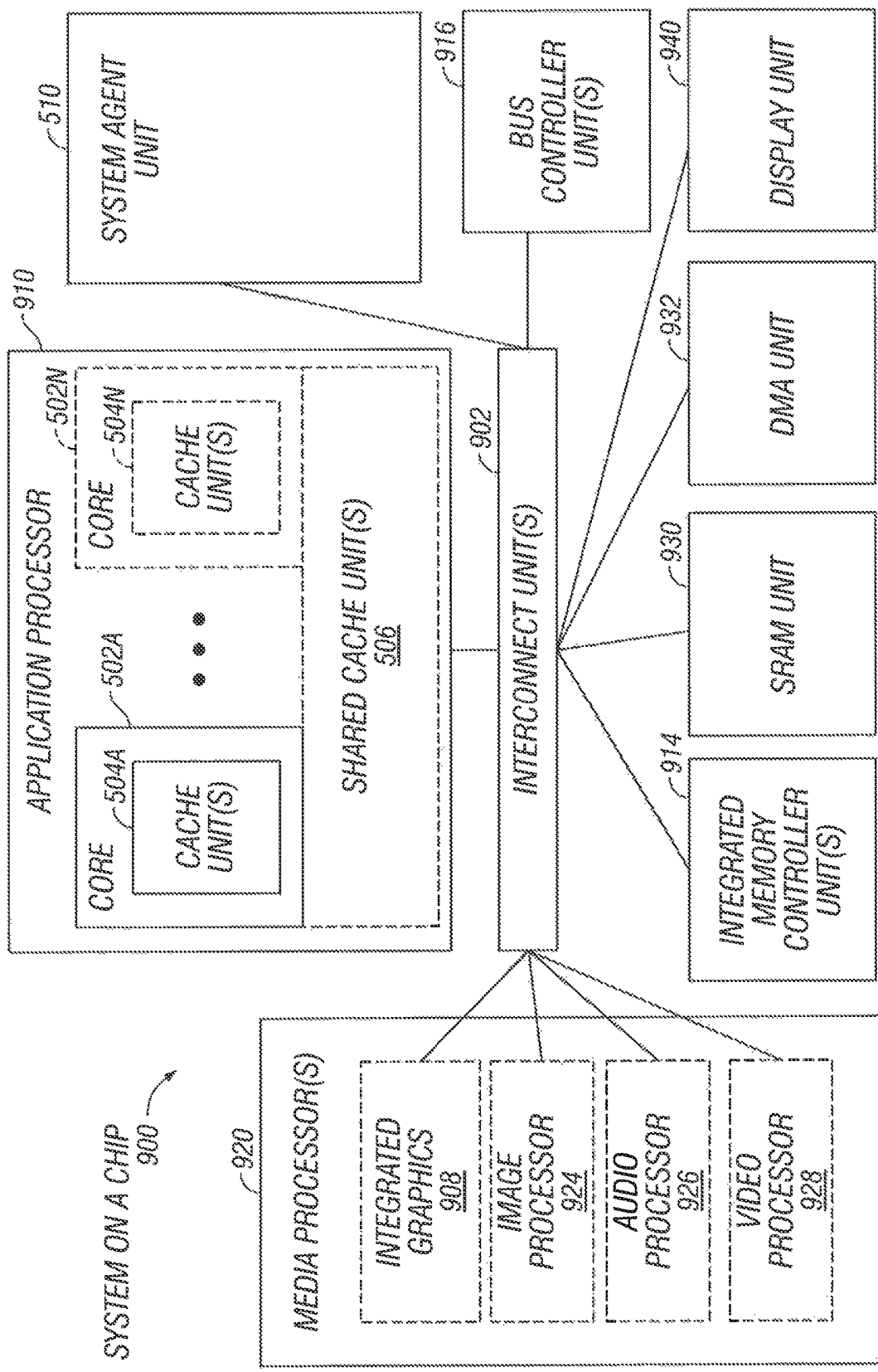
FIG. 9 is a block diagram of a system-on-a-chip, in accordance with embodiments of the present disclosure.

FIGS. 6-8 may illustrate exemplary systems suitable for including processor 500, while FIG. 9 may illustrate an exemplary system on a chip (SoC) that may include one or more of cores 502. Other system designs and implementations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable. In general, a huge variety of systems or electronic devices that incorporate a processor and/or other execution logic as disclosed herein may be generally suitable.

FIG. 6 illustrates a block diagram of a system 600, in accordance with embodiments of the present disclosure. System 600 may include one or more processors 610, 615, which may be coupled to graphics memory controller hub (GMCH) 620. The optional nature of additional processors 615 is denoted in FIG. 6 with broken lines.

Each processor 610,615 may be some version of processor 500. However, it should be noted that integrated graphics logic and integrated memory control units might not exist in processors 610,615. FIG. 6 illustrates that GMCH 620 may be coupled to a memory 640 that may be, for example, a dynamic random access memory (DRAM). The DRAM may, for at least one embodiment, be associated with a non-volatile cache.

GMCH 620 may be a chipset, or a portion of a chipset. GMCH 620 may communicate with processors 610, 615 and control interaction between processors 610, 615 and memory 640. GMCH 620 may also act as an accelerated bus interface between the processors 610, 615 and other elements of system 600. In one embodiment, GMCH 620 communicates with processors 610, 615 via a multi-drop bus, such as a frontside bus (FSB) 695.

Furthermore, GMCH 620 may be coupled to a display 645 (such as a flat panel display). In one embodiment, GMCH 620 may include an integrated graphics accelerator. GMCH 620 may be further coupled to an input/output (I/O) controller hub (ICH) 650, which may be used to couple various peripheral devices to system 600. External graphics device 660 may include a discrete graphics device coupled to ICH 650 along with another peripheral device 670.

In other embodiments, additional or different processors may also be present in system 600. For example, additional processors 610, 615 may include additional processors that may be the same as processor 610, additional processors that may be heterogeneous or asymmetric to processor 610, accelerators (such as, e.g., graphics accelerators or digital signal processing (DSP) units), field programmable gate arrays, or any other processor. There may be a variety of differences between the physical resources 610, 615 in terms of a spectrum of metrics of merit including architectural, micro-architectural, thermal, power consumption characteristics, and the like. These differences may effectively manifest themselves as asymmetry and heterogeneity amongst processors 610, 615. For at least one embodiment, various processors 610, 615 may reside in the same die package.

FIG. 7 illustrates a block diagram of a second system 700, in accordance with embodiments of the present disclosure. As shown in FIG. 7, multiprocessor system 700 may include a point-to-point interconnect system, and may include a first processor 770 and a second processor 780 coupled via a point-to-point interconnect 750. Each of processors 770 and 780 may be some version of processor 500 as one or more of processors 610,615.

While FIG. 7 may illustrate two processors 770, 780, it is to be understood that the scope of the present disclosure is not so limited. In other embodiments, one or more additional processors may be present in a given processor.

Processors 770 and 780 are shown including integrated memory controller units 772 and 782, respectively. Processor 770 may also include as part of its bus controller units point-to-point (P-P) interfaces 776 and 778; similarly, second processor 780 may include P-P interfaces 786 and 788. Processors 770, 780 may exchange information via a point-to-point (P-P) interface 750 using P-P interface circuits 778, 788. As shown in FIG. 7, IMCs 772 and 782 may couple the processors to respective memories, namely a memory 732 and a memory 734, which in one embodiment may be portions of main memory locally attached to the respective processors.

Processors 770, 780 may each exchange information with a chipset 790 via individual P-P interfaces 752, 754 using point to point interface circuits 776, 794, 786, 798. In one embodiment, chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures may be possible. For example, instead of the point-to-point architecture of FIG. 7, a system may implement a multi-drop bus or other such architecture.

FIG. 8 illustrates a block diagram of a third system 800 in accordance with embodiments of the present disclosure. Like elements in FIGS. 7 and 8 bear like reference numerals, and certain aspects of FIG. 7 have been omitted from FIG. 8 in order to avoid obscuring other aspects of FIG. 8.

FIG. 8 illustrates that processors 770, 780 may include integrated memory and I/O control logic ("CL") 872 and 882, respectively. For at least one embodiment, CL 872, 882 may include integrated memory controller units such as that described above in connection with FIGS. 5 and 7. In addition. CL 872, 882 may also include I/O control logic. FIG. 8 illustrates that not only memories 732, 734 may be coupled to CL 872, 882, but also that I/O devices 814 may also be coupled to control logic 872, 882. Legacy I/O devices 815 may be coupled to chipset 790.

FIG. 9 illustrates a block diagram of a SoC 900, in accordance with embodiments of the present disclosure. Similar elements in FIG. 5 bear like reference numerals. Also, dashed lined boxes may represent optional features on more advanced SoCs. An interconnect units 902 may be coupled to: an application processor 910 which may include a set of one or more cores 502A-N and shared cache units 506; a system agent unit 510; a bus controller units 916; an integrated memory controller units 914; a set of one or more media processors 920 which may include integrated graphics logic 908, an image processor 924 for providing still and/or video camera functionality, an audio processor 926 for providing hardware audio acceleration, and a video processor 928 for providing video encode/decode accelera-tion; an static random access memory (SRAM) unit 930; a direct memory access (DMA) unit 932; and a display unit 940 for coupling to one or more external displays.

Figure 10:
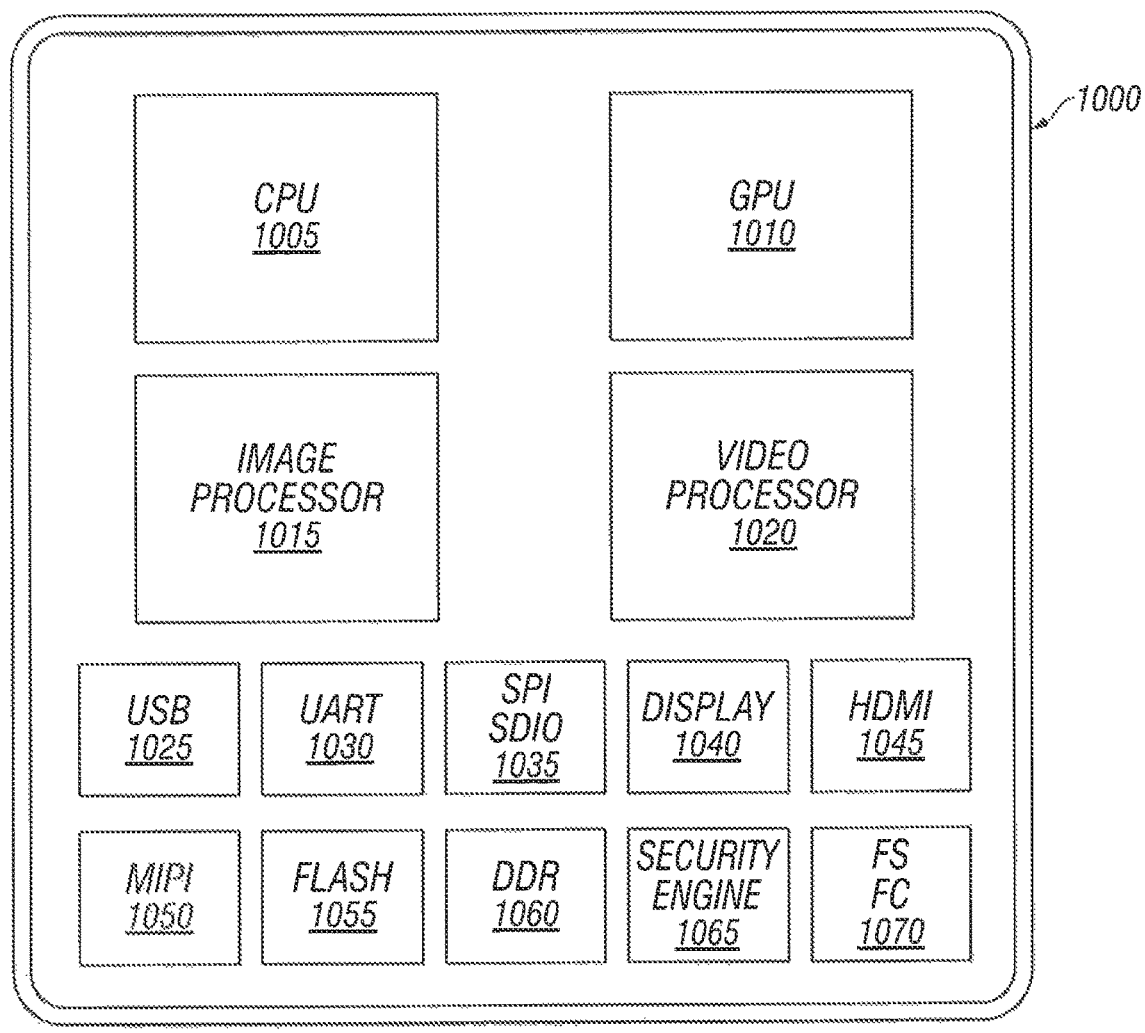
FIG. 10 illustrates a processor containing a central processing unit and a graphics processing unit which may perform at least one instruction, in accordance with embodiments of the present disclosure.

FIG. 10 illustrates a processor containing a central processing unit (CPU) and a graphics processing unit (GPU), which may perform at least one instruction, in accordance with embodiments of the present disclosure. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, memory interface controller 1045, MIPI controller 1050, flash memory controller 1055, dual data rate (DDR) controller 1060, security engine 1065, and $I^2S/I^2C$ controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine-readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
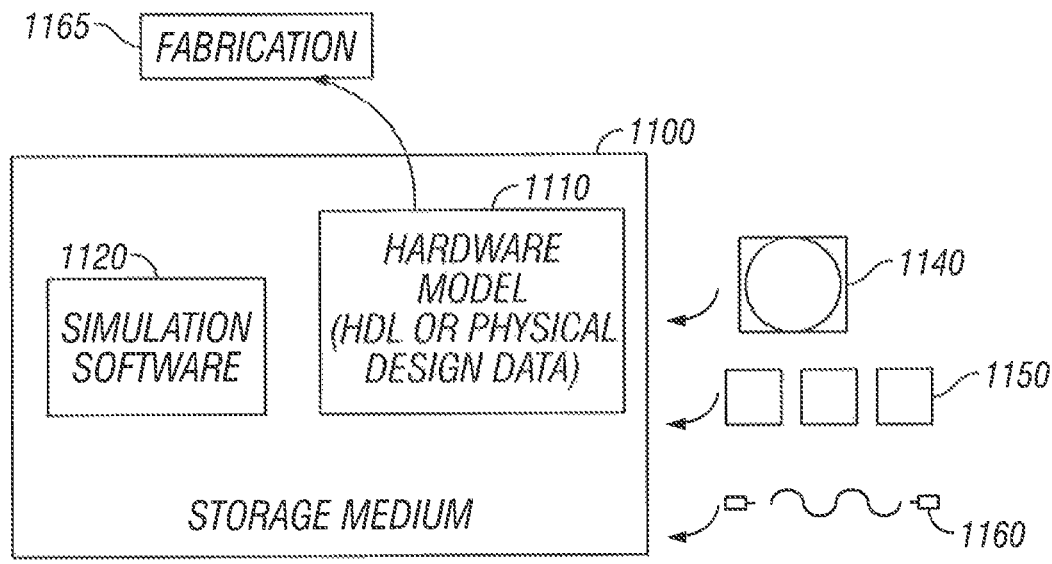
FIG. 11 is a block diagram illustrating the development of IP cores, in accordance with embodiments of the present disclosure.

FIG. 11 illustrates a block diagram illustrating the development of IP cores, in accordance with embodiments of the present disclosure. Storage 1100 may include simulation software 1120 and/or hardware or software model 1110. In one embodiment, the data representing the IP core design may be provided to storage 1100 via memory 1140 (e.g., hard disk), wired connection (e.g., internet) 1150 or wireless connection 1160. The IP core information generated by the simulation tool and model may then be transmitted to a fabrication facility 1165 where it may be fabricated by a 3$^{rd}$ party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
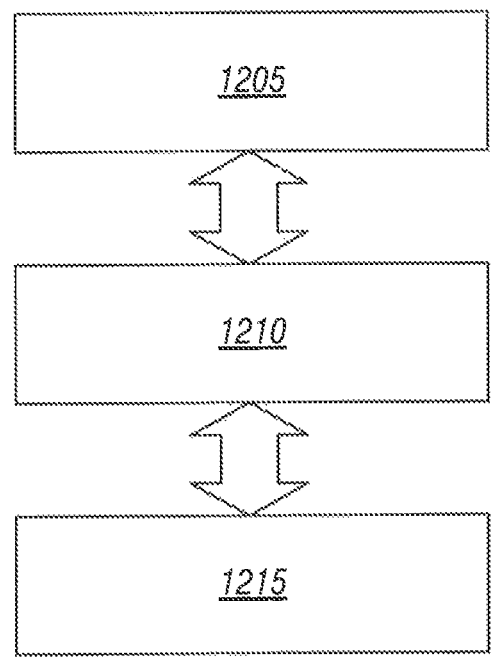
FIG. 12 illustrates how an instruction of a first type may be emulated by a processor of a different type, in accordance with embodiments of the present disclosure.

FIG. 12 illustrates how an instruction of a first type may be emulated by a processor of a different type, in accordance with embodiments of the present disclosure. In FIG. 12, program 1205 contains some instructions that may perform the same or substantially the same function as an instruction according to one embodiment. However the instructions of program 1205 may be of a type and/or format that is different from or incompatible with processor 1215, meaning the instructions of the type in program 1205 may not be able to execute natively by the processor 1215. However, with the help of emulation logic, 1210, the instructions of program 1205 may be translated into instructions that may be natively be executed by the processor 1215. In one embodiment, the emulation logic may be embodied in hardware. In another embodiment, the emulation logic may be embodied in a tangible, machine-readable medium containing software to translate instructions of the type in program 1205 into the type natively executable by processor 1215. In other embodiments, emulation logic may be a combination of fixed-function or programmable hardware and a program stored on a tangible, machine-readable medium. In one embodiment, the processor contains the emulation logic, whereas in other embodiments, the emulation logic exists outside of the processor and may be provided by a third party. In one embodiment, the processor may load the emulation logic embodied in a tangible, machine-readable medium containing software by executing microcode or firmware contained in or associated with the processor.

Figure 13:
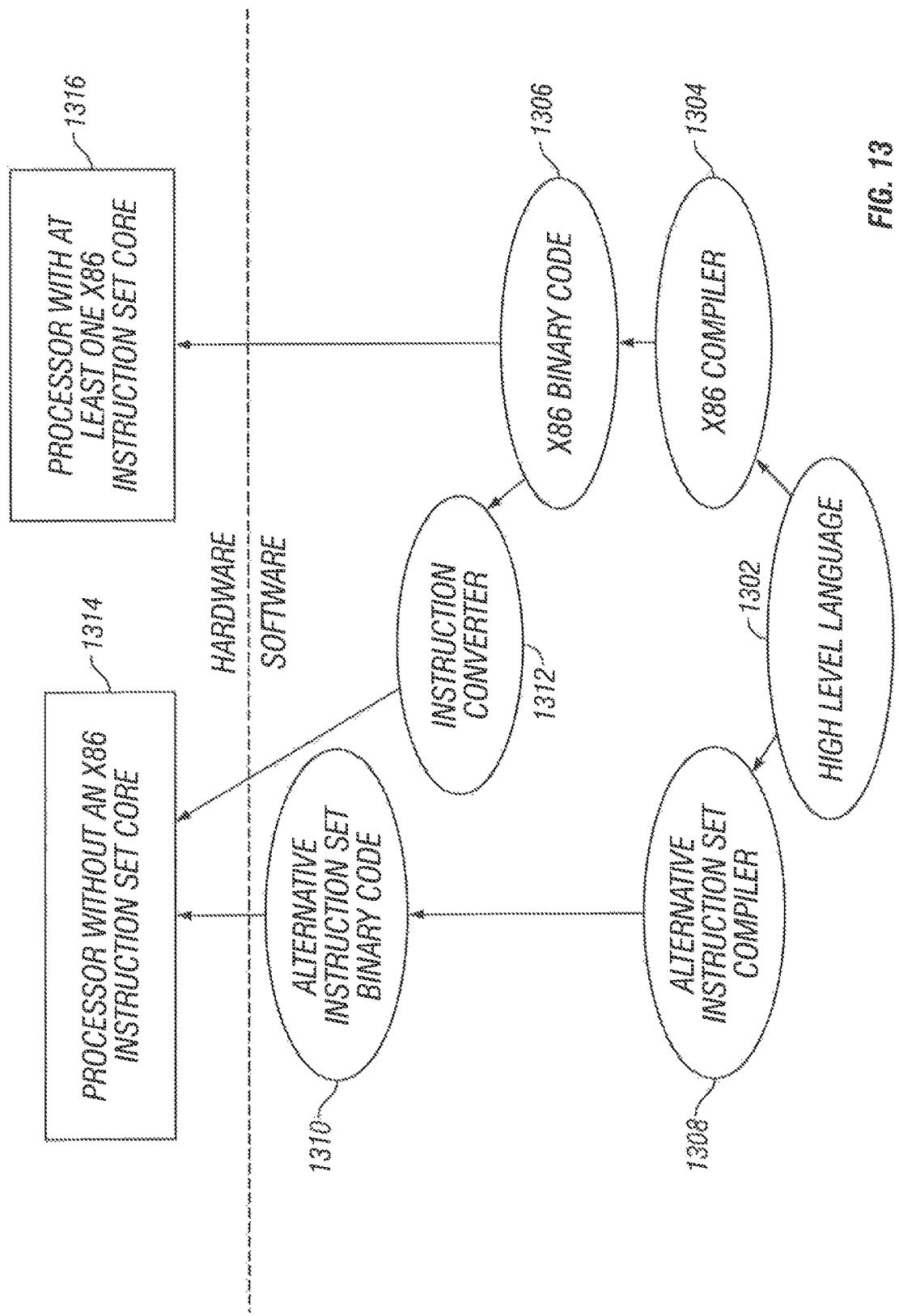
FIG. 13 illustrates a block diagram contrasting the use of a software instruction converter to convert binary instructions in a source instruction set to binary instructions in a target instruction set, in accordance with embodiments of the present disclosure.

FIG. 13 illustrates a block diagram contrasting the use of a software instruction converter to convert binary instructions in a source instruction set to binary instructions in a target instruction set, in accordance with embodiments of the present disclosure. In the illustrated embodiment, the instruction converter may be a software instruction converter, although the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. x86 compiler 1304 represents a compiler that may be operable to generate x86 binary code 1306 (e.g., object code) that may, with or without additional linkage processing, be executed on the processor with at least one x86 instruction set core 1316. Similarly, FIG. 13 shows the program in high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). Instruction converter 1312 may be used to convert x86 binary code 1306 into code that may be natively executed by the processor without an x86 instruction set core 1314. This converted code might not be the same as alternative instruction set binary code 1310; however, the converted code will accomplish the general operation and be made up of instructions from the alternative instruction set. Thus, instruction converter 1312 represents software, firmware, hardware, or a combination thereof that, through emulation, simulation or any other process, allows a processor or other electronic device that does not have an x86 instruction set processor or core to execute x86 binary code 1306.

Figure 14:
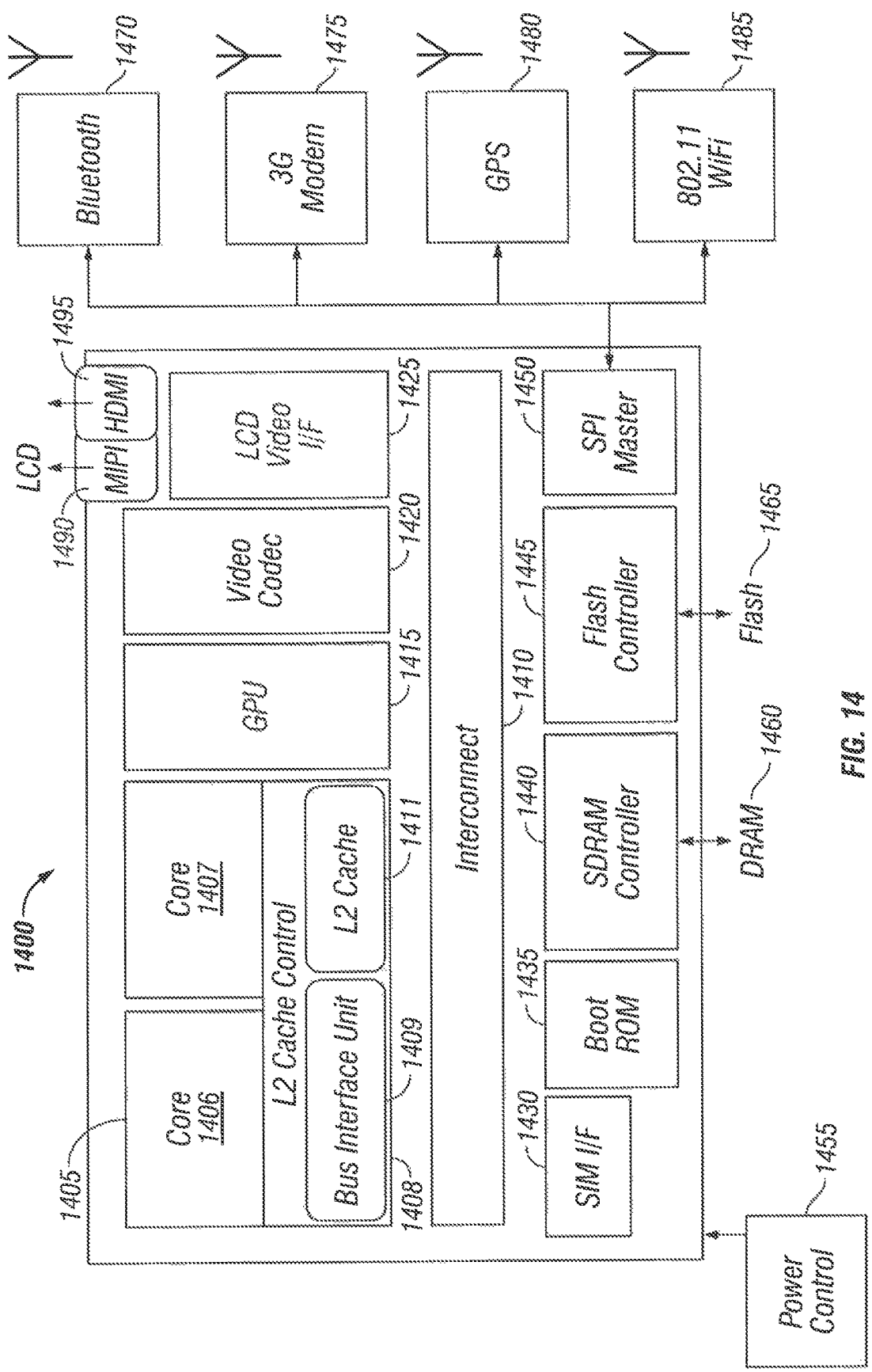
FIG. 14 is a block diagram of an instruction set architecture of a processor, in accordance with embodiments of the present disclosure.

FIG. 14 is a block diagram of an instruction set architecture 1400 of a processor, in accordance with embodiments of the present disclosure. Instruction set architecture 1400 may include any suitable number or kind of components.

For example, instruction set architecture 1400 may include processing entities such as one or more cores 1406, 1407 and a graphics processing unit 1415. Cores 1406, 1407 may be communicatively coupled to the rest of instruction set architecture 1400 through any suitable mechanism, such as through a bus or cache. In one embodiment, cores 1406, 1407 may be communicatively coupled through an L2 cache control 1408, which may include a bus interface unit 1409 and an L2 cache 1411. Cores 1406, 1407 and graphics processing unit 1415 may be communicatively coupled to each other and to the remainder of instruction set architecture 1400 through interconnect 1410. In one embodiment, graphics processing unit 1415 may use a video code 1420 defining the manner in which particular video signals will be encoded and decoded for output.

Instruction set architecture 1400 may also include any number or kind of interfaces, controllers, or other mechanisms for interfacing or communicating with other portions of an electronic device or system. Such mechanisms may facilitate interaction with, for example, peripherals, communications devices, other processors, or memory. In the example of FIG. 14, instruction set architecture 1400 may include a liquid crystal display (LCD) video interface 1425, a subscriber interface module (SIM) interface 1430, a boot ROM interface 1435, a synchronous dynamic random access memory (SDRAM) controller 1440, a flash controller 1445, and a serial peripheral interface (SPI) master unit 1450. LCD video interface 1425 may provide output of video signals from, for example, GPU 1415 and through, for example, a mobile industry processor interface (MIPI) 1490 or a high-definition multimedia interface (HDMI) 1495 to a display. Such a display may include, for example, an LCD. SIM interface 1430 may provide access to or from a SIM card or device. SDRAM controller 1440 may provide access to or from memory such as an SDRAM chip or module 1460. Flash controller 1445 may provide access to or from memory such as flash memory 1465 or other instances of RAM. SPI master unit 1450 may provide access to or from communications modules, such as a Bluetooth module 1470, high-speed 3G modem 1475, global positioning system module 1480, or wireless module 1485 implementing a communications standard such as 802.11.

Figure 15:
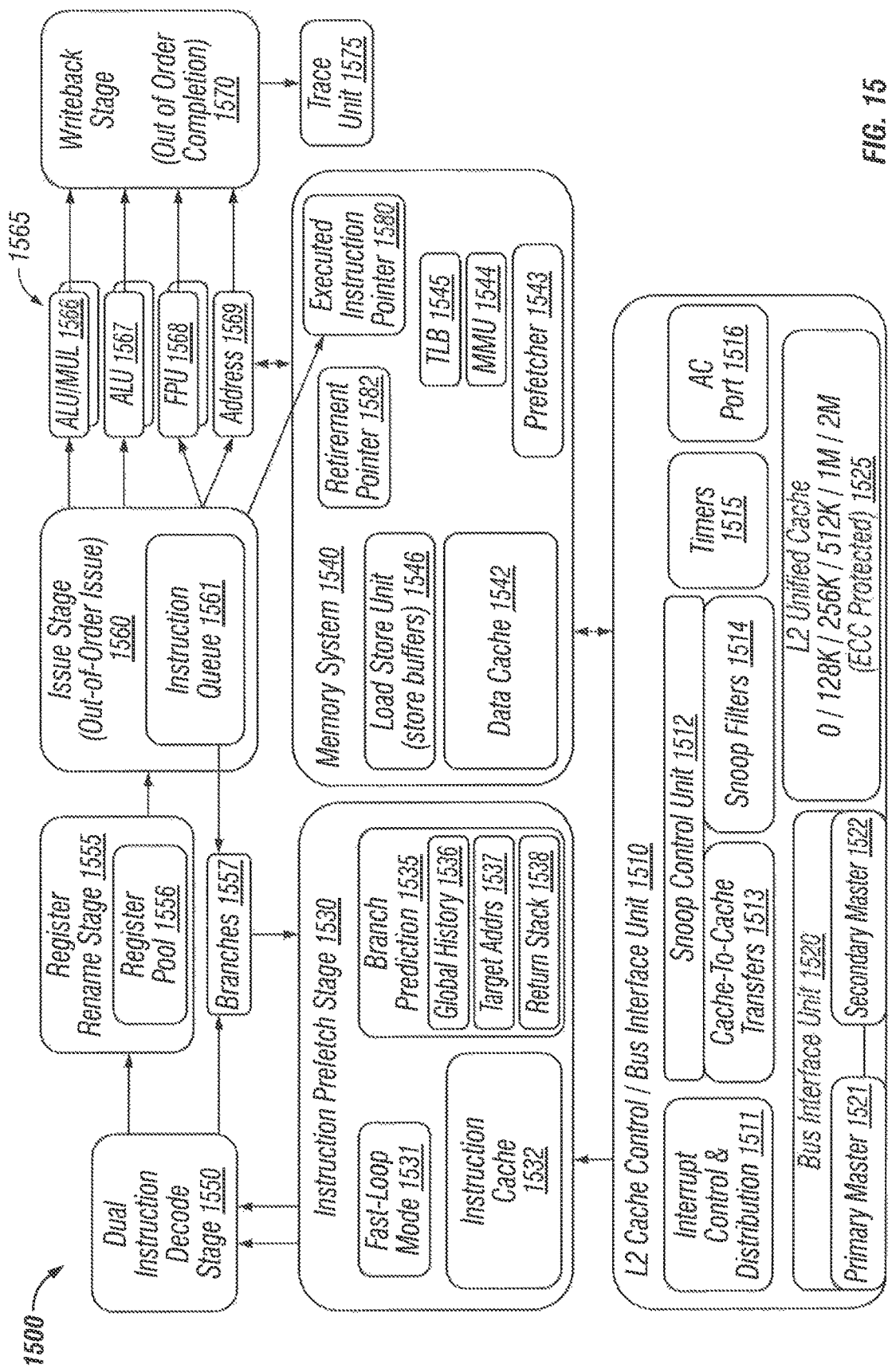
FIG. 15 is a more detailed block diagram of an instruction set architecture of a processor, in accordance with embodiments of the present disclosure.

FIG. 15 is a more detailed block diagram of an instruction set architecture 1500 of a processor, in accordance with embodiments of the present disclosure. Instruction architecture 1500 may implement one or more aspects of instruction set architecture 1400. Furthermore, instruction set architecture 1500 may illustrate modules and mechanisms for the execution of instructions within a processor.

Instruction architecture 1500 may include a memory system 1540 communicatively coupled to one or more execution entities 1565. Furthermore, instruction architecture 1500 may include a caching and bus interface unit such as unit 1510 communicatively coupled to execution entities 1565 and memory system 1540. In one embodiment, loading of instructions into execution entities 1565 may be performed by one or more stages of execution. Such stages may include, for example, instruction prefetch stage 1530, dual instruction decode stage 1550, register rename stage 1555, issue stage 1560, and writeback stage 1570.

In one embodiment, memory system 1540 may include an executed instruction pointer 1580. Executed instruction pointer 1580 may store a value identifying the oldest, undispatched instruction within a batch of instructions. The oldest instruction may correspond to the lowest Program Order (PO) value. A PO may include a unique number of an instruction. Such an instruction may be a single instruction within a thread represented by multiple strands. A PO may be used in ordering instructions to ensure correct execution semantics of code. A PO may be reconstructed by mechanisms such as evaluating increments to PO encoded in the instruction rather than an absolute value. Such a reconstructed PO may be known as an "RPO." Although a PO may be referenced herein, such a PO may be used interchangeably with an RPO. A strand may include a sequence of instructions that are data dependent upon each other. The strand may be arranged by a binary translator at compilation time. Hardware executing a strand may execute the instructions of a given strand in order according to the PO of the various instructions. A thread may include multiple strands such that instructions of different strands may depend upon each other. A PO of a given strand may be the PO of the oldest instruction in the strand which has not yet been dispatched to execution from an issue stage. Accordingly, given a thread of multiple strands, each strand including instructions ordered by PO, executed instruction pointer 1580 may store the oldest—illustrated by the lowest number—PO in the thread.

In another embodiment, memory system 1540 may include a retirement pointer 1582. Retirement pointer 1582 may store a value identifying the PO of the last retired instruction. Retirement pointer 1582 may be set by, for example, retirement unit 454. If no instructions have yet been retired, retirement pointer 1582 may include a null value.

Execution entities 1565 may include any suitable number and kind of mechanisms by which a processor may execute instructions. In the example of FIG. 15, execution entities 1565 may include ALU/multiplication units (MUL) 1566, ALUs 1567, and floating point units (FPU) 1568. In one embodiment, such entities may make use of information contained within a given address 1569. Execution entities 1565 in combination with stages 1530, 1550, 1555, 1560, 1570 may collectively form an execution unit.

Unit 1510 may be implemented in any suitable manner. In one embodiment, unit 1510 may perform cache control. In such an embodiment, unit 1510 may thus include a cache 1525. Cache 1525 may be implemented, in a further embodiment, as an L2 unified cache with any suitable size, such as zero, 128 k, 256 k, 512 k, 1M, or 2M bytes of memory. In another, further embodiment, cache 1525 may be implemented in error-correcting code memory. In another embodiment, unit 1510 may perform bus interfacing to other portions of a processor or electronic device. In such an embodiment, unit 1510 may thus include a bus interface unit 1520 for communicating over an interconnect, intraprocessor bus, interprocessor bus, or other communication bus, port, or line. Bus interface unit 1520 may provide interfacing in order to perform, for example, generation of the memory and input/output addresses for the transfer of data between execution entities 1565 and the portions of a system external to instruction architecture 1500.

To further facilitate its functions, bus interface unit 1520 may include an interrupt control and distribution unit 1511 for generating interrupts and other communications to other portions of a processor or electronic device. In one embodiment, bus interface unit 1520 may include a snoop control unit 1512 that handles cache access and coherency for multiple processing cores. In a further embodiment, to provide such functionality, snoop control unit 1512 may include a cache-to-cache transfer unit that handles information exchanges between different caches. In another, further embodiment, snoop control unit 1512 may include one or more snoop filters 1514 that monitors the coherency of other caches (not shown) so that a cache controller, such as unit 1510, does not have to perform such monitoring directly. Unit 1510 may include any suitable number of timers 1515 for synchronizing the actions of instruction architecture 1500. Also, unit 1510 may include an AC port 1516.

Memory system 1540 may include any suitable number and kind of mechanisms for storing information for the processing needs of instruction architecture 1500. In one embodiment, memory system 1540 may include a load store unit 1546 for storing information such as buffers written to or read back from memory or registers. In another embodiment, memory system 1540 may include a translation lookaside buffer (TLB) 1545 that provides look-up of address values between physical and virtual addresses. In yet another embodiment, memory system 1540 may include a memory management unit (MMU) 1544 for facilitating access to virtual memory. In still yet another embodiment, memory system 1540 may include a prefetcher 1543 for requesting instructions from memory before such instructions are actually needed to be executed, in order to reduce latency.

The operation of instruction architecture 1500 to execute an instruction may be performed through different stages. For example, using unit 1510 instruction prefetch stage 1530 may access an instruction through prefetcher 1543. Instructions retrieved may be stored in instruction cache 1532. Prefetch stage 1530 may enable an option 1531 for fast-loop mode, wherein a series of instructions forming a loop that is small enough to fit within a given cache are executed. In one embodiment, such an execution may be performed without needing to access additional instructions from, for example, instruction cache 1532. Determination of what instructions to prefetch may be made by, for example, branch prediction unit 1535, which may access indications of execution in global history 1536, indications of target addresses 1537, or contents of a return stack 1538 to determine which of branches 1557 of code will be executed next. Such branches may be possibly prefetched as a result. Branches 1557 may be produced through other stages of operation as described below. Instruction prefetch stage 1530 may provide instructions as well as any predictions about future instructions to dual instruction decode stage 1550.

Dual instruction decode stage 1550 may translate a received instruction into microcode-based instructions that may be executed. Dual instruction decode stage 1550 may simultaneously decode two instructions per clock cycle. Furthermore, dual instruction decode stage 1550 may pass its results to register rename stage 1555. In addition, dual instruction decode stage 1550 may determine any resulting branches from its decoding and eventual execution of the microcode. Such results may be input into branches 1557.

Register rename stage 1555 may translate references to virtual registers or other resources into references to physical registers or resources. Register rename stage 1555 may include indications of such mapping in a register pool 1556. Register rename stage 1555 may alter the instructions as received and send the result to issue stage 1560.

Issue stage 1560 may issue or dispatch commands to execution entities 1565. Such issuance may be performed in an out-of-order fashion. In one embodiment, multiple instructions may be held at issue stage 1560 before being executed. Issue stage 1560 may include an instruction queue 1561 for holding such multiple commands. Instructions may be issued by issue stage 1560 to a particular processing entity 1565 based upon any acceptable criteria, such as availability or suitability of resources for execution of a given instruction. In one embodiment, issue stage 1560 may reorder the instructions within instruction queue 1561 such that the first instructions received might not be the first instructions executed. Based upon the ordering of instruction queue 1561, additional branching information may be provided to branches 1557. Issue stage 1560 may pass instructions to executing entities 1565 for execution.

Upon execution, writeback stage 1570 may write data into registers, queues, or other structures of instruction set architecture 1500 to communicate the completion of a given command. Depending upon the order of instructions arranged in issue stage 1560, the operation of writeback stage 1570 may enable additional instructions to be executed. Performance of instruction set architecture 1500 may be monitored or debugged by trace unit 1575.

Figure 16:
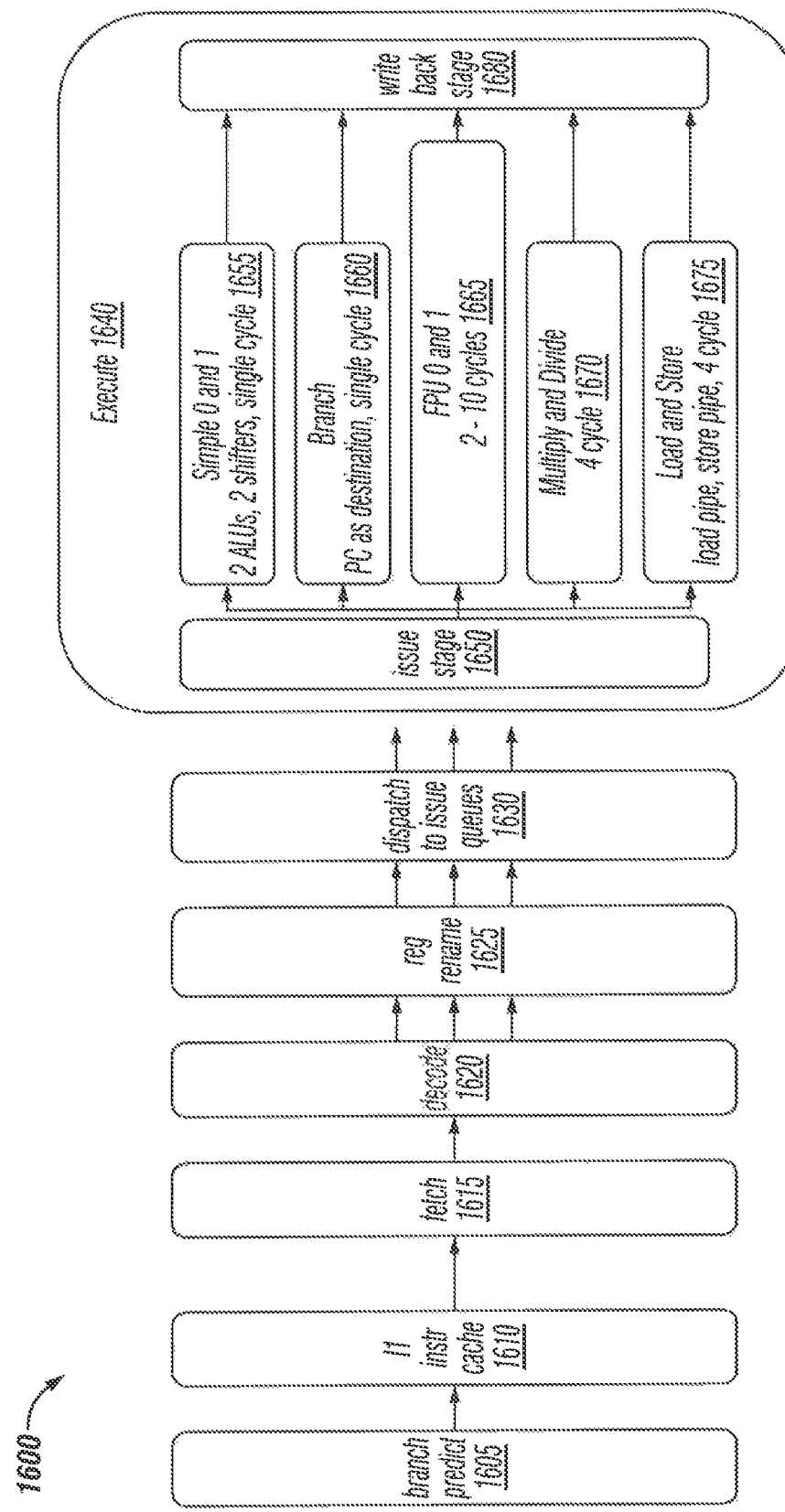
FIG. 16 is a block diagram of an execution pipeline for an instruction set architecture of a processor, in accordance with embodiments of the present disclosure.

FIG. 16 is a block diagram of an execution pipeline 1600 for an instruction set architecture of a processor, in accordance with embodiments of the present disclosure. Execution pipeline 1600 may illustrate operation of, for example, instruction architecture 1500 of FIG. 15.

Execution pipeline 1600 may include any suitable combination of steps or operations. In 1605, predictions of the branch that is to be executed next may be made. In one embodiment, such predictions may be based upon previous executions of instructions and the results thereof. In 1610, instructions corresponding to the predicted branch of execution may be loaded into an instruction cache. In 1615, one or more such instructions in the instruction cache may be fetched for execution. In 1620, the instructions that have been fetched may be decoded into microcode or more specific machine language. In one embodiment, multiple instructions may be simultaneously decoded. In 1625, references to registers or other resources within the decoded instructions may be reassigned. For example, references to virtual registers may be replaced with references to corresponding physical registers. In 1630, the instructions may be dispatched to queues for execution. In 1640, the instructions may be executed. Such execution may be performed in any suitable manner. In 1650, the instructions may be issued to a suitable execution entity. The manner in which the instruction is executed may depend upon the specific entity executing the instruction. For example, at 1655, an ALU may perform arithmetic functions. The ALU may utilize a single clock cycle for its operation, as well as two shifters. In one embodiment, two ALUs may be employed, and thus two instructions may be executed at 1655. At 1660, a determination of a resulting branch may be made. A program counter may be used to designate the destination to which the branch will be made. 1660 may be executed within a single clock cycle. At 1665, floating point arithmetic may be performed by one or more FPUs. The floating point operation may require multiple clock cycles to execute, such as two to ten cycles. At 1670, multiplication and division operations may be performed. Such operations may be performed in four clock cycles. At 1675, loading and storing operations to registers or other portions of pipeline 1600 may be performed. The operations may include loading and storing addresses. Such operations may be performed in four clock cycles. At 1680, write-back operations may be performed as required by the resulting operations of 1655-1675.

Figure 17:
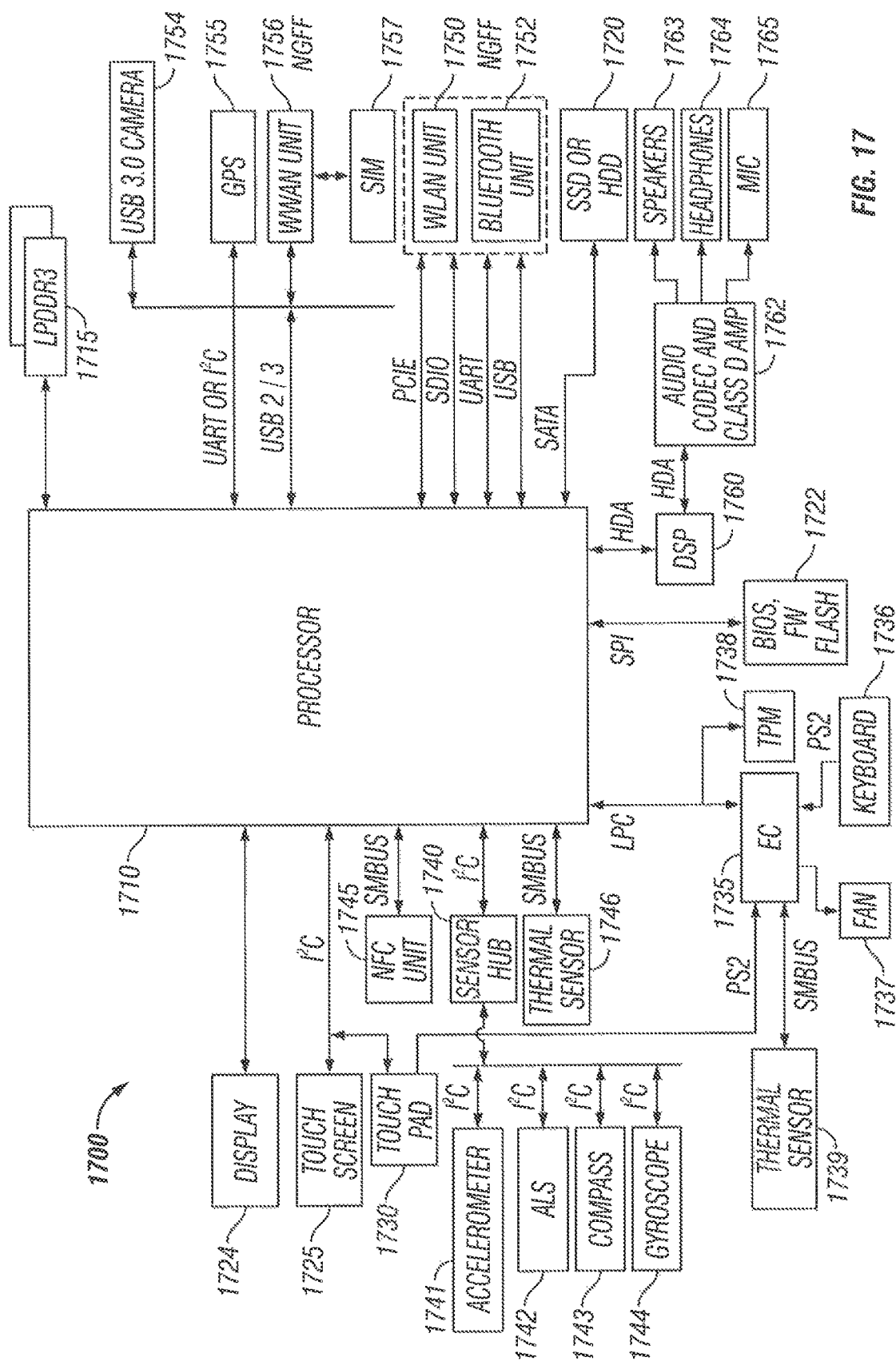
FIG. 17 is a block diagram of an electronic device for utilizing a processor, in accordance with embodiments of the present disclosure.

FIG. 17 is a block diagram of an electronic device 1700 for utilizing a processor 1710, in accordance with embodiments of the present disclosure. Electronic device 1700 may include, for example, a notebook, an ultrabook, a computer, a tower server, a rack server, a blade server, a laptop, a desktop, a tablet, a mobile device, a phone, an embedded computer, or any other suitable electronic device.

Electronic device 1700 may include processor 1710 communicatively coupled to any suitable number or kind of components, peripherals, modules, or devices. Such coupling may be accomplished by any suitable kind of bus or interface, such as $I^2C$ bus, system management bus (SMBus), low pin count (LPC) bus, SPI, high definition audio (HDA) bus, Serial Advance Technology Attachment (SATA) bus, USB bus (versions 1, 2, 3), or Universal Asynchronous Receiver/Transmitter (UART) bus.

Such components may include, for example, a display 1724, a touch screen 1725, a touch pad 1730, a near field communications (NFC) unit 1745, a sensor hub 1740, a thermal sensor 1746, an express chipset (EC) 1735, a trusted platform module (TPM) 1738, BIOS/firmware/flash memory 1722, a digital signal processor 1760, a drive 1720 such as a solid state disk (SSD) or a hard disk drive (HDD), a wireless local area network (WLAN) unit 1750, a Bluetooth unit 1752, a wireless wide area network (WWAN) unit 1756, a global positioning system (GPS) 1775, a camera 1754 such as a USB 3.0 camera, or a low power double data rate (LPDDR) memory unit 1715 implemented in, for example, the LPDDR3 standard. These components may each be implemented in any suitable manner.

Furthermore, in various embodiments other components may be communicatively coupled to processor 1710 through the components discussed above. For example, an accelerometer 1741, ambient light sensor (ALS) 1742, compass 1743, and gyroscope 1744 may be communicatively coupled to sensor hub 1740. A thermal sensor 1739, fan 1737, keyboard 1736, and touch pad 1730 may be communicatively coupled to EC 1735. Speakers 1763, headphones 1764, and a microphone 1765 may be communicatively coupled to an audio unit 1762, which may in turn be communicatively coupled to DSP 1760. Audio unit 1762 may include, for example, an audio codec and a class D amplifier. A SIM card 1757 may be communicatively coupled to WWAN unit 1756. Components such as WLAN unit 1750 and Bluetooth unit 1752, as well as WWAN unit 1756 may be implemented in a next generation form factor (NGFF).

Figure 18:
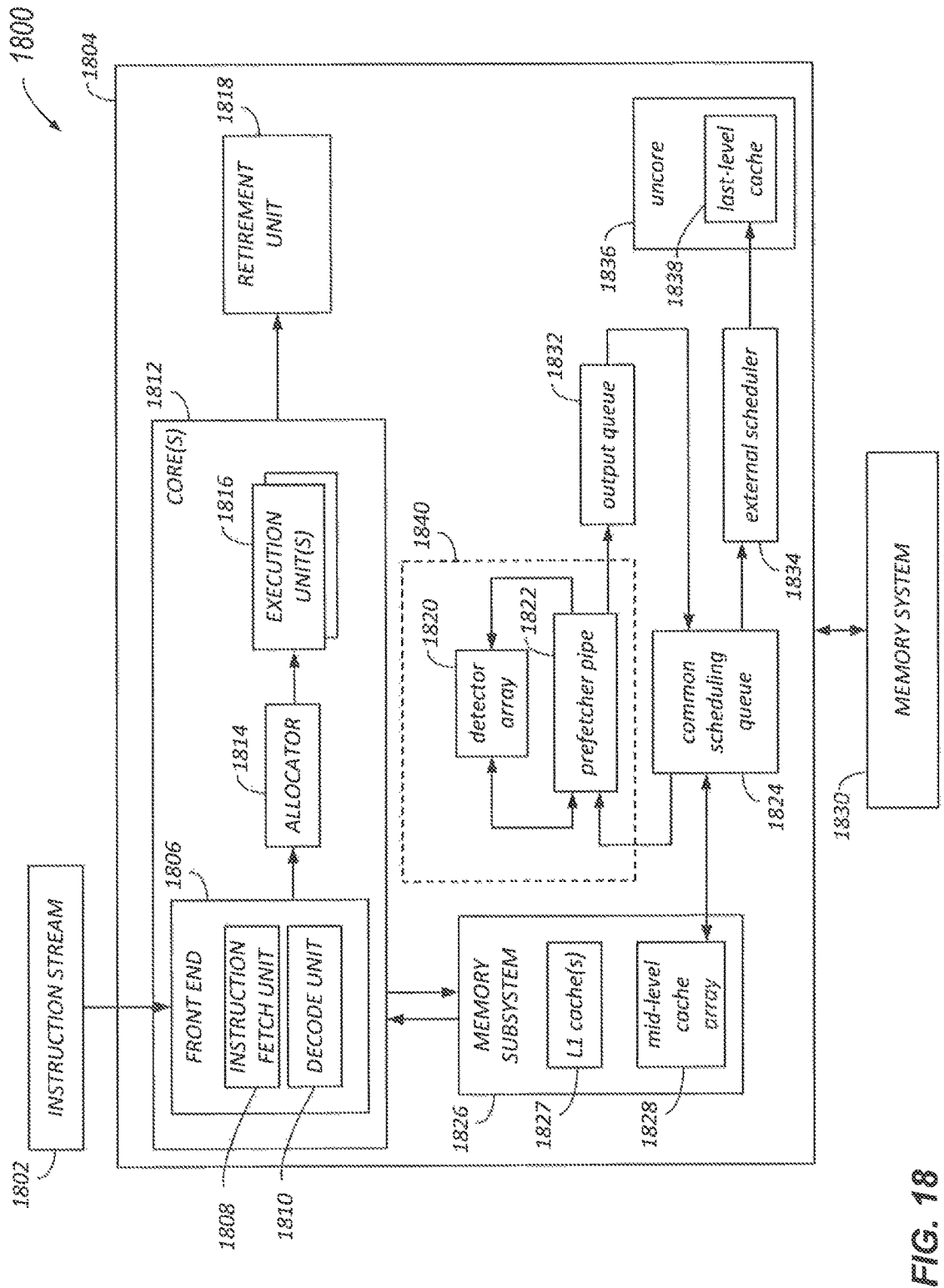
FIG. 18 is an illustration of an example system for performing pipelined prefetching to advance multiple data streams in parallel, according to embodiments of the present disclosure.

Embodiments of the present disclosure involve a processing apparatus and processing logic or circuitry for performing pipelined prefetching to advance multiple data streams in parallel. FIG. 18 is an illustration of an example system 1800 for performing pipelined prefetching to advance multiple data streams in parallel, according to embodiments of the present disclosure. Embodiments of the present disclosure, such as system 1800, may include an aggressive multi-level stream prefetcher, shown as pipelined prefetcher 1840. The use of pipelined prefetcher 1840 may reduce the latency of accesses over a steady stream of consecutive addresses, without being constrained by the level of memory parallelism and available buffers. For example, pipelined prefetcher 1840 may advance along consecutive data streams (sometimes referred to herein as "homelines") in parallel over multiple tracking points at various depths. Each homeline may correspond to one of multiple caching levels, such that the front "wave" of prefetches serves in reducing the latency of the second wave of prefetches, and so on. In at least some embodiments, pipelined prefetcher 1840 may dispatch prefetches in parallel from the multiple fronts, while retaining the ability for the prefetch streams to outpace the demand stream. For example, in response to a single demand request, pipelined prefetcher 1840 may initiate respective prefetch operations (into different caches) along each of multiple homelines. In at least some embodiments, prefetching the front wave only to lower levels of the cache hierarchy that have higher memory parallelism (e.g., more buffers) and a larger capacity may mitigate the added stress on the buffer occupancy on the upper levels of the cache hierarchy, allowing the prefetcher to run ahead aggressively in the front wave. In at least some embodiments, stress-based throttling may be managed on each level of the cache hierarchy independently.

System 1800 may include a processor, SoC, integrated circuit, or other mechanism. For example, system 1800 may include processor 1804. Although processor 1804 is shown and described as an example in FIG. 18, any suitable mechanism may be used. For example, some or all of the functionality of processor 1804 described herein may be implemented by a digital signal processor (DSP), circuitry, instructions for reconfiguring circuitry, a microcontroller, an application specific integrated circuit (ASIC), or a microprocessor having more, fewer, or different elements than those illustrated in FIG. 18. Processor 1804 may include any suitable mechanisms for performing pipelined prefetching to advance multiple data streams in parallel. In at least some embodiments, such mechanisms may be implemented in hardware. For example, in some embodiments, some or all of the elements of processor 1804 illustrated in FIG. 18 and/or described herein may be implemented fully or in part using hardware circuitry. In some embodiments, this circuitry may include static (fixed-function) logic devices that collectively implement some or all of the functionality of processor 1804. In other embodiments, this circuitry may include programmable logic devices, such as field programmable logic gates or arrays thereof, that collectively implement some or all of the functionality of processor 1804. In still other embodiments, this circuitry may include static, dynamic, and/or programmable memory devices that, when operating in conjunction with other hardware elements, implement some or all of the functionality of processor 1804. For example, processor 1804 may include a hardware memory having stored therein instructions which may be used to program system 1800 to perform one or more operations according to embodiments of the present disclosure. Embodiments of system 1800 and processor 1804 are not limited to any specific combination of hardware circuitry and software. Processor 1804 may be implemented fully or in part by the elements described in FIGS. 1-17.

Processor 1804 may include one or more cores 1812, each of which may include an execution unit 1816. In one embodiment, at least one of the execution units 1816 may be an out-of-order execution engine. In one embodiment, processor 1804 may receive instructions for execution as instruction stream 1802. The instructions in instruction stream 1802 may include instructions that generate a sequential demand stream through a region of memory system 1830. In one embodiment, processor 1804 may include a front end 1806, which may include an instruction fetch pipeline stage (such as instruction fetch unit 1808) and a decode pipeline stage (such as decide unit 1810). Front end 1806 may receive and decode instructions from instruction stream 1802 using instruction fetch unit 1808 and decode unit 1810, respectively. The decoded instructions may be dispatched, allocated, and scheduled for execution by an allocation stage of a pipeline (such as allocator 1814) and allocated to specific execution units 1816. In at least some embodiments, processor 1804 may include an uncore module 1836, which may include a last-level cache 1838. In one embodiment, uncore module 1836 may also include portions or subsystems of processor 1804 necessary for the execution of one or more core(s) 1812 that are not implemented within the core(s) 1812. For example, in different embodiments, uncore module 1836 may include one or more hardware interfaces, memory coherency coordinators, interprocessor interconnects, instruction pipelines, or memory controllers (not shown).

In one embodiment, processor 1804 may include a memory hierarchy comprising one or more levels of caches within the cores, one or more shared cache units, and/or external memory coupled to the set of integrated memory controller units (not shown). The caches on each level within the memory hierarchy may include any suitable caches. Some embodiments of the present disclosure may include a single internal cache for both instructions and data, such as, for example, a Level 1 (L1) internal cache, or multiple levels of internal cache. Other embodiments may include separate instruction and data cache units and a shared mid-level cache, such as a Level 2 (L2) cache unit. In some embodiments, the system may include a combination of an internal cache and an external cache that may be external to the core and/or the processor. In other embodiments, all of the caches may be external to the core and/or the processor.

In the example system 1800 illustrated in FIG. 18, memory subsystem 1826 may include memory, RAM, or a cache hierarchy, which may include one or more Level 1 (L1) caches 1827. In one embodiment, L1 caches 1827 may be the closest elements of the memory hierarchy to the execution units 1816. Therefore, accesses to the L1 caches 1827 may experience the shortest latency compared to accesses to other levels in the memory hierarchy. In one embodiment, the L1 caches 1827 may be smaller than the caches at other levels in the memory hierarchy. Memory subsystem 1826 may also include, for example, a mid-level cache array 1828. In one embodiment, mid-level cache array 1828 may include one or more Level 2 (L2) caches. One or more L2 caches may be shared by multiple cores 1812 or processors 1804. In another embodiment, mid-level cache array 1828 may include one or more caches on each of multiple levels in the cache hierarchy, such as level 2 (L2), level 3 (L3), level 4 (L4), or other levels of cache. In one embodiment, the caches of mid-level cache array 1828 may be farther from the execution units 1816 than the L1 caches 1827, but closer to the execution units 1816 than last-level cache 1838. Therefore, accesses to the caches of mid-level cache array 1828 may experience a longer latency than accesses to the L1 caches 1827. In one embodiment, the caches of mid-level cache array 1828 may be larger than the L1 caches 1827, but may be smaller than last-level cache 1838. In one embodiment, accesses to last-level cache 1838 may experience a longer latency than accesses to other levels of the cache hierarchy.

During execution, access to data or additional instructions (including data or instructions resident in memory system 1830) may be made through memory subsystem 1826. Moreover, results from execution may be stored in memory subsystem 1826 and may subsequently be flushed to memory system 1830. After execution by an execution unit 1816, instructions may be retired by a writeback stage or retirement stage in retirement unit 1818. Various portions of such execution pipelining may be performed by one or more cores 1812 of processor 1804.

In at least some embodiments of the present disclosure, pipelined prefetcher 1840 may include a prefetcher pipe 1822 and detector array 1820. In other embodiments, circuitry or logic for performing pipelined prefetching may be implemented by one or more other components of processor 1804 and partitioned differently than as illustrated in FIG. 18. In the example system illustrated in FIG. 18, pipelined prefetcher 1840 is communicatively coupled to mid-level cache array 1828 through an output queue for prefetches (shown as output queue 1832). In one embodiment, last-level cache 1838 may be communicatively coupled to mid-level cache array 1828 through common scheduling queue 1824 and external scheduler 1834. In this example, output queue 1832 may drain into the request buffers for mid-level cache array 1828 (shown as common scheduling queue 1824). In one embodiment, at least some requests stored to common scheduling queue 1824 may subsequently be sent to uncore module 1836 through external scheduler 1834. In one example, requests to perform prefetching into last-level cache 1838 may be sent to external scheduler 1834, which may pass them to uncore module 1836. In response, circuitry or logic within uncore module 1836 may prefetch one or more lines from memory system 1830 into last-level cache 1838. In another example, requests to perform prefetching into mid-level cache array 1828 may be sent to external scheduler 1834, which may pass them to uncore module 1836. In response, if a targeted line has already been prefetched into last-level cache 1838, circuitry or logic within uncore module 1836 may promote one or more lines, including the targeted line, into mid-level cache array 1828. If a targeted line has not already been prefetched into last-level cache 1838, circuitry or logic within uncore module 1836 may prefetch one or more lines, including the targeted line, from memory system 1830 into last-level cache 1838, after which they may be promoted to mid-level cache array 1828.

In embodiments of the present disclosure, pipelined prefetcher 1840 may track one wave of prefetches to last-level cache 1838 using one homeline, and may track another wave of prefetches to mid-level cache array 1828 using another homeline. In one embodiment, pipelined prefetcher 1840 may implement a first wave of prefetches to prefetch lines into last-level cache 1838 more aggressively than lines are prefetched into mid-level cache array 1828. The prefetches into last-level cache 1838 may bring lines from memory system 1830 into the cache hierarchy of processor 1804 without consuming request queue resources that are close to the cores 1812, such as the request buffers for mid-level cache array 1828 within common scheduling queue 1824. In one embodiment, pipelined prefetcher 1840 may also implement a second wave of prefetches to bring lines into mid-level cache array 1828, which is closer to cores 1812 than last-level cache 1838. In one embodiment, the second wave of prefetches may use fewer resources compared to prefetches in some existing processors because they may be able to take advantage of the prefetches that occurred during the first wave. For example, the second wave of prefetches may bring lines into mid-level cache array 1828 that were prefetched into last-level cache 1838 during the first wave of prefetches. In this example, the second wave of prefetches may use fewer request queue resources within common scheduling queue 1824 than would be consumed by a prefetch into mid-level cache array 1828 all the way from memory system 1830 because each prefetch of a given line may experience a relatively shorter latency than if it were prefetched from memory system 1830. In at least some embodiments, if and when a demand request is received that targets a line that has already been prefetched into last-level cache 1838 by the first wave of prefetches, the demand request may experience a shorter latency than if the line had to be fetched all the way from memory system 1830. Similarly, if and when a demand request is received that targets a line that has already been prefetched into mid-level cache array 1828 by the second wave of prefetches, the demand request may experience a shorter latency than if the line had to be fetched from last-level cache 1838. In one embodiment, if and when a demand request is received that targets a line that has already been prefetched into mid-level cache array 1828 by the second wave of prefetches, the demand request may experience the possible minimum latency from the cache hierarchy.

In at least some embodiments of the present disclosure, a demand request that misses in the L1 cache(s) 1827 may be directed to the mid-level cache array 1828. In one embodiment, this may initiate a lookup for the line that is the target of the demand request in mid-level cache array 1828. For example, mid-level cache array 1828 may be searched to determine whether or not the line that is the target of the demand request has already been prefetched into mid-level cache array 1828. In one embodiment, in parallel to this lookup, circuitry or logic within pipelined prefetcher 1840 (such as circuitry or logic within prefetcher pipe 1822) may access detector array 1820 to determine the region of interest (the region of memory system 1830 that includes the targeted line). In one embodiment, detector array 1820 may include circuitry or logic to detect whether an instruction stream is generating accesses to sequential locations within a region of interest. In at least some embodiments, there may be two homelines associated with the region of interest.

In one embodiment, based on what is found in detector array 1820, pipelined prefetcher 1840 may determine whether or not to prefetch from either or both of the two homelines within the region of interest. For example, in one embodiment, pipelined prefetcher 1840 may determine, dependent on a stress-based heuristic (such as one based on the amount of contention for the available cache space), that it should prefetch one or more lines into the mid-level cache array from a mid-level cache prefetch homeline. In another embodiment, pipelined prefetcher 1840 may determine, dependent on a utility-based heuristic (such as one based on the extent to which prefetching is likely to be useful), that it should prefetch one or more lines into the mid-level cache array from a mid-level cache prefetch homeline. In yet another embodiment, pipelined prefetcher 1840 may determine, dependent on a stress-based heuristic, that it should prefetch one or more lines into the last-level cache array from a last-level cache prefetch homeline. In still another embodiment, pipelined prefetcher 1840 may determine, dependent on a utility-based heuristic, that it should prefetch one or more lines into the last-level cache array from a last-level cache prefetch homeline.

In one embodiment, if pipelined prefetcher 1840 determines that it should issue any prefetch requests to mid-level cache array 1828 and/or to last-level cache 1838, these prefetch requests may be placed in output queue 1832. In one embodiment, prefetch requests placed in output queue 1832 may subsequently find their way into common scheduling queue 1824. In one embodiment, common scheduling queue 1824 may serve as a common scheduling buffer for mid-level cache array 1828. In one embodiment, common scheduling queue 1824 may also serve as a buffer for bringing data to the mid-level cache hierarchy 1828. In one embodiment, if the line that is the target of the demand request has not already been prefetched into mid-level cache array 1828, a prefetch request may be sent to external scheduler 1834, which may pass it to the uncore module 1836, as described above. In this case, the line may continue to be tracked in common scheduling queue 1824 until the contents of the location targeted by the demand request has been retrieved for consumption by one of execution units 1816. In one embodiment, if the line that is the target of the demand request has not already been prefetched into last-level cache 1838, a prefetch request may be sent to external scheduler 1834, which may pass it to the uncore module 1836. In this case, the line may no longer be tracked in common scheduling queue 1824.

In some embodiments, pipelined prefetching may include mechanisms that effectively split the fetch process into multiple complementary phases. In embodiments of the present disclosure, pipelined prefetching may allow the prefetcher to prefetch in parallel at multiple distance points, such that the further downstream prefetching takes place, the lower the cache level that is used to store the results. For example, in one phase, in response to a first demand request, a prefetching operation may bring the contents of a first address that is far away from the address targeted by the first demand request into a low-level cache. In addition, during the first phase, a second prefetching operation may bring the contents of a second address that is closer to the address targeted by the first demand request into a closer (higher-level) cache. In a subsequent phase, in response to a second demand request, one prefetching operation may bring the contents of the first address, which is now closer to the address targeted by the second demand request, into the closer (higher-level) cache, and a second prefetching operation may bring the contents of a third address that is farther away from the address targeted by the second demand request into the low-level cache. An example of the used of this phased approach is illustrated in FIG. 19 and described in detail below.

In at least some embodiment, the use of the mechanisms described herein for performing pipelined prefetching may improve performance and resource utilization for applications that include sequential accesses to a particular region in memory. For example, prefetching from far downstream addresses into lower cache levels (such as last-level cache 1838) may not require that buffers associated with higher-level caches (such as the request buffers for mid-level cache array 1828 within common scheduling queue 1824) be reserved. Instead, requests to prefetch from far downstream addresses into lower cache levels may simply operate on a "fire & forget" basis. In some embodiments, this may allow the effective prefetching bandwidth to be increased without significantly increasing the stress over the buffers (e.g., contention for the buffers), thereby achieving higher memory level parallelism. In some embodiments, the impact of speculation may be mitigated by the use of pipelined prefetching because prefetching requests that target far downstream addresses will affect only the larger lower-level caches that are less susceptible to thrashing. For example, in one embodiment, the closer a cache is to the cores and execution units thereof, the more expensive the request queue resource may be. In this example, there may a very limited number of request queue resources for demand requests (including first-level cache resources). However, prefetches to a mid-level cache may have more request queue resources available, and prefetches to the last-level cache may have even more request queue resources available. In embodiments of the present disclosure, by sending the results of prefetch requests to particular ones of the caches, and managing the occupancy of the various queues, the prefetch bandwidth may be increased. In this example, even with aggressive speculation, which may be incorrect if it advances beyond the address at which the detected sequence ends, the impact of misspeculation may be mitigated because the larger caches into which the most aggressively speculative prefetching results are stored are less susceptible to thrashing due to their size.

In at least some embodiments of the present disclosure, the use of the mechanisms described herein for performing pipelined prefetching may allow prefetching latency to be distributed across multiple levels of the memory hierarchy. For example, in one embodiment, in steady-state, the prefetches at each level may only observe the latency of accessing the next-lower level in the hierarchy, rather than the full latency of prefetching from memory.

Figure 19:
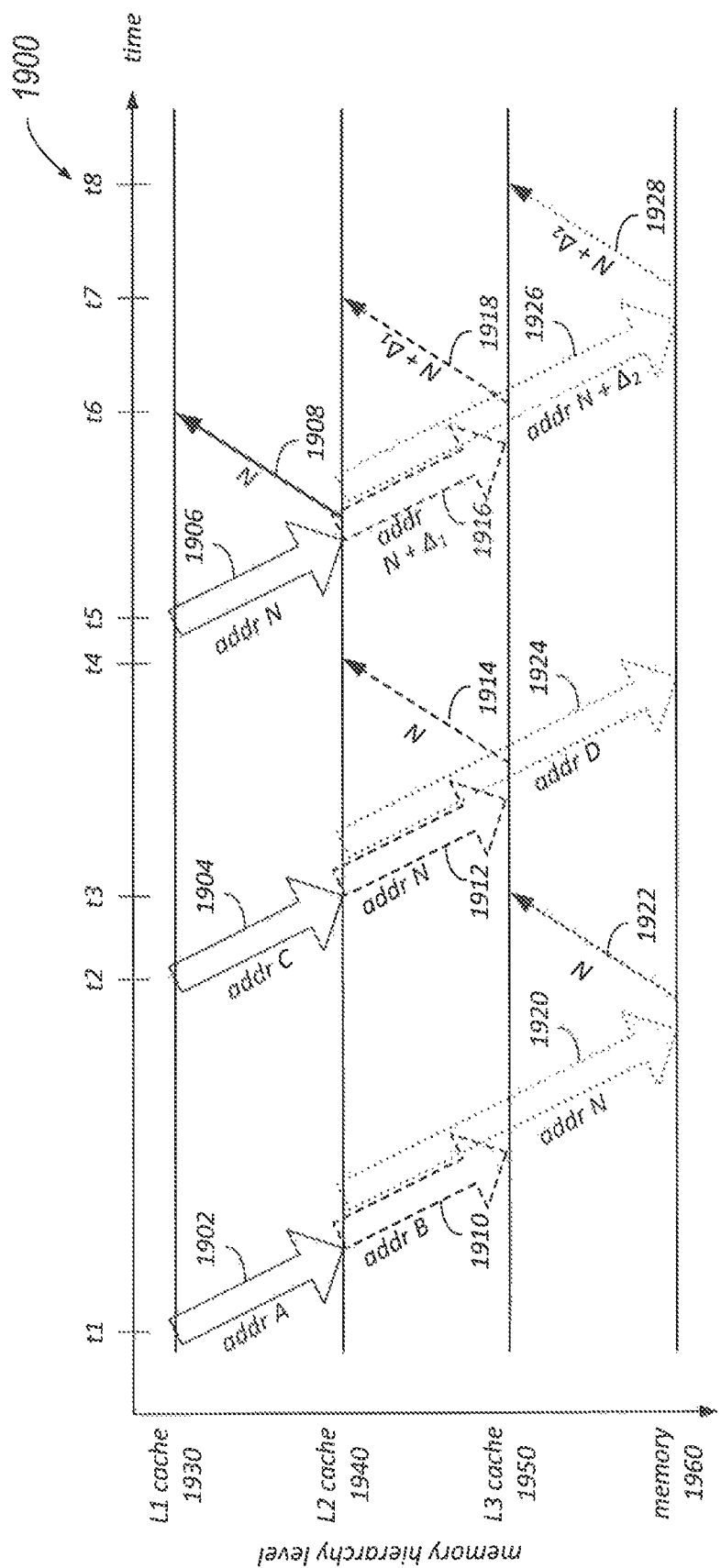
FIG. 19 illustrates the operations of a pipelined prefetcher with respect to a given cache line, according to embodiments of the present disclosure.

The mechanisms described herein for performing pipelined prefetching to advance multiple data streams in parallel may be further illustrated by the timeline 1900 depicted in FIG. 19. FIG. 19 illustrates the operations of a pipelined prefetcher with respect to a cache line containing an address N. More specifically, FIG. 19 illustrates how a request to address N is served by a prior prefetch into a mid-level cache and an even earlier prefetch into a last-level cache, each of which was triggered by a respective previous demand request. In this example, a system that implements pipelined prefetching includes, in its memory hierarchy, a first-level (L1) cache 1930 that is relatively small and that is close to one or more cores or execution units thereof. The latency experienced when accessing information found in L1 cache 1930 may be shorter than the latency experienced when accessing information found at lower-levels of the memory hierarchy. In this example, the memory hierarchy also includes a mid-level (L2) cache 1940, which may be larger than L1 cache 1930 and may be farther from the cores or execution units than L1 cache 1930. The latency experienced when accessing information found in L2 cache 1940 may be longer than the latency experienced when accessing information found in L1 cache 1930. In some embodiments, L2 cache 1940 may be shared between multiple cores or execution units. In this example, the system includes a third level (L3) cache 1950, which is the last-level cache in the memory hierarchy. L3 cache 1950 may be larger than L1 cache 1930 and L2 cache 1940 and may be farther from the cores or execution units than L1 cache 1930 and L2 cache 1940. The latency experienced when accessing information found in L3 cache 1950 may be longer than the latency experienced when accessing information found in L1 cache 1930 or L2 cache 1940. In some embodiments, L3 cache 1950 may be shared between multiple processor, cores, or execution units in the system. In this example, memory 1960 may be the lowest level of the memory hierarchy.

In timeline 1900, each of the wide arrows having a solid outline (labeled as 1902, 1904, and 1906) represents a demand request made to the mid-level cache (L2 cache 1940) that targets an address in a respective line in a region of memory 1960. Each of the wide arrows having a dashed outline (labeled as 1910, 1912, and 1916) represents a request for a prefetch of a respective line into the mid-level cache (L2 cache 1940) from the last-level cache (L3 cache 1950). Each of the wide arrows having a dotted outline (labeled as 1920, 1924, and 1926) represents a request for a prefetch of a respective line into the last-level cache (L3 cache 1950) from memory 1960.

At time t1, in this example, a demand request 1902 is issued that targets a cache line other than the cache containing address N (in this case, address A). This demand request, issued well before a demand request that targets address N, triggers both a mid-level cache prefetch and a last-level cache prefetch. More specifically, in response to demand request 1902, prefetch 1910 is issued to the mid-level cache (L2 cache 1940) and prefetch 1920 is issued to the last-level cache (L3 cache 1950). In this example, prefetch 1910 targets an address B, with the aim of bringing the cache line containing address B closer to the execution units prior to a demand request for address B (not shown). In this example, prefetch 1920 targets address N, with the aim of bringing the cache line containing address N closer to the execution units prior to the demand request for address N (shown as demand request 1906).

At time t2, in this example, a demand request 1904 is issued that targets another cache line other than the cache containing address N (in this case, address C). This demand request, which is also issued before a demand request that targets address N, triggers both a mid-level cache prefetch and a last-level cache prefetch. More specifically, in response to demand request 1904, prefetch 1912 is issued to the mid-level cache (L2 cache 1940) and prefetch 1924 is issued to the last-level cache (L3 cache 1950). In this example, prefetch 1912 targets address N, using some resources in the L2 request queue. This aim of this prefetch is to bring the cache line containing address N still closer to the execution units prior to the demand request for address N (shown as demand request 1906). In this example, prefetch 1924 targets address D, with the aim of bringing the cache line containing address D closer to the execution units prior to a demand request for address D (not shown).

At time t3, in this example, as a result of prefetch 1920, the cache line containing address N is prefetched from memory 1960 into the last-level cache (L3 cache 1950). This is illustrated in FIG. 19 by arrow 1922.

In response to prefetch 1912, the cache line containing address N is brought into the mid-level cache (L2 cache 1940). Because this cache line is found in the last-level cache (L3 cache 1950), prefetch 1912 observes only the latency of promoting this cache line from the last-level cache (L3 cache 1950), rather than the latency of fetching this cache line all the way from memory 1960. In this example, the cache line containing address N is brought into the mid-level cache (L2 cache 1940) at time t4. This is illustrated in FIG. 19 by arrow 1914.

At time t5, in this example, a demand request 1906 is issued that targets address N. In this example, since the cache line containing address N has already been prefetched into the last-level cache (L3 cache 1950) and subsequently promoted to the mid-level cache (L2 cache 1940) prior to the arrival of demand request 1906, demand request 1906 observes only the latency of promoting this cache line from the mid-level cache (L2 cache 1940), rather than the latency of promoting this cache line from the last-level cache (L3 cache 1950) or the latency of fetching this cache line all the way from memory 1960. In this example, the cache line containing address N is brought into the first-level cache (L1 cache 1930) for consumption by the execution engine at time t6. This is illustrated in FIG. 19 by arrow 1908.

Figure 21:
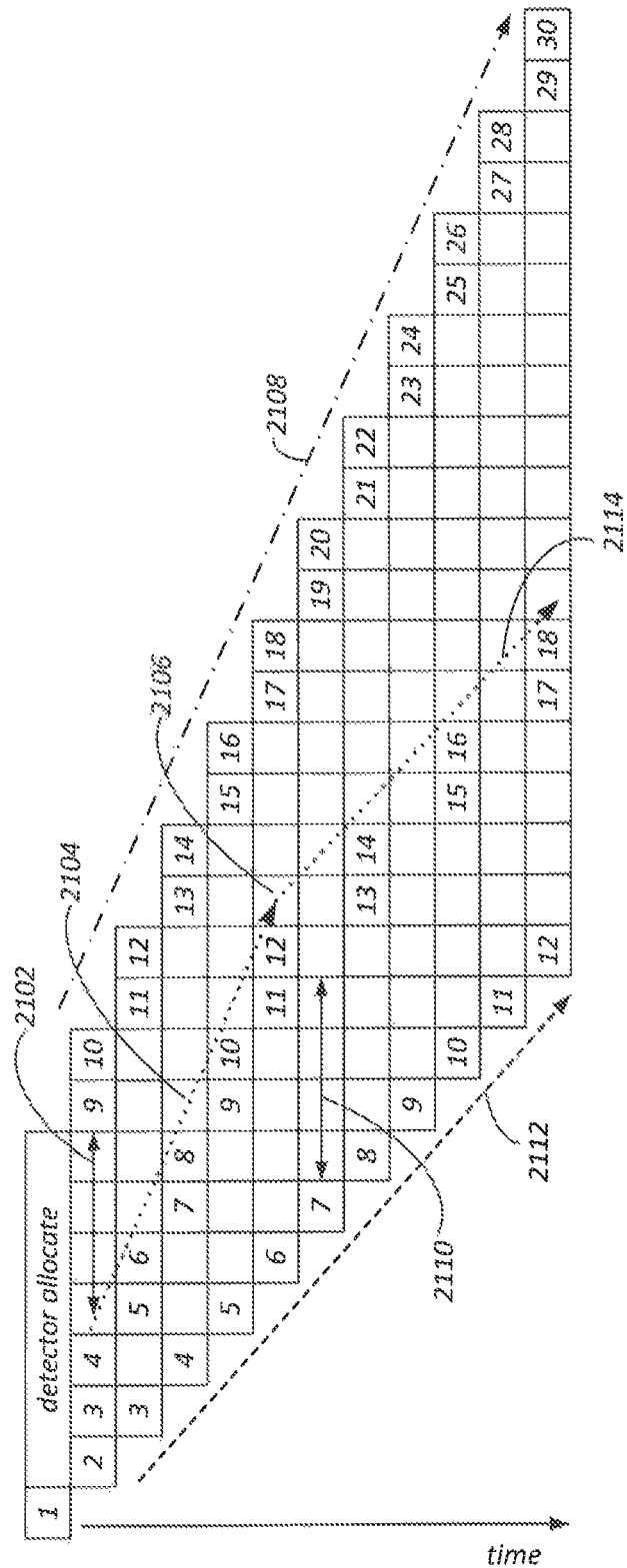
FIG. 21 is an illustration of pipelined prefetching along multiple cache prefetch streams (homelines), according to embodiments of the present disclosure.

As with demand requests 1902 and 1904, demand request 1906 triggers both a mid-level cache prefetch and a last-level cache prefetch. More specifically, in response to demand request 1906, prefetch 1916 is issued to the mid-level cache (L2 cache 1940) and prefetch 1926 is issued to the last-level cache (L3 cache 1950). In this example, prefetch 1916 targets a cache line at a first offset distance ($\Delta_1$) from the cache line that includes address N. As a result of prefetch 1916, the cache line containing address (N+$\Delta_1$) is brought into the mid-level cache (L2 cache 1940) at time t7. This is illustrated in FIG. 19 by arrow 1918. In this example, the cache line containing address (N+$\Delta_1$) is promoted from the last-level cache (L3 cache 1950) to the mid-level cache (L2 cache 1940) in response to prefetch 1916. In this example, prefetch 1926 targets a cache line at a second offset distance ($\Delta_2$) from the cache line that includes address N. As a result of prefetch 1926, the cache line containing address (N+$\Delta_2$) is prefetched from memory 1960 into the last-level cache (L3 cache 1950) at time t8. This is illustrated in FIG. 19 by arrow 1928. In one embodiment, the first offset distance ($\Delta_1$) may represent an address difference that is equivalent to a small number of cache lines. For example, the first offset distance ($\Delta_1$) may be equal to the difference between addresses that are two or four cache line lengths apart. In this example, the second offset distance ($\Delta_2$) may represent an address difference that is equivalent to a larger number of cache lines, such as the difference between addresses that are more than four cache line lengths apart, As illustrated in FIG. 21 and described in more detail below, the first offset distance may be allowed to increase over time up to a maximum offset distance, while the second offset distance may be allowed to increase over time without restriction, in some embodiments.

Note that, for clarity, the results of demand requests 1902 and 1904, mid-level cache prefetch 1910, and last-level cache prefetch 1924 are not shown in timeline 1900. Note also that while the relative positions of the labeled points in time shown in FIG. 19 and the relative positions of corresponding actions may be accurate for at least some embodiments, the relative distances between the pairs of these labeled points in time along timeline 1900 are not necessarily shown to scale.

Figure 20:
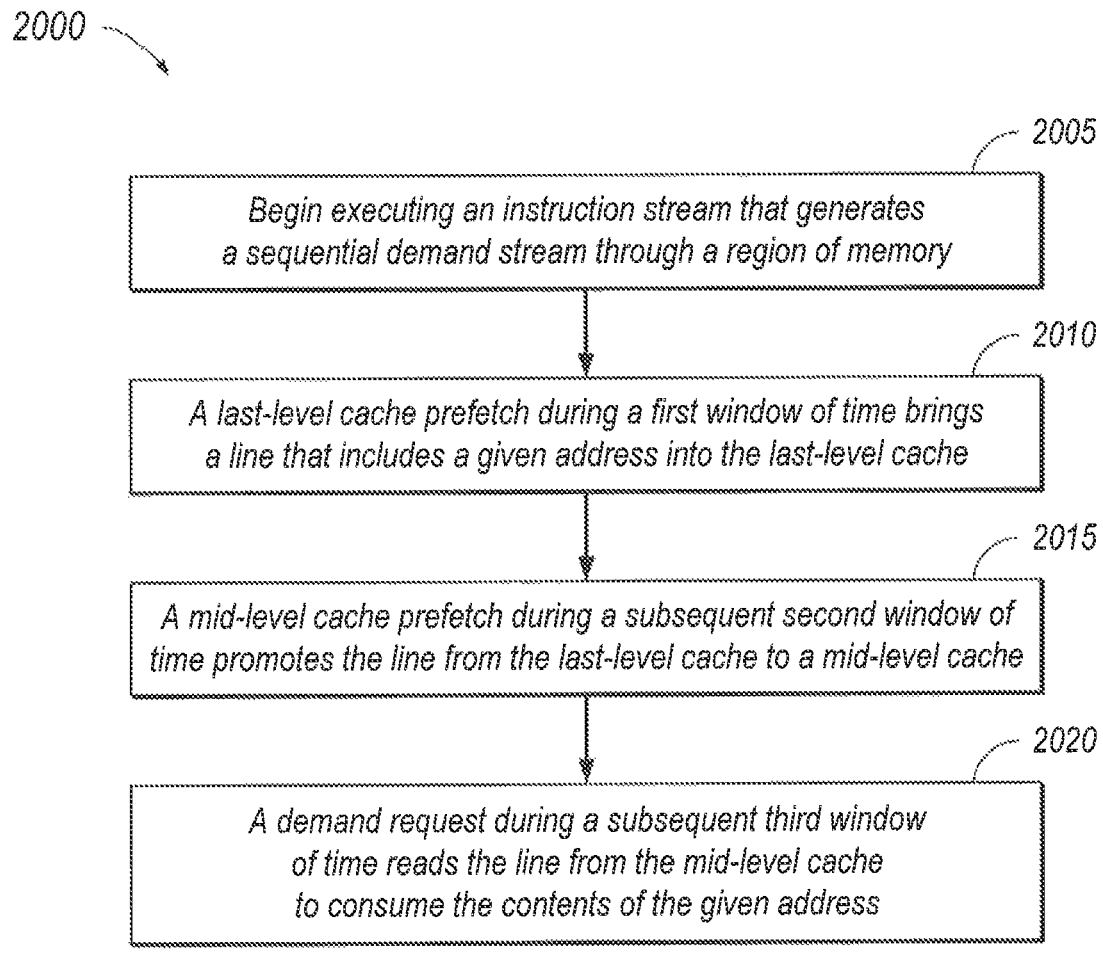
FIG. 20 is an illustration of a method for visiting a line multiple times by a pipelined prefetcher, according to embodiments of the present disclosure.

FIG. 20 illustrates an example method 2000 for visiting a line multiple times by a pipelined prefetcher, according to embodiments of the present disclosure. Method 2000 may be implemented by any of the elements shown in FIGS. 1-19. Method 2000 may be initiated by any suitable criteria and may initiate operation at any suitable point. In one embodiment, method 2000 may initiate operation at 2005. Method 2000 may include greater or fewer steps than those illustrated. Moreover, method 2000 may execute its steps in an order different than those illustrated below. Method 2000 may terminate at any suitable step. Moreover, method 2000 may repeat operation at any suitable step. Method 2000 may perform any of its steps in parallel with other steps of method 2000, or in parallel with steps of other methods.

At 2005, in one embodiment, execution of an instruction stream that generates a sequential demand stream through a region of memory may begin. At 2010, a last-level cache prefetch performed during a first window of time may bring a line that includes a given address into the last-level cache.

In one embodiment, the line may be brought into the last-level cache in response to a demand request that is received in the first window of time. The demand request may target another line in the region of memory. In one embodiment, the line brought into the last-level cache may be at a predetermined offset from the line that is the target of the demand request. In another embodiment, the line brought into the last-level cache may be at an offset from yet another line that is prefetched into a mid-level cache during the first window of time that is at least as large as a predetermined minimum offset. In one embodiment, the demand request received in the first window of time may be satisfied by accessing the line that is the target of that demand request from the mid-level cache. For example, the line that is the target of the demand request received in the first window of time may have been promoted from the last-level cache to the mid-level cache during a previous window of time. In another embodiment, the demand request received in the first window of time may be satisfied by accessing the line that is the target of that demand request from a first-level cache. For example, the line that is the target of the demand request received in the first window of time may have been promoted from the mid-level cache to the first-level cache during a previous window of time.

At 2015, a mid-level cache prefetch performed during a subsequent second window of time may promote the line that includes the given address from the last-level cache to the mid-level cache. In one embodiment, the line that includes the given address may be brought into the mid-level cache in response to a demand request that is received in the second window of time. The demand request received in the second window of time may target a different line in the region of memory than the demand request received in the first window of time. In one embodiment, the line brought into the mid-level cache may be at an offset from the line that is the target of the demand request received in the second window of time that is no larger than a predetermined maximum offset. In one embodiment, an additional line may be prefetched into the last-level cache during the second window of time (not shown). In one embodiment, the demand request received in the second window of time may be satisfied by accessing the line that is the target of that demand request from the mid-level cache. For example, the line that is the target of the demand request received in the second window of time may have been promoted from the last-level cache to the mid-level cache during a previous window of time. In another embodiment, the demand request received in the second window of time may be satisfied by accessing the line that is the target of that demand request from the first-level cache. For example, the line that is the target of the demand request received in the second window of time may have been promoted from the mid-level cache to the first-level cache during a previous window of time.

At 2020, a demand request received during a subsequent third window of time may read the line that includes the given address from the mid-level cache to consume the contents of the given address. In one embodiment, reading the line that includes the given address may include promoting the line that includes the given address from the mid-level cache to the first-level cache. In another embodiment, the demand request received in the third window of time may be satisfied by accessing the line that is the target of that demand request from the mid-level cache, as this line was promoted from the last-level cache to the mid-level cache during the second window of time. In yet another embodiment, the demand request received in the third window of time may be satisfied by accessing the line that is the target of that demand request from the first-level cache. For example, the line that is the target of the demand request received in the third window of time may have been promoted from the mid-level cache to the first-level cache during a previous window of time. In this example, the line that is the target of the demand request received in the third window of time may have been promoted from the mid-level cache to the first-level cache in response to a previous demand request that targeted an address in that line other than the given address.

In at least some embodiments, prefetching may be controlled individually at each prefetching level using any of a variety of heuristics. The criteria used to control prefetching into a mid-level cache may be different than the criteria used to control prefetching into the last-level cache. For example, in one embodiment, prefetching at a given level may be controlled by weighting its effectiveness vs. the available resources on that level (or on the next levels). In this example, prefetching on stressed levels may stall while prefetching on other levels may continue independently, which may cover at least part of the observed latency.

In some embodiments, the criteria used to control prefetching into a given cache may include one or more stressed-based heuristics. In one embodiment, if there is high contention for the available cache space, prefetching on that cache level may be throttled back. For example, in response to detecting high contention for the cache space on a given cache level, not every demand request will trigger prefetching on that cache level. In another example, in response to high contention for the cache space on a given cache level, the number of cache lines prefetched into that cache level by each prefetch operation may be reduced. In another embodiment, the criteria used to control prefetching into a given cache may include one or more heuristics that reflect the usefulness of prefetching at that cache level. For example, if prefetch requests are being sent from the mid-level cache to the last-level cache, and requests are typically (or always) hitting in the last-level cache, there may be little point in sending last-level cache prefetches ahead of these requests because the lines are already there. In yet another embodiment, the criteria used to control prefetching into a given cache may include one or more accuracy-based heuristics.

In at least some embodiments, the aggressiveness of the prefetching may be controlled individually at each prefetching level using any of a variety of heuristics. The criteria used to control the aggressiveness of prefetching into a mid-level cache may be different than the criteria used to control the aggressiveness of prefetching into the last-level cache. For example, each level in the memory hierarchy may have different aggressiveness parameters. In one embodiment, prefetching aggressiveness may be governed by a window mechanism that allows a given homeline to progress only up to a maximum offset distance from the demand stream. In at least some embodiments, the pipelined prefetcher may implement larger windows for the homelines used to prefetech into progressively lower-level caches. For example, the homeline for the last-level cache may be allowed to advance much farther from the demand stream than a homeline for a mid-level cache.

In some embodiments, the pipelined prefetcher may control the window of addresses that are prefetched into each cache level using a combination of multiple aggressiveness parameters. In one embodiment, the pipelined prefetcher may include circuitry or logic to maintain a predefined minimum offset distance between the mid-level cache prefetch homeline and the last-level cache prefetch homeline. For example, rather than requesting a prefetch to bring a given line into the last-level cache and, potentially, immediately requesting a prefetch to bring the given into the mid-level cache, a minimum distance may be enforced between the homelines for the two prefetch streams. In one embodiment, after prefetching into a lower-level cache at an initial offset distance from the prefetch stream of a higher-level cache, the distance between the prefetch stream of the lower-level cache and the prefetch stream of the higher-level cache may be allowed to grow until it reaches a target minimum offset distance. In one embodiment, after prefetching into a cache at an initial offset distance from the demand stream, the distance between the prefetch stream of the cache and the demand stream may be allowed to grow until it reaches a target minimum offset distance. In one embodiment, the minimum offset distance between the prefetch streams of two caches or between the prefetch stream of a cache and the demand stream may be hardwired or otherwise fixed in the system. In another embodiment, the minimum offset distance may be configurable during runtime. For example, a minimum offset distance parameter may be controlled by operating system software. In another example, the minimum offset distance may be controlled by performance monitoring circuitry or logic.

In one embodiment, the pipelined prefetcher may include circuitry or logic to enforce a predefined maximum offset distance between the mid-level cache prefetch homeline and the last-level cache prefetch homeline. The predefined maximum offset distance between these homelines may be dependent on how aggressively speculative the prefetcher is operating. In one embodiment, the pipelined prefetcher may include circuitry or logic to enforce a predefined maximum offset distance between the demand stream and the mid-level cache prefetch stream. In one embodiment, in order to avoid exceeding a predefined maximum offset distance, prefetching at one or more levels may be throttled back by the pipelined prefetcher. In one embodiment, each prefetching window may operate within the bounds of a predefined minimum offset distance and a predefined maximum offset distance according to its own stress-based, accuracy-based, or usefulness-based heuristics. In one embodiment, the minimum offset distance between the prefetch streams of two caches or between the prefetch stream of a cache and the demand stream may be modulated during runtime based on one or more stress-based, accuracy-based, or usefulness-based heuristics. In another embodiment, the maximum offset distance between the prefetch streams of two caches or between the prefetch stream of a cache and the demand stream may be modulated during runtime based on one or more stress-based, accuracy-based, or usefulness-based heuristics.

FIG. 21 is an illustration of pipelined prefetching along multiple cache prefetch streams (homelines), according to embodiments of the present disclosure. More specifically, FIG. 21 illustrates an example of pipelined prefetching in which two cache prefetch streams (homelines) advance along a page in memory, triggered by a demand stream. In one embodiment, the size of the pages along which two homelines advance when performing pipelined prefetching may be 4 KB. One of the homelines may advance along the page to bring data into a last-level cache (such as last-level cache 1838 shown in FIG. 18, or L3 cache 1950 described above in reference to FIG. 19). The second one of the homelines may advance along the page prefetching data into a mid-level cache (such as mid-level cache array 1828 shown in FIG. 18, or L4 cache 1940 described above in reference to FIG. 19).

In this example, each of the thirty columns shown in FIG. 21 may represent a respective line at a given offset along the 4 KB page. In one embodiment, each such line may be visited up to three times as part of the execution of an instruction stream that accesses sequential locations on the page. For example each line may be visited first by a last-level cache prefetch. This last-level cache prefetch may perform fetching the data in the line from memory and installing it in the last-level cache. Each line may subsequently be visited by a mid-level cache prefetch. In at least some embodiments, the mid-level cache prefetch may promote the cache line from the last-level cache to the mid-level cache. Ultimately, each line may be visited by a demand request, which consumes the data. In one embodiment, an additional cache level may (effectively) be present in the cache hierarchy. For example, a cache line may be promoted from the mid-level cache to a first-level (L1) cache. In one embodiment, this L1 cache may be implemented as a data cache unit (DCU) such as data cache unit 474 illustrated in FIG. 4B and described above. Promoting a cache line from the mid-level cache to such a data cache unit may allow a subsequent demand request to observe only the latency of an access that hits in the data cache unit.

In the example illustrated in FIG. 21, the accesses to a given cache line are represented in FIG. 21 by the cache line numbers labeled at different points in time, with time progressing from the top of the figure to the bottom of the figure. In this example, the pipelined prefetcher may issue up to two mid-level cache prefetches for every demand request. Similarly, the pipelined prefetcher may issue up to two last-level cache prefetches for every demand request Each horizontal row in FIG. 21 may represent a snapshot of the actions taken along the demand stream (shown as 2112), the mid-level cache prefetch stream (which includes two portions shown as 2104 and 2114), and the last-level cache prefetch stream (shown as 2108) at a given point in time (for a given quantum of time). For example, during the first time period, a demand request targeting cache line 1 is issued. In addition, a detector within the pipelined prefetcher determines that the demand stream 2112 includes a stream of sequential accesses within the 4 KB page, and initiates pipelined prefetching. In one embodiment, initiating pipelined prefetching may include initiating the value of a pointer representing the mid-level cache homeline. In one embodiment, initiating pipelined prefetching may include initiating the value of a pointer representing the last-level cache homeline. In one embodiment, initiating pipelined prefetching may include determining an initial offset distance between demand stream 2112 and the mid-level cache prefetch stream. In one embodiment, initiating pipelined prefetching may include determining a target maximum offset distance between demand stream 2112 and the mid-level cache prefetch stream, shown as maximum offset distance 2110. In one embodiment, initiating pipelined prefetching may include determining an initial target offset distance between the mid-level cache prefetch stream and last-level cache prefetch stream 2108, shown as initial offset distance 2102. In one embodiment, initiating pipelined prefetching may include determining a target minimum offset distance between the mid-level cache prefetch stream and last-level cache prefetch stream 2108. In one embodiment, the target minimum offset distance may have the same value as the initial offset distance 2102.

During the second time period illustrated in FIG. 21, a demand request targeting the next sequential cache line in the 4 KB page (cache line 2) is issued along demand stream 2112. In addition, this demand triggers a prefetch of cache lines 3 and 4 into the mid-level cache (along mid-level cache prefetch stream 2104). For example, the initial offset distance between the cache lines targeted by demand stream 2112 and the cache lines targeted by mid-level cache prefetch stream 2104 may be 1. In this example, this demand also triggers a prefetch of cache lines 9 and 10 into the last-level cache (along last-level cache prefetch stream 2108), the cache lines prefetched into the last-level cache being separated from the cache lines prefetched into the mid-level cache by an amount equal to the initial offset distance 2102.

In this example, during the third through sixth time periods, demand requests advance along demand stream 2112 in sequence, targeting cache lines 3-6. In this example, each of these demand requests triggers the corresponding prefetching of two cache lines into the mid-level cache (along mid-level cache prefetch stream 2104) and the prefetching of two other cache lines into the last-level cache (along last-level cache prefetch stream 2108).

FIG. 21 further illustrates the prefetch window mechanism described above, according to at least some embodiments. In this example, the mid-level cache prefetch stream is allowed to advance beyond demand stream 2112 only up to the maximum offset distance 2110, after which further advancement may be considered too speculative or too aggressive. In this example, because prefetches along the mid-level cache prefetch stream bring twice as many cache lines into the mid-level cache than the number of cache lines that are being accessed by demand stream 2112, the distance between demand stream 2112 and the mid-level cache prefetch stream increases over time until it reaches maximum offset distance 2110. During the first six time periods, as prefetching advances along the first portion of the mid-level cache prefetch stream (shown as mid-level cache prefetch stream portion 2104), the distance between demand stream 2112 and mid-level cache prefetch stream portion 2104 does not exceed the maximum offset distance 2110. However, any prefetching into the mid-level cache during the seventh time period would advance the mid-level cache prefetch stream beyond the maximum offset distance 2110. This inflection point in the mid-level cache prefetch stream is labeled in FIG. 21 as 2106. In this example, following the inflection point 2106, the pipelined prefetcher maintains the maximum offset distance 2110 by changing the pattern of mid-level cache prefetches. More specifically, along the second portion of the mid-level cache prefetch stream (mid-level cache prefetch stream portion 2114), two prefetches into the mid-level cache are issued for every-other demand request along demand stream 2112, rather than two prefetches into the mid-level cache being issued in response to every demand request.

In the example illustrated in FIG. 21, the pipelined prefetcher may begin prefetching cache lines into the last-level cache at an initial offset distance 2102 from the cache lines being prefetched into the mid-level cache along mid-level cache prefetch stream portion 2104. As noted above, two cache lines may be prefetched into the last-level cache (along last-level cache prefetch stream 2108) for each demand request. In this example, based on the initial offset distance 2102, cache lines 1-8 are not prefetched into the last-level cache. For example, during the second time period, when cache lines 3 and 4 are prefetched into the mid-level cache, cache lines 9 and 10 are prefetched into the last-level cache. However, the pipelined prefetcher may be allowed to continue increasing the distance between the mid-level cache prefetch stream and the last-level cache prefetch stream. In one embodiment, there may be no upper bound enforced on the distance between the mid-level cache prefetch stream and the last-level cache prefetch stream. In another embodiment, there may be an upper bound on the distance between the mid-level cache prefetch stream and the last-level cache prefetch stream, but it may be higher than the maximum offset distance 2110 between the mid-level cache prefetch stream and demand stream 2112. In the example illustrated in FIG. 21, the distance between the mid-level cache prefetch stream and the last-level cache prefetch stream is constant until the maximum offset distance 2110 between the mid-level cache prefetch stream and demand stream 2112 is reached. After the pipelined prefetcher throttles back on the prefetches into the mid-level cache (beginning at inflection point 2106), the distance between the mid-level cache prefetch stream and the last-level cache prefetch stream may increase steadily as the pipelined prefetcher continues to aggressively prefetch into the last-level cache.

In embodiments of the present disclosure, a pipelined prefetcher may advance along consecutive data streams in parallel over multiple homelines, such that the front "wave" of prefetches serves in reducing the latency of the second wave of prefetches, and so on. For example, in one embodiment, two homelines may advance over a given 4 KB page, one of which serves as the wavefront for mid-level cache prefetches and the other of which serves as the wavefront for last-level cache prefetches. In one embodiment, once the pipelined prefetcher detects that a stream of sequential accesses is in progress on a given page, two such homelines may work in parallel. In one example, the stream of sequential accesses may be detected by a detector array component of a pipelined prefetcher, such as detector array 1820 of prefetcher 1840 illustrated in FIG. 18). In this example, once a stream of sequential accesses is detected, for each mid-level cache access, a respective decision may be made about whether or not to issue a prefetch request to bring additional lines into each of the caches in the memory hierarchy.

In one embodiment, for each mid-level cache access, if the last-level cache is not stressed and prefetching to the last-level cache has been determined to be useful, the prefetcher may issue a request to fetch one or more lines from the last-level cache prefetch homeline into the last-level cache and to advance the last-level cache prefetch homeline beyond those lines. In one embodiment, for each mid-level cache access, if the mid-level cache is not stressed and prefetching to the mid-level cache has been determined to be useful, the prefetcher may issue a request to fetch one or more lines from the mid-level cache prefetch homeline into the mid-level cache and to advance the mid-level cache prefetch homeline beyond those lines. In one embodiment, if the distance between the two homeliness is less than a predetermined minimum offset distance threshold, the last-level cache prefetch homeline may be further advanced in order to preserve a minimal effective prefetching distance between the two homelines.

Figure 22:
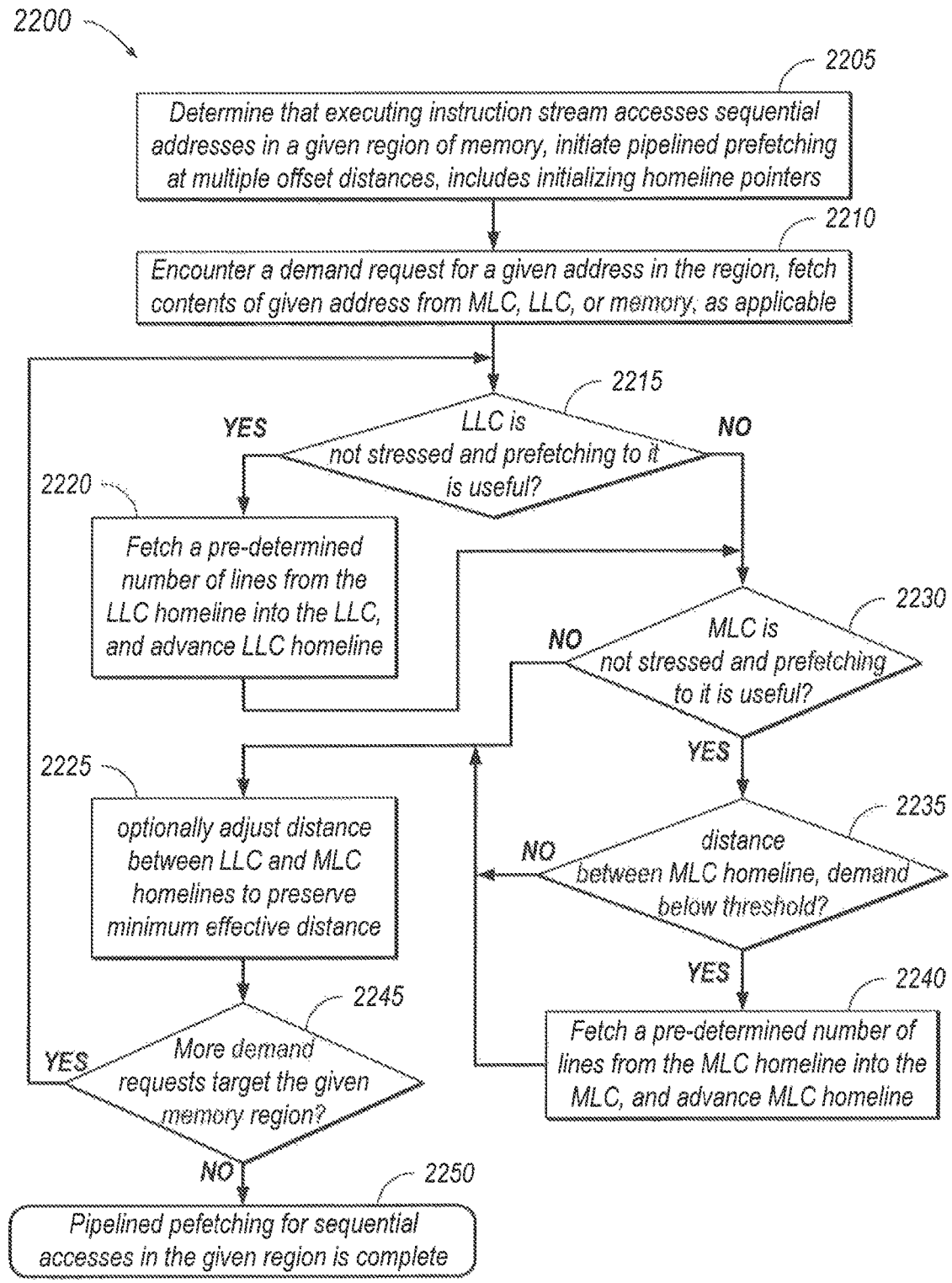
FIG. 22 is an illustration of a method for performing pipelined prefetching to advance multiple data streams in parallel, according to embodiments of the present disclosure.

FIG. 22 illustrates an example method 2200 for performing pipelined prefetching to advance multiple data streams in parallel, according to embodiments of the present disclosure. Method 2200 may be implemented by any of the elements shown in FIGS. 1-19. Method 2200 may be initiated by any suitable criteria and may initiate operation at any suitable point. In one embodiment, method 2200 may initiate operation at 2205. Method 2200 may include greater or fewer steps than those illustrated. Moreover, method 2200 may execute its steps in an order different than those illustrated below. Method 2200 may terminate at any suitable step. Moreover, method 2200 may repeat operation at any suitable step. Method 2200 may perform any of its steps in parallel with other steps of method 2200, or in parallel with steps of other methods.

At 2205, in one embodiment, it may be determined that an executing instruction stream accesses sequential addresses in a given region of memory. In response to this determination, pipelined prefetching at multiple offset distances may be initiated. This may include initializing multiple homeline pointers (one for each data stream). In one embodiment, this may also include initializing one or more minimum, maximum, or fixed offset values that control how far ahead lines are prefetched into each respective cache. At 2210, A demand request that targets a given address in the region may be encountered. In response to the demand request, the contents of the given address may be fetched from a mid-level cache, from a last-level cache, or from memory, as applicable. For example, in response to a miss in a first-level cache, a line that includes the given address may be promoted from the mid-level cache to the first-level cache for consumption. In another example, if the line that includes the given address has been prefetched into the last-level cache, but has not yet been promoted to the mid-level cache or first-level cache, fetching the contents of the given address may include promoting the line that includes the given address from the last-level cache to the mid-level cache. In this example, fetching the contents of the given address may also include promoting the line that includes the given address from the mid-level cache to the first-level cache for consumption.

At 2215, if (during the same time window) it is determined that the last-level cache is not stressed and that prefetching to it has been determined to be useful, then (at 2220), a pre-determined number of lines from the LLC homeline may be fetched into the last-level cache, and the LLC homeline may be advanced past those lines. In one embodiment, if (at 2215) it is determined that the last-level cache is stressed or that prefetching to it has been determined not to be useful, then no lines will be prefetched into the last-level cache during the current time window.

In at least some embodiments of the present disclosure, a determination of whether or not to prefetch one or more lines into the mid-level cache may be made independently from the determination of whether or not to prefetch one or more lines into the last-level cache. For example, one or more lines may be prefetched into the mid-level cache during the current time window regardless of whether or not prefetching into the last-level cache was performed during the current time window. At 2230, in one embodiment, it may be determined (during the same time window) whether the mid-level cache is stressed and whether prefetching to it has been determined to be useful. If the mid-level cache is not stressed, if prefetching has been determined to be useful, and if (at 2235) it is determined that the distance between the MLC homeline and the demand request line is below a maximum offset threshold, then (at 2240), a pre-determined number of lines from the MLC homeline may be fetched into the mid-level cache, and the MLC homeline may be advanced past those lines. In one embodiment, this may include promoting a pre-determined number of lines from the last-level cache to the mid-level cache. In one embodiment, if (at 2230) it is determined that the mid-level cache is stressed or that prefetching to it has been determined not to be useful, then no lines will be prefetched into the mid-level cache during the current time window. In one embodiment, if (at 2235) it is determined that the distance between the MLC homeline and the demand request line is not below a maximum offset threshold, then no lines will be prefetched into the mid-level cache during the current time window.

In one embodiment (at 2225), the distance between the LLC and MLC homelines may be adjusted to preserve the minimum effective distance between them. For example, if it is determined that the distance between the homelines of the last-level cache and the mid-level cache is below a predetermined minimum threshold for the distance between them, then the LLC homeline may be advanced by an additional amount in order to preserve the minimum effective distance between them. As illustrated in this example, in some embodiments, the LLC homeline may require adjusting to preserve the minimum effective distance between the LLC and MLC homelines even if LLC prefetches were not triggered (e.g., because the MLC homeline advanced). In this example, while there are more demand requests that target the given memory region (as determined at 2245), some or all of the operations shown in 2215-2240 may be repeated, as appropriate, for each line in the given memory region that is targeted by those demand requests. Once (at 2245) it is determined that there are no additional demand requests that target the given memory region, pipelined pefetching for sequential accesses in the instruction stream that target the given region may be complete, as in 2250.

Several examples of pipelined prefetchers are described herein as prefetchers that implement dual homelines, including one for mid-level cache prefetching and one for last-level cache prefetching. In other embodiments, the pipelined prefetchers described herein may implement more than two homelines that advance different data streams over a memory region of interest. For example, in a system that includes multiple mid-level caches, the pipelined prefetcher may implement a respective different homeline for each of the mid-level caches in addition to a homeline for the last-level cache. In this example, these homelines may be advanced along the corresponding sequential data streams in parallel and independently. In an embodiment that includes multiple mid-level caches (e.g., an L2 cache and an L3 cache) in addition to a last-level (L4) cache, the prefetcher may explicitly submit prefetch requests from each level that are designated for a lower level. For example, an L2 cache may submit prefetches to an L3 cache, and the L3 cache may submit prefetches to the last-level (L4) cache. In one embodiment, an additional homeline may be added at a higher-level cache, such as a first level (L1) cache.

Several embodiments of a pipelined prefetcher are described herein in terms of its application to instruction streams that generate accesses to sequential address in a memory. In another embodiment, the mechanisms for implementing pipelined prefetching into multiple caches may be applied to instruction streams that access memory addresses that are generally, but not necessarily strictly, sequential. For example, pipelined prefetching may be applied to instruction streams that do not use all of the lines in a given memory region of interest but in which the targeted subset of the lines are accessed in order of their addresses. In this example, the prefetcher may aggressively prefetch lines into the last-level cache in sequential order even though not all of them will be promoted into the mid-level cache. In yet another embodiment, pipelined prefetching may be applied to instruction streams that access lines in a given memory region according to a predictable pattern that is not strictly sequential. For example, if the instruction stream generates a pattern of accesses that can be detected (and predicted) far enough ahead for multiple-level prefetching to be useful, this information may be mapped to the mechanisms described herein for determining which lines to prefetch into a mid-level cache and/or last-level cache in response to ongoing demand requests. In this example, the prefetcher may perform aggressive prefetching into the last-level cache along addresses corresponding to the detected pattern. The prefetcher may also perform less-aggressive prefetching into the mid-level cache along addresses corresponding to the detected pattern.

Some existing processors that employ hardware data prefetching mechanisms use a processor core to bring data into its caches. In these existing implementations, various heuristics or constraints are used to determine into which of multiple caches the data should be prefetched. For example, if a mid-level cache request queue is full, prefetched data is sent to the last-level cache. In these existing systems, the decision about where to direct prefetched data is made on a per-line basis. In some existing systems, a mid-level cache stream prefetcher relies on a high prefetch rate (issuing multiple prefetches per demand request) to run ahead of the demand stream and bring lines into the mid-level cache or the last-level cache. If a decision is made to send prefetched data to the last-level cache rather than to a closer cache, then when a demand request for that data is eventually issued, the full latency of bringing the data from the last-level cache to the execution unit for consumption is observed. These existing systems must constantly make tradeoffs between a desire to run as far ahead as possible (in order to effectively hide the latency of future demand accesses) and the limitations placed on prefetching due to the number of available request buffers and the need to service the demand stream in parallel. In addition, speculative prefetching can cause thrashing in the caches and waste these critical resources if it is incorrect.

In embodiments of the present disclosure, pipelined prefetching may avoid or reduce the need to make such tradeoffs by allowing prefetching to take place at multiple distance points in parallel such that the further downstream prefetching occurs, the lower the level in the cache hierarchy is used to store the results. In one embodiment, a performance improvement of up to 2% (in terms of instructions-per-cycle) was demonstrated, on average, over systems that include existing hardware data prefetching mechanisms without pipelined prefetching. An additional return on investment analysis (one that takes into account the impact of pipelined prefetching on power, area, and prefetching bandwidth) has been performed for at least one embodiment. This analysis demonstrated that the benefit vs. the overall impact of implementing pipelined prefetching was favorable.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system may include any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part-on and part-off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Some embodiments of the present disclosure include a processor. In at least some of these embodiments, the processor may include a front end to decode an instruction, an execution unit to execute the instruction, a first cache in a cache hierarchy, a second cache in the cache hierarchy, the second cache being at a lower level in the cache hierarchy than the first cache, logic or circuitry to receive a first demand request for data at a first memory address, the data at the first memory address to be consumed by execution of the instruction, and the first memory address being within a first line in a memory, logic or circuitry to provide, in response to the first demand request, the data at the first memory address to the execution unit for consumption by the execution of the instruction, logic or circuitry to prefetch into the first cache, in response to the first demand request, a second line in the memory at a first offset distance from the first line, logic or circuitry to prefetch into the second cache, in response to the first demand request, a third line in the memory at a second offset distance from the second line, the third line being farther from the first line than is the second line, and a retirement unit to retire the instruction. In combination with any of the above embodiments, the processor may further include logic or circuitry to receive a second demand request for data at a second memory address, the second memory address being within the second line in the memory, logic or circuitry to provide, in response to the second demand request, the data at the second memory address to the execution unit from the first cache, and logic or circuitry to prefetch the third line into the first cache, including logic or circuitry to promote the third line from the second cache to the first cache. In any of the above embodiments, the logic or circuitry may prefetch into the first cache, in response to the first demand request, a fourth line in the memory in addition to the second line in the memory, the fourth line being adjacent to the second line in the memory, or the logic or circuitry may prefetch into the second cache, in response to the first demand request, a fifth line in the memory in addition to the third line in the memory, the fifth line being adjacent to the third line in the memory. In combination with any of the above embodiments, the processor may further include logic or circuitry to track the next line to be prefetched into the first cache, logic or circuitry to receive a second demand request for data at a second memory address, the second memory address being within a fourth line in the memory, logic or circuitry to determine whether or not the distance between the fourth line in the memory and the next line to be prefetched into the first cache exceeds a predetermined maximum offset distance, and logic or circuitry to elide a prefetch of the next line to be prefetched into the first cache in response to a determination that the distance between the fourth line in the memory and the next line to be prefetched into the first cache exceeds the predetermined maximum offset distance. In combination with any of the above embodiments, the processor may further include logic or circuitry to receive a second demand request for data at a second memory address, logic or circuitry to determine, based on a first heuristic, whether to issue a request to prefetch a line into the first cache in response to the second demand request, logic or circuitry to elide issuance of a request to prefetch a line into the first cache in response to a determination that a request to prefetch a line into the first cache should not be issued, logic or circuitry to determine, based on a second heuristic, whether to issue a request to prefetch a line into the second cache in response to the second demand request, and logic or circuitry to elide issuance of a request to prefetch a line into the second cache in response to a determination that a request to prefetch a line into the second cache should not be issued. In combination with any of the above embodiments, the processor may further include logic or circuitry to detect that the instruction is an instruction within an instruction stream that generates accesses to sequential addresses in the memory. In any of the above embodiments, the logic or circuitry may prefetch the second line into the first cache in response to the detection that the instruction is an instruction within an instruction stream that generates accesses to sequential addresses in the memory. In any of the above embodiments, the logic or circuitry may prefetch the third line into the second cache in response to the detection that the instruction is an instruction within an instruction stream that generates accesses to sequential addresses in the memory. In combination with any of the above embodiments, the processor may further include a third cache in the cache hierarchy, the third cache being at a lower level in the cache hierarchy than the second cache, and logic or circuitry to prefetch into the third cache, in response to the first demand request, a fourth line in the memory at a third offset distance from the third line, the fourth line being farther from the first line than is the third line. In combination with any of the above embodiments, the processor may further include a third cache in the cache hierarchy, the third cache being at a higher level in the cache hierarchy than the first cache, and logic or circuitry to promote the first line from the first cache to the third cache. In any of the above embodiments, the second logic may provide the data at the first memory address to the execution unit for consumption by the execution of the instruction from the third cache. In combination with any of the above embodiments, the processor may further include logic or circuitry to receive a second demand request for data at a second memory address, logic or circuitry to determine, based on a measure of cache stress for the first cache, whether to issue a request to prefetch a line into the first cache in response to the second demand request, logic or circuitry to elide issuance of a request to prefetch a line into the first cache in response to a determination that a request to prefetch a line into the first cache should not be issued, logic or circuitry to determine, based on a measure of cache stress for the second cache, whether to issue a request to prefetch a line into the second cache in response to the second demand request, and logic or circuitry to elide issuance of a request to prefetch a line into the second cache in response to a determination that a request to prefetch a line into the second cache should not be issued. In combination with any of the above embodiments, the processor may further include logic or circuitry to receive a second demand request for data at a second memory address, logic or circuitry to determine whether a prefetch of a line into the first cache in response to the second demand request is likely to be useful, logic or circuitry to elide issuance of a request to prefetch a line into the first cache in response to a determination that a prefetch of a line into the first cache is not likely to be useful, logic or circuitry to determine whether a prefetch of a line into the second cache in response to the second demand request is likely to be useful, and logic or circuitry to elide issuance of a request to prefetch a line into the first cache in response to a determination that a prefetch of a line into the first cache is not likely to be useful. In combination with any of the above embodiments, the processor may further include logic or circuitry to receive a second demand request for data at a second memory address, logic or circuitry to promote into the first cache from the second cache, in response to the second demand request, a fourth line in the memory, and logic or circuitry to prefetch into the second cache from the memory, in response to the second demand request, a fifth line in the memory. In any of the above embodiments, the second offset distance may be a predetermined minimum offset distance. In combination with any of the above embodiments, the processor may further include logic or circuitry to track a first indicator of the next line to be prefetched into the first cache, logic or circuitry to track a second indicator of the next line to be prefetched into the second cache, logic or circuitry to receive a second demand request for data at a second memory address, logic or circuitry to determine, in response to the second demand request, whether or not the distance between the next line to be prefetched into the first cache and the next line to be prefetched into the second cache is less than a predetermined minimum offset distance, logic or circuitry to modify the second indicator to achieve the predetermined minimum offset distance in response to a determination that the distance between the next line to be prefetched into the first cache and the next line to be prefetched into the second cache is less than a predetermined minimum offset distance, logic or circuitry to prefetch into the first cache, in response to the second demand request, the line identified by the first indicator, and logic or circuitry to prefetch into the second cache, in response to the second demand request, the line identified by the second indicator, as modified.

Some embodiments of the present disclosure include a method. The method may be for executing instructions. The method may be implemented in a processor. The method may include receiving an instruction, decoding the instruction, executing the instruction, and retiring the instruction. Executing the instruction may include receiving a first demand request for data at a first memory address, the data at the first memory address being for consumption while executing the first instruction, and the first memory address being within a first line in a memory, providing, in response to receiving the first demand request, the data at the first memory address for consumption during the executing, prefetching into a first cache in a cache hierarchy, in response to receiving the first demand request, a second line in the memory at a first offset distance from the first line, prefetching into a second cache in the cache hierarchy, in response to receiving the first demand request, a third line in the memory at a second offset distance from the second line, the third line being farther from the first line than is the second line, and retiring the instruction. In combination with any of the above embodiments, the method may further include receiving a second demand request for data at a second memory address, the second memory address being within the second line in the memory, providing, in response to the second demand request, the data at the second memory address to the execution unit from the first cache, and prefetching the third line into the first cache, including promoting the third line from the second cache to the first cache. In combination with any of the above embodiments, the method may further include prefetching into the first cache, in response to the first demand request, a fourth line in the memory in addition to the second line in the memory, the fourth line being adjacent to the second line in the memory, or prefetching into the second cache, in response to the first demand request, a fifth line in the memory in addition to the third line in the memory, the fifth line being adjacent to the third line in the memory. In combination with any of the above embodiments, the method may further include tracking the next line to be prefetched into the first cache, receiving a second demand request for data at a second memory address, the second memory address being within a fourth line in the memory, determining whether or not the distance between the fourth line in the memory and the next line to be prefetched into the first cache exceeds a predetermined maximum offset distance, and refraining from prefetching the next line to be prefetched into the first cache in response to determining that the distance between the fourth line in the memory and the next line to be prefetched into the first cache exceeds the predetermined maximum offset distance. In combination with any of the above embodiments, the method may further include receiving a second demand request for data at a second memory address, determining, based on a first heuristic, whether or not to issue a request to prefetch a line into the first cache in response to the second demand request, and determining, based on a second heuristic, whether or not to issue a request to prefetch a line into the second cache in response to the second demand request. In combination with any of the above embodiments, the method may further include detecting that the instruction is an instruction within an instruction stream that generates accesses to sequential addresses in the memory. In any of the above embodiments, prefetching the second line into the first cache may be performed in response to detecting that the instruction is an instruction within an instruction stream that generates accesses to sequential addresses in the memory, and prefetching the third line into the second cache may be performed in response to detecting that the instruction is an instruction within an instruction stream that generates accesses to sequential addresses in the memory. In combination with any of the above embodiments, the method may further include promoting first line from the first cache to a third cache in the cache hierarchy, the third cache being at a higher level in the cache hierarchy than the first cache, and providing the data at the first memory address to the execution unit for consumption by the execution of the instruction comprises providing the data from the third cache. In combination with any of the above embodiments, the method may further include prefetching into a third cache in the cache hierarchy, in response to the first demand request, a fourth line in the memory at a third offset distance from the third line. In any of the above embodiments, the third cache may be at a lower level in the cache hierarchy than the second cache, and the fourth line may be farther from the first line than is the third line. In combination with any of the above embodiments, the method may further include receiving a second demand request for data at a second memory address, determining, based on a first measure of cache stress for the first cache, whether or not to issue a request to prefetch a line into the first cache in response to the second demand request, and determining, based on a second measure of cache stress for the second cache, whether or not to issue a request to prefetch a line into the second cache in response to the second demand request. In combination with any of the above embodiments, the method may further include receiving a second demand request for data at a second memory address, determining whether or not to issue a request to prefetch a line into the first cache in response to the second demand request, which may include determining whether a prefetch of a line into the first cache in response to the second demand request is likely to be useful, and determining whether or not to issue a request to prefetch a line into the second cache in response to the second demand request, which may include determining whether a prefetch of a line into the second cache in response to the second demand request is likely to be useful. In combination with any of the above embodiments, the method may further include receiving a second demand request for data at a second memory address, promoting into the first cache from the second cache, in response to the second demand request, a fourth line in the memory, and prefetching into the second cache from the memory, in response to the second demand request, a fifth line in the memory. In any of the above embodiments, the second offset distance may be a predetermined minimum offset distance. In combination with any of the above embodiments, the method may further include tracking a first indicator of the next line to be prefetched into the first cache, tracking a second indicator of the next line to be prefetched into the second cache, receiving a second demand request for data at a second memory address, determining, in response to the second demand request, whether or not the distance between the next line to be prefetched into the first cache and the next line to be prefetched into the second cache is less than a predetermined minimum offset distance, modifying the second indicator to achieve the predetermined minimum offset distance in response to determining that the distance between the next line to be prefetched into the first cache and the next line to be prefetched into the second cache is less than a predetermined minimum offset distance, prefetching into the first cache, in response to the second demand request, the line identified by the first indicator, and prefetching into the second cache, in response to the second demand request, the line identified by the second indicator, as modified.

Some embodiments of the present disclosure include a system. In at least some of these embodiments, the system may include a memory and a processor. The processor may include a front end to decode an instruction, an execution unit to execute the instruction, a first mid-level cache in a cache hierarchy, a last-level cache in the cache hierarchy, the last-level cache being at a lower level in the cache hierarchy than the first mid-level cache, logic or circuitry to receive a first demand request for data at a first memory address, the data at the first memory address to be consumed by execution of the instruction, and the first memory address being within a first line in a memory, logic or circuitry to provide, in response to the first demand request, the data at the first memory address to the execution unit for consumption by the execution of the instruction, logic or circuitry to prefetch into the first mid-level cache, in response to the first demand request, a second line in the memory at a first offset distance from the first line, logic or circuitry to prefetch into the last-level cache, in response to the first demand request, a third line in the memory at a second offset distance from the second line, the third line being farther from the first line than is the second line, and a retirement unit to retire the instruction. In combination with any of the above embodiments, the processor may further include logic or circuitry to receive a second demand request for data at a second memory address, the second memory address being within the second line in the memory, logic or circuitry to provide, in response to the second demand request, the data at the second memory address to the execution unit from the first mid-level cache, and logic or circuitry to prefetch the third line into the first mid-level cache, including logic or circuitry to promote the third line from the last-level cache to the first mid-level cache. In combination with any of the above embodiments, the logic or circuitry prefetches into the first mid-level cache, in response to the first demand request, a fourth line in the memory in addition to the second line in the memory, the fourth line being adjacent to the second line in the memory, or the logic or circuitry prefetches into the last-level cache, in response to the first demand request, a fifth line in the memory in addition to the third line in the memory, the fifth line being adjacent to the third line in the memory. In combination with any of the above embodiments, the processor may further include logic or circuitry to track the next line to be prefetched into the first mid-level cache, logic or circuitry to receive a second demand request for data at a second memory address, the second memory address being within a fourth line in the memory, logic or circuitry to determine whether or not the distance between the fourth line in the memory and the next line to be prefetched into the first mid-level cache exceeds a predetermined maximum offset distance, and logic or circuitry to elide a prefetch of the next line to be prefetched into the first mid-level cache in response to a determination that the distance between the fourth line in the memory and the next line to be prefetched into the first mid-level cache exceeds the predetermined maximum offset distance. In combination with any of the above embodiments, the processor may further include logic or circuitry to receive a second demand request for data at a second memory address, logic or circuitry to determine, based on a first heuristic, whether to issue a request to prefetch a line into the first mid-level cache in response to the second demand request, logic or circuitry to elide issuance of a request to prefetch a line into the first mid-level cache in response to a determination that a request to prefetch a line into the first mid-level cache should not be issued, logic or circuitry to determine, based on a second heuristic, whether to issue a request to prefetch a line into the last-level cache in response to the second demand request, and logic or circuitry to elide issuance of a request to prefetch a line into the last-level cache in response to a determination that a request to prefetch a line into the last-level cache should not be issued. In combination with any of the above embodiments, the processor may further include logic or circuitry to detect that the instruction is an instruction within an instruction stream that generates accesses to sequential addresses in the memory. In any of the above embodiments, the logic or circuitry may prefetch the second line into the first mid-level cache in response to the detection that the instruction is an instruction within an instruction stream that generates accesses to sequential addresses in the memory. In any of the above embodiments, the logic or circuitry may prefetch the third line into the last-level cache in response to the detection that the instruction is an instruction within an instruction stream that generates accesses to sequential addresses in the memory. In combination with any of the above embodiments, the processor may further include a first-level cache in the cache hierarchy, the first-level cache being at a higher level in the cache hierarchy than the first mid-level cache, and logic or circuitry to promote the first line from the first mid-level cache to the first-level cache. In any of the above embodiments, the second logic may provide the data at the first memory address to the execution unit for consumption by the execution of the instruction from the first-level cache. In combination with any of the above embodiments, the processor may further include a second mid-level cache in the cache hierarchy, the second mid-level cache being at a lower level in the cache hierarchy than the first mid-level cache and at a higher level in the cache hierarchy than the last-level cache, and logic or circuitry to prefetch into the second mid-level cache, in response to the first demand request, a fourth line in the memory at a third offset distance from the third line, the fourth line being farther from the first line than is the second line and closer to the first line than is the third line. In combination with any of the above embodiments, the processor may further include logic or circuitry to receive a second demand request for data at a second memory address, logic or circuitry to determine, based on a measure of cache stress for the first mid-level cache, whether to issue a request to prefetch a line into the first mid-level cache in response to the second demand request, logic or circuitry to elide issuance of a request to prefetch a line into the first mid-level cache in response to a determination that a request to prefetch a line into the first mid-level cache should not be issued, logic or circuitry to determine, based on a measure of cache stress for the last-level cache, whether to issue a request to prefetch a line into the last-level cache in response to the second demand request, and logic or circuitry to elide issuance of a request to prefetch a line into the last-level cache in response to a determination that a request to prefetch a line into the last-level cache should not be issued. In combination with any of the above embodiments, the processor may further include logic or circuitry to receive a second demand request for data at a second memory address, logic or circuitry to determine whether a prefetch of a line into the first mid-level cache in response to the second demand request is likely to be useful, logic or circuitry to elide issuance of a request to prefetch a line into the first mid-level cache in response to a determination that a prefetch of a line into the first mid-level cache is not likely to be useful, logic or circuitry to determine whether a prefetch of a line into the last-level cache in response to the second demand request is likely to be useful, and logic or circuitry to elide issuance of a request to prefetch a line into the first mid-level cache in response to a determination that a prefetch of a line into the first mid-level cache is not likely to be useful. In combination with any of the above embodiments, the processor may further include logic or circuitry to receive a second demand request for data at a second memory address, logic or circuitry to promote into the first mid-level cache from the last-level cache, in response to the second demand request, a fourth line in the memory, and logic or circuitry to prefetch into the last-level cache from the memory, in response to the second demand request, a fifth line in the memory. In any of the above embodiments, the second offset distance may be a predetermined minimum offset distance. In combination with any of the above embodiments, the processor may further include logic or circuitry to track a first indicator of the next line to be prefetched into the first mid-level cache, logic or circuitry to track a second indicator of the next line to be prefetched into the last-level cache, logic or circuitry to receive a second demand request for data at a second memory address, logic or circuitry to determine, in response to the second demand request, whether or not the distance between the next line to be prefetched into the first mid-level cache and the next line to be prefetched into the last-level cache is less than a predetermined minimum offset distance, logic or circuitry to modify the second indicator to achieve the predetermined minimum offset distance in response to a determination that the distance between the next line to be prefetched into the first mid-level cache and the next line to be prefetched into the last-level cache is less than a predetermined minimum offset distance, logic or circuitry to prefetch into the first mid-level cache, in response to the second demand request, the line identified by the first indicator, and logic or circuitry to prefetch into the last-level cache, in response to the second demand request, the line identified by the second indicator, as modified.

Some embodiments of the present disclosure include a system for executing instructions. In at least some of these embodiments, the system may include means for receiving an instruction, means for decoding the instruction, means for executing the instruction, and means for retiring the instruction. The means for executing the instruction may include means for receiving a first demand request for data at a first memory address, the data at the first memory address being for consumption while executing the first instruction, and the first memory address being within a first line in a memory, means for providing, in response to receiving the first demand request, the data at the first memory address for consumption during the executing, means for prefetching into a first cache in a cache hierarchy, in response to receiving the first demand request, a second line in the memory at a first offset distance from the first line, and means for prefetching into a second cache in the cache hierarchy, in response to receiving the first demand request, a third line in the memory at a second offset distance from the second line, the third line being farther from the first line than is the second line. In combination with any of the above embodiments, the system may further include means for receiving a second demand request for data at a second memory address, the second memory address being within the second line in the memory, means for providing, in response to the second demand request, the data at the second memory address to the execution unit from the first cache, and means for prefetching the third line into the first cache, including means for promoting the third line from the second cache to the first cache. In combination with any of the above embodiments, the system may further include means for prefetching into the first cache, in response to the first demand request, a fourth line in the memory in addition to the second line in the memory, the fourth line being adjacent to the second line in the memory, or means for prefetching into the second cache, in response to the first demand request, a fifth line in the memory in addition to the third line in the memory, the fifth line being adjacent to the third line in the memory. In combination with any of the above embodiments, the system may further include means for tracking the next line to be prefetched into the first cache, means for receiving a second demand request for data at a second memory address, the second memory address being within a fourth line in the memory, means for determining whether or not the distance between the fourth line in the memory and the next line to be prefetched into the first cache exceeds a predetermined maximum offset distance, and means for refraining from prefetching the next line to be prefetched into the first cache in response to determining that the distance between the fourth line in the memory and the next line to be prefetched into the first cache exceeds the predetermined maximum offset distance. In combination with any of the above embodiments, the system may further include means for receiving a second demand request for data at a second memory address, means for determining, based on a first heuristic, whether or not to issue a request to prefetch a line into the first cache in response to the second demand request, and means for determining, based on a second heuristic, whether or not to issue a request to prefetch a line into the second cache in response to the second demand request. In combination with any of the above embodiments, the system may further include means for detecting that the instruction is an instruction within an instruction stream that generates accesses to sequential addresses in the memory. In any of the above embodiments, prefetching the second line into the first cache may be performed in response to detecting that the instruction is an instruction within an instruction stream that generates accesses to sequential addresses in the memory, and prefetching the third line into the second cache may be performed in response to detecting that the instruction is an instruction within an instruction stream that generates accesses to sequential addresses in the memory. In combination with any of the above embodiments, the system may further include means for promoting first line from the first cache to a third cache in the cache hierarchy, the third cache being at a higher level in the cache hierarchy than the first cache, and means for providing the data at the first memory address to the execution unit for consumption by the execution of the instruction comprises providing the data from the third cache. In combination with any of the above embodiments, the system may further include means for prefetching into a third cache in the cache hierarchy, in response to the first demand request, a fourth line in the memory at a third offset distance from the third line. In any of the above embodiments, the third cache may be at a lower level in the cache hierarchy than the second cache, and the fourth line may be farther from the first line than is the third line. In combination with any of the above embodiments, the system may further include means for receiving a second demand request for data at a second memory address, means for determining, based on a first measure of cache stress for the first cache, whether or not to issue a request to prefetch a line into the first cache in response to the second demand request, and means for determining, based on a second measure of cache stress for the second cache, whether or not to issue a request to prefetch a line into the second cache in response to the second demand request. In combination with any of the above embodiments, the system may further include means for receiving a second demand request for data at a second memory address, means for determining whether or not to issue a request to prefetch a line into the first cache in response to the second demand request, which may include means for determining whether a prefetch of a line into the first cache in response to the second demand request is likely to be useful, and means for determining whether or not to issue a request to prefetch a line into the second cache in response to the second demand request, which may include means for determining whether a prefetch of a line into the second cache in response to the second demand request is likely to be useful. In combination with any of the above embodiments, the system may further include means for receiving a second demand request for data at a second memory address, means for promoting into the first cache from the second cache, in response to the second demand request, a fourth line in the memory, and means for prefetching into the second cache from the memory, in response to the second demand request, a fifth line in the memory. In any of the above embodiments, the second offset distance may be a predetermined minimum offset distance. In combination with any of the above embodiments, the system may further include means for tracking a first indicator of the next line to be prefetched into the first cache, means for tracking a second indicator of the next line to be prefetched into the second cache, means for receiving a second demand request for data at a second memory address, means for determining, in response to the second demand request, whether or not the distance between the next line to be prefetched into the first cache and the next line to be prefetched into the second cache is less than a predetermined minimum offset distance, means for modifying the second indicator to achieve the predetermined minimum offset distance in response to determining that the distance between the next line to be prefetched into the first cache and the next line to be prefetched into the second cache is less than a predetermined minimum offset distance, means for prefetching into the first cache, in response to the second demand request, the line identified by the first indicator, and means for prefetching into the second cache, in response to the second demand request, the line identified by the second indicator, as modified.

What is claimed is:

1. A processor, comprising:
a front end including circuitry to decode an instruction;
an execution unit including circuitry to execute the instruction;
a first cache in a cache hierarchy;
a second cache in the cache hierarchy, the second cache to be at a lower level in the cache hierarchy than the first cache;
a prefetcher, including circuitry to:
receive a first demand request for data at a first memory address, the data at the first memory address to be consumed by execution of the instruction, and the first memory address to be within a first line in a memory;
provide, in response to the first demand request, the data at the first memory address to the execution unit for consumption by the execution of the instruction;
prefetch into the first cache, in response to the first demand request, a second line in the memory that is identified based, at least in part, on a first offset distance from the first line;
prefetch into the second cache, in response to the first demand request, a third line in the memory that is identified based, at least in part, on a second offset distance from the second line, the third line to be farther from the first line than is the second line;
track a first next line to be prefetched into the first cache;
receive a second demand request for data at a second memory address, the second memory address to be within a fourth line in the memory; and
prefetch the first next line in the memory into the first cache based, at least in part, on a distance between the fourth line in the memory and the first next line to be prefetched into the first cache not exceeding a maximum offset distance; and
a retirement unit to retire the instruction.

2. The processor of claim 1, wherein the prefetcher further includes circuitry to:
receive a third demand request for data at a third memory address, the third memory address to be within the second line in the memory;
provide, in response to the third demand request, the data at the third memory address to the execution unit from the first cache; and
prefetch the third line into the first cache, including circuitry to:
promote the third line from the second cache to the first cache.

3. The processor of claim 1, wherein the prefetcher further includes:
circuitry to prefetch into the first cache, in response to the first demand request, a fifth line in the memory in addition to the second line in the memory, the fifth line to be adjacent to the second line in the memory; or
circuitry to prefetch into the second cache, in response to the first demand request, a sixth line in the memory in addition to the third line in the memory, the sixth line to be adjacent to the third line in the memory.

4. The processor of claim 1, wherein the prefetcher further includes circuitry to:
track a second next line to be prefetched into the first cache;

receive a third demand request for data at a third memory address, the third memory address to be within a fifth line in the memory;
determine whether or not the distance between the fifth line in the memory and the second next line to be prefetched into the first cache exceeds the maximum offset distance; and
elide a prefetch of the second next line to be prefetched into the first cache in response to a determination that the distance between the fifth line in the memory and the second next line to be prefetched into the first cache exceeds the maximum offset distance.

5. The processor of claim 1, wherein the prefetcher further includes circuitry to:
receive a third demand request for data at a third memory address;
determine, based on a first heuristic, whether to issue a request to prefetch a line into the first cache in response to the third demand request;
elide issuance of the request to prefetch a line into the first cache in response to a determination that the request to prefetch a line into the first cache should not be issued;
determine, based on a second heuristic, whether to issue a request to prefetch a line into the second cache in response to the third demand request; and
elide issuance of the request to prefetch a line into the second cache in response to a determination that the request to prefetch a line into the second cache should not be issued.

6. The processor of claim 1, wherein:
the processor further comprises circuitry to:
detect that the instruction is an instruction within an instruction stream that generates accesses to sequential addresses in the memory; and
the prefetcher further includes circuitry to:
prefetch the second line into the first cache in response to the detection that the instruction is an instruction within an instruction stream that generates accesses to sequential addresses in the memory; and
prefetch the third line into the second cache in response to the detection that the instruction is an instruction within an instruction stream that generates accesses to sequential addresses in the memory.

7. The processor of claim 1, wherein:
the processor further comprises:
a third cache in the cache hierarchy, the third cache to be at a lower level in the cache hierarchy than the second cache; and
the prefetcher further includes circuitry to:
prefetch into the third cache, in response to the first demand request, a fifth line in the memory at a third offset distance from the third line, the fifth line to be farther from the first line than is the third line.

8. A method, comprising, in a processor:
receiving an instruction;
decoding the instruction;
executing the instruction, including:
receiving a first demand request for data at a first memory address, the data at the first memory address being for consumption while executing the first instruction, and the first memory address being within a first line in a memory;
providing, in response to receiving the first demand request, the data at the first memory address for consumption during the executing;
prefetching into a first cache in a cache hierarchy, in response to receiving the first demand request, a second line in the memory that is identified based, at least in part, on a first offset distance from the first line;
prefetching into a second cache in the cache hierarchy, in response to receiving the first demand request, a third line in the memory that is identified based, at least in part, on a second offset distance from the second line, the third line being farther from the first line than is the second line;
tracking a first next line to be prefetched into the first cache;
receiving a second demand request for data at a second memory address, the second memory address to be within a fourth line in the memory; and
prefetching the first next line in the memory into the first cache based, at least in part, on a distance between the fourth line in the memory and the first next line to be prefetched into the first cache not exceeding a maximum offset distance; and
retiring the instruction.

9. The method of claim 8, further comprising:
receiving a third demand request for data at a third memory address, the third memory address being within the second line in the memory;
providing, in response to the third demand request, the data at the third memory address to the execution unit from the first cache; and
prefetching the third line into the first cache, including:
promoting the third line from the second cache to the first cache.

10. The method of claim 8, further comprising:
prefetching into the first cache, in response to the first demand request, a fifth line in the memory in addition to the second line in the memory, the fifth line being adjacent to the second line in the memory; or
prefetching into the second cache, in response to the first demand request, a sixth line in the memory in addition to the third line in the memory, the sixth line being adjacent to the third line in the memory.

11. The method of claim 8, further comprising:
tracking a second next line to be prefetched into the first cache;
receiving a third demand request for data at a third memory address, the third memory address being within a fifth line in the memory;
determining whether or not the distance between the fifth line in the memory and the second next line to be prefetched into the first cache exceeds the maximum offset distance; and
refraining from prefetching the second next line to be prefetched into the first cache in response to determining that the distance between the fifth line in the memory and the second next line to be prefetched into the first cache exceeds the maximum offset distance.

12. The method of claim 8, further comprising:
receiving a third demand request for data at a third memory address;
determining, based on a first heuristic, whether or not to issue a request to prefetch a line into the first cache in response to the third demand request; and
determining, based on a second heuristic, whether or not to issue a request to prefetch a line into the second cache in response to the third demand request.

13. The method of claim 8, wherein:
the method further comprises detecting that the instruction is an instruction within an instruction stream that generates accesses to sequential addresses in the memory;
prefetching the second line into the first cache is performed in response to detecting that the instruction is an instruction within an instruction stream that generates accesses to sequential addresses in the memory; and
prefetching the third line into the second cache is performed in response to detecting that the instruction is an instruction within an instruction stream that generates accesses to sequential addresses in the memory.

14. A system, comprising:
a memory; and
a processor, including:
  a front end including circuitry to decode an instruction;
  an execution unit including circuitry to execute the instruction;
  a mid-level cache in a cache hierarchy;
  a last-level cache in the cache hierarchy, the last-level cache to be at a lower level in the cache hierarchy than the mid-level cache;
  a prefetcher, including circuitry to:
    receive a first demand request for data at a first memory address, the data at the first memory address to be consumed by execution of the instruction, and the first memory address to be within a first line in a memory;
    provide, in response to the first demand request, the data at the first memory address to the execution unit for consumption by the execution of the instruction;
    prefetch into the mid-level cache, in response to the first demand request, a second line in the memory that is identified based, at least in part, on a first offset distance from the first line;
    prefetch into the last-level cache, in response to the first demand request, a third line in the memory that is identified based, at least in part, on a second offset distance from the second line, the third line to be farther from the first line than is the second line;
    track a first next line to be prefetched into the mid-level cache;
    receive a second demand request for data at a second memory address, the second memory address to be within a fourth line in the memory; and
    prefetch the first next line in the memory into the mid-level cache based, at least in part, on a distance between the fourth line in the memory and the first next line to be prefetched into the mid-level cache not exceeding a maximum offset distance; and
  a retirement unit to retire the instruction.

15. The system of claim 14, wherein the prefetcher further includes circuitry to:
receive a third demand request for data at a third memory address, the third memory address to be within the second line in the memory;
provide, in response to the third demand request, the data at the third memory address to the execution unit from the mid-level cache; and
prefetch the third line into the mid-level cache, including circuitry to:
  promote the third line from the last-level cache to the mid-level cache.

16. The system of claim 14, wherein the prefetcher further includes:
circuitry to prefetch into the mid-level cache, in response to the first demand request, a fifth line in the memory in addition to the second line in the memory, the fifth line to be adjacent to the second line in the memory; or
circuitry to prefetch into the last-level cache, in response to the first demand request, a sixth line in the memory in addition to the third line in the memory, the sixth line to be adjacent to the third line in the memory.

17. The system of claim 14, wherein the prefetcher further includes circuitry to:
track a second next line to be prefetched into the mid-level cache;
receive a third demand request for data at a third memory address, the third memory address to be within a fifth line in the memory;
determine whether or not the distance between the fifth line in the memory and the second next line to be prefetched into the mid-level cache exceeds the maximum offset distance; and
elide a prefetch of the second next line to be prefetched into the mid-level cache in response to a determination that the distance between the fifth line in the memory and the second next line to be prefetched into the mid-level cache exceeds the maximum offset distance.

18. The system of claim 14, wherein the prefetcher further includes circuitry to:
receive a third demand request for data at a third memory address;
determine, based on a first heuristic, whether to issue a request to prefetch a line into the mid-level cache in response to the third demand request;
elide issuance of the request to prefetch a line into the mid-level cache in response to a determination that the request to prefetch a line into the mid-level cache should not be issued;
determine, based on a second heuristic, whether to issue a request to prefetch a line into the last-level cache in response to the third demand request; and
elide issuance of the request to prefetch a line into the last-level cache in response to a determination that the request to prefetch a line into the last-level cache should not be issued.

19. The system of claim 14, wherein:
the processor further comprises circuitry to:
  detect that the instruction is an instruction within an instruction stream that generates accesses to sequential addresses in the memory; and
the prefetcher further includes circuitry to:
  prefetch the second line into the mid-level cache in response to the detection that the instruction is an instruction within an instruction stream that generates accesses to sequential addresses in the memory; and
  prefetch the third line into the last-level cache in response to the detection that the instruction is an instruction within an instruction stream that generates accesses to sequential addresses in the memory.

20. The system of claim 14, wherein:
the processor further comprises:
- a first-level cache in the cache hierarchy, the first-level cache to be at a higher level in the cache hierarchy than the mid-level cache; and the prefetcher further includes circuitry to:
- promote the first line from the mid-level cache to the first-level cache; and
- provide the data at the first memory address to the execution unit for consumption by the execution of the instruction from the first-level cache.

* * * * *